Nov. 4, 1969 D. W. ANDERSON ET AL 3,477,063

CONTROLLER FOR DATA PROCESSING SYSTEM

Filed Oct. 26, 1967 28 Sheets-Sheet 1

INVENTORS
DAVID W. ANDERSON
FRANCIS J. SPARACIO
ROBERT M. TOMASULO

BY *Thomas & Thomas*
ATTORNEYS

Nov. 4, 1969 D. W. ANDERSON ET AL 3,477,063

CONTROLLER FOR DATA PROCESSING SYSTEM

Filed Oct. 26, 1967 28 Sheets-Sheet 5

Nov. 4, 1969 D. W. ANDERSON ET AL 3,477,063

CONTROLLER FOR DATA PROCESSING SYSTEM

Filed Oct. 26, 1967 28 Sheets-Sheet 7

Nov. 4, 1969 D. W. ANDERSON ET AL 3,477,063

CONTROLLER FOR DATA PROCESSING SYSTEM

Filed Oct. 26, 1967

28 Sheets-Sheet 10

Nov. 4, 1969 D. W. ANDERSON ET AL 3,477,063

CONTROLLER FOR DATA PROCESSING SYSTEM

Filed Oct. 26, 1967 28 Sheets-Sheet 17

RUA 1

INTERLOCK CONTROL

FLOW CHART 1

FIG. 14

I-BOX ACTION

| PROGRAM ITEM | INSTRUCTION | FORMAT TYPE | RUA COUNTER | RUM COUNTER |
|---|---|---|---|---|
| 1 | LOAD 1, M20 | RX | RUA1 → 1 | — |
| 2 | ADD 1, M21 | RX | RUA1 → 2 | — |
| 3 | SUBTRACT 1,2 | RR | RUA1 → 3 | RUM2 → 1 |
| 4 | SHIFT 1, RIGHT TWO | RS | RUA1 → 4 | — |
| 5 | MULTIPLY 1,1 | RR | RUA1 → 5 | RUM1 → 1 |
| 6 | STORE 1, M22 | RX | RUA1 → 6 | — |

FIG. 15

E-BOX ACTION

| PROGRAM ITEM | INSTRUCTION | FORMAT TYPE | RUA COUNTER | RUM COUNTER |
|---|---|---|---|---|
| 1 | LOAD 1, M20 | RX | RUA1 → 5 | — |
| 2 | ADD 1, M21 | RX | RUA1 → 4 | — |
| 3 | SUBTRACT 1,2 | RR | RUA1 → 3 | RUM2 → 000 |
| 4 | SHIFT 1, RIGHT TWO | RS | RUA1 → 2 | — |
| 5 | MULTIPLY 1,1 | RR | RUA1 → 1 | RUM1 → 000 |
| 6 | STORE 1, M22 | RX | RUA1 → 000 | — |

United States Patent Office 3,477,063
Patented Nov. 4, 1969

3,477,063

CONTROLLER FOR DATA PROCESSING SYSTEM

David W. Anderson and Francis J. Sparacio, Poughkeepsie, and Robert M. Tomasulo, Staatsburg, N.Y., assignors to International Business Machines Corporation, Armonk, N.Y., a corporation of New York Filed Oct. 26, 1967, Ser. No. 678,430
Int. Cl. G11b *13/00;* G06f *1/00, 7/00*
U.S. Cl. 340—172.5 20 Claims

ABSTRACT OF THE DISCLOSURE

A data processing system including an I-Box which decodes all instructions, executes certain instructions, partially executes other instructions by generating operand addresses and initiating storage access for such instructions, and issues instructions to other units of the system; an E-Box or execution device which receives its instructions from the I-Box and performs, among other things, fixed point arithmetic operations; a group of general purpose registers used in common by the I-Box and the E-Box for storing operands or components for generating storage addresses; and a control arrangement including counters and interlocks (1) which permits partial execution by the I-Box of certain instructions, (2) which is operated by the I-Box to prevent subsequently issued instructions which are dependently related to earlier instructions from being partially executed by the I-Box out of order, and (3) which is operated by the E-Box, upon completion of execution of such instructions, to remove the inhibition imposed on the I-Box.

CROSS-REFERENCES TO RELATED APPLICATIONS

Reference 1: Ser. No. 582,675, filed Sept. 12, 1966, by R. M. Tomasulo et al., and titled, "Execution Unit, With a Common Operand and Result Bussing System."

Reference 2: Ser. No. 581,052, filed Sept. 21, 1966, by D. W. Anderson et al., and titled, "Instruction Handling Unit for Program Loops."

Reference 3: Ser. No. 580,910, now Patent No. 3,418,-638, filed Sept. 21, 1966, by D. W. Anderson et al., and titled, "Instruction Processing Unit for Program Branches."

Reference 4: Ser. No. 579,082, filed Sept. 12, 1966, by R. E. Goldschmidt et al., and titled, "High Speed Adder."

Reference 5: Ser. No. 578,745, filed Sept. 12, 1966, by L. J. Boland et al., and titled, "Control System for Interleave Memory."

Reference 6: Ser. No. 576,401, filed Aug. 31, 1966, by R. E. Goldschmidt et al., and titled, Apparatus for Accumulating the Sum of a Plurality of Operands."

Reference 7: Ser. No. 576,157, filed Aug. 30, 1966, by R. E. Goldschmidt et al., and titled, "Multiplying Apparatus for Performing Division Using Successive Approximate Reciprocals of a Divisor."

Reference 8: Ser. No. 573,360, filed Aug. 18, 1966, by S. A. Calta et al., and titled, "Peripheral Data Exchange."

BACKGROUND OF THE INVENTION (1) This invention relates to data processing systems and more particularly to a control arrangement in such systems for increasing the rate of instruction execution, maintaining the correct order or sequence of instructions where so required, and at the same time minimizing the complexities of programming instructions from the programmer's point of view.

(2) In data processing systems heretofore the control arrangement for executing instructions has been, by the extensive nature of such systems, rather complex and in many cases massive. It is desirable that the control arrangement be constructed with as few parts as possible and be highly reliable in performance. It is further desirable that it perform instructions as rapidly as possible and execute instructions automatically, thereby to simplify the use of the data processing system from the programmer's standpoint.

In large scale data processing machines presently in use the controller or execution unit has become still more complex because a greater variety of functions have been added, and yet it is required to execute instruction at a greater rate than before since stringent requirements are imposed to meet the increased demand of data processing needs. To this end greater performance has been obtained in part, by using faster circuit components, higher pulse rates, and better logical design. Nevertheless, this is not adequate to satisfy current needs and it is to this problem that the present invention is directed.

SUMMARY OF THE INVENTION

It is a feature of this invention to provide an improved control or instruction execution arrangement for a data processing system wherein the system includes a plurality of independent units which may perform different instructions simultaneously, and two or more units of the system may use common data storage registers for holding operands, components of storage addresses, and the like which are customarily retained and used by such machines.

The data processing system herein has a plurality of units which are operated by different instructions simultaneously, and this is referred to as overlapped operation. Each unit of the system is provided with access to storage. The storage access time is relatively long compared to the basic machine cycle. In constructing a high performance overlapped system a prime objective is to keep each unit busy performing other useful functions simultaneously as it is accessing storage for data. In this connection it should be pointed out that an instruction execution entails (1) obtaining the instruction from storage, (2) obtaining any operand required by the instruction from storage, and (3) then executing the operation specified in the instruction using the acquired data. Since it is not possible to carry out such functions of an instruction concurrently, it is appropriate to set up a "pipeline" operation which is defined as one which attempts to carry on one or more of these functions for different instructions simultaneously. Such an arrangement permits instruction executions to be completed at a much higher rate once the pipeline is filled. This arrangement works extremely well as long as instructions at the beginning of the pipeline remain independent of those as yet in the pipeline, but not yet executed. When a dependent situation arises, it becomes necessary to take whatever action is required to insure that the logical end result is accomplished despite the pipeline or overlap arrangement. One example of this involves the situation wherein an address parameter is generated or altered by the execution of instruction *m*, after which such parameter is to be utilized as an address to fetch an operand by a later instruction *n–m*. Such a dependency between instructions is detected and appropriate action taken to insure correct results, according to one feature of this invention, by using appropriate interlocks which inhibit partial execution of dependent instructions out of order.

It is a feature of this invention to be able to execute instructions at a faster rate and more specifically to execute an average of one instruction per machine cycle. To this end the data processing system is divided into a plurality of independently operating units, and instructions are distributed to various units employed. This permits the various units to operate independently and simultaneously, the net result of which helps the average instruction execution rate to reach the goal of one instruction per machine cycle under optimum operating conditions. A machine cycle is relatively short in time compared to a storage cycle, and storage access time must be drastically reduced in order to supply instructions and data at the machine cycle rate. For this reason overlapped storage is employed. Overlapped storage may be defined as the concurrent operation of multiple storage modules. There is an interleaving of storage addresses within the multiple storage modules so that consecutive addresses reside in different storage modules. Storage interleaving increases the storage band width by enabling multiple accesses to proceed concurrently in different storage modules. This enhances the assembly line handling of the storage function whereby the data rate to or from storage, assuming buffering on the input and output, is made equal to the machine cycle rate. The depth of interleaving required to support a desired data rate is a function of the storage cycle time, the storage request rate, and the desired effective access time. The effective access time is defined as the sum of the actual storage access time, the average time spent waiting for an available storage module, and the communication time between the particular units of the system and the storage.

If an average of one instruction is to be executed per machine cycle, the storage and its communication system must provide data and instructions at a sufficient rate for this purpose. Furthermore, the instruction execution arrangement must be able to distribute, queue, and organize its resources at a rate consistent with the goal of executing one instruction per machine cycle. It is readily apparent that all of the processing required for any one instruction can not be completed in one machine cycle in all cases. Instead, as many as nine or ten instructions may be in various stages of processing at the same time where the pipeline technique is employed. In the system of this invention the I-Box serves as the principal coordinating element for the acquisition, distribution, and execution of the instructions by buffering both instructions and data. Since the I-Box issues instructions to other units of the system for subsequent execution, the situation often arises where a conflict might develop between instructions executed by other units and subsequent instructions decoded and partially executed by the I-Box. It is readily seen that the order of executing instructions might be changed because instructions earlier issued by the I-Box to another unit might be delayed in such unit before they are executed; whereas, in the meantime subsequent instructions may be decoded and partially executed in the I-Box before such earlier issued instructions are executed in such other unit. No problem arises if the instructions are independent of one another, but a problem does arise if the instructions are dependent upon each other. Such a dependency is detected, according to this invention, and appropriate interlocks are operated which inhibits partial execution of dependent instructions out of order. In one arrangement according to this invention the I-Box and one or more other units of the data processing system may use common data storage registers, and in this case it is readily seen that if data in the common storage registers is processed in the wrong order, erroneous results might follow. It is a feature, therefore, of this invention to adjust for such conflicts and yet provide a high overall rate of instruction execution.

In a preferred arrangement, according to this invention, a data processing system is provided which includes an I-Box which (1) decodes all instructions, (2) executes certain instructions, (3) issues the remaining instructions to other units of the system, and (4) partially executes some of the latter instructions by generating operand addresses and accessing storage before issuing them. An E-Box or execution device receives instructions issued to it from the I-Box, and the E-Box performs, among other things, fixed point arithmetic operations. A group of general purpose registers are provided for use by the I-Box and the E-Box. The general purpose registers may store operands for use by the E-Box, for example, and the general purpose registers may store components of generated addresses for use by the I-Box, for example. A control arrangement including appropriate interlocks is provided which (1) inhibits the I-Box from partially executing subsequent instructions which depend on address data which must be supplied or may be modified by earlier instructions issued to the E-Box and (2) removes the inhibition imposed on the I-Box when such instructions have been executed by the E-Box.

In a preferred arrangement according to this invention the control arrangement and interlocks includes a pair of counters associated with each individual general purpose register, one counter of which is incremented by the I-Box during instruction decode to prevent utilizing the content of the associated general purpose register for address generation purposes by the I-Box during subsequent instruction decode operations prior to its use by the E-Box in performing certain operations and the other counter of which is incremented by the I-Box during instruction decode to prevent modification of the content of the associated general purpose register by the I-Box during subsequent instruction decode operations prior to its content being utilized by the E-Box to perform certain operations. Circuit means is provided in the E-Box for decrementing either or both of the pair of counters upon completion by the E-Box of instructions using associated general purpose registers. Circuit means is provided in the I-Box (1) for sampling the content of any counter associated with selected general purpose registers during instruction decode, (2) for permitting partial execution of such instruction immediately by the I-Box if the content of the sampled counters represents a given state or condition, e.g. zero, and (3) for inhibiting execution of such instruction by the I-Box if the content of the sampled counters does not represent a given state or condition. Thus the E-Box and the I-Box may use a common set of general purpose registers without altering the order of instruction execution, yet with a minimum of delay in program performance.

Accordingly, it is a feature of this invention to provide an improved control arrangement for a data processing system which uses the pipeline technique to increase the rate of instruction execution and at the same time maintain the proper sequence in executing dependently related instructions.

The foregoing and other objects, features, and advantages of the invention will be apparent from the following more particular description of a preferred embodiment of the invention as illustrated in the accompanying drawings.

BRIEF DESCRIPTION OF THE DRAWINGS

FIGURE 14 illustrates a sample program and the action which takes place in the I-Box.

FIGURE 15 illustrates the sample program shown in FIGURE 14 along with the action which takes place in the E-Box.

DESCRIPTION OF THE PREFERRED EMBODIMENT

Introduction.—In the ensuing description the general system is described first and then the component subsystems are described. The various parts of the description are given appropriate titles. Copending applications set forth above are referred to at appropriate places in the following description, and they are incorporated simply by their reference number listed above for convenience.

GENERAL SYSTEM

Figure 1:
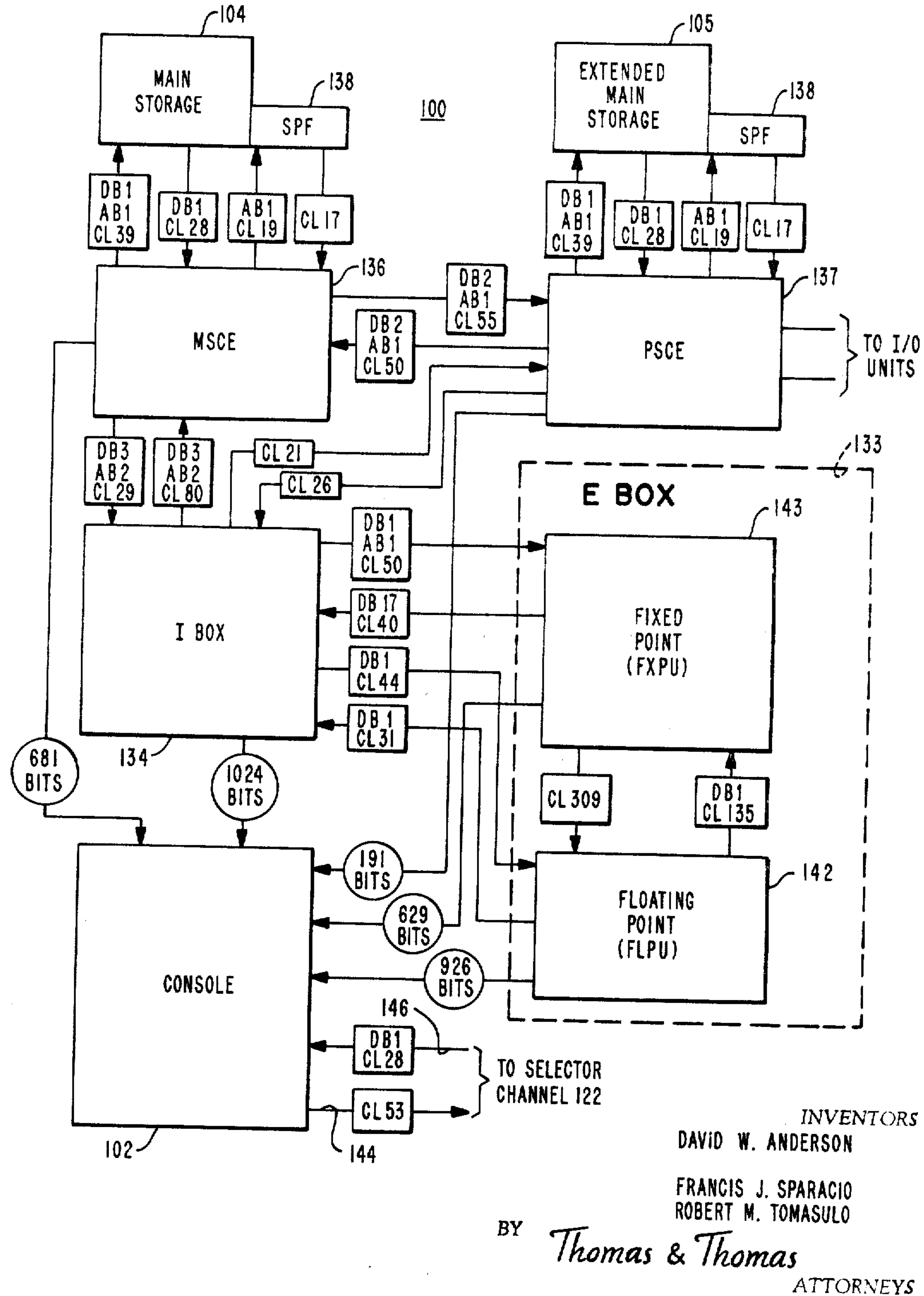
FIGURE 1 illustrates in block form a data processing system according to this invention.

Reference is made to FIG. 1 which illustrates in block form a system according to the present invention. The system in FIG. 1 is basically the central processing unit for a large scale data processing system, and it includes five functional sections connected by information carrying circuits and by control signal circuits. An E-Box 133 has one section 142 which is used primarily for computations involving floating point numbers and a second portion 143 which is used mainly for arithmetic operations on fixed point numbers as well as logical or arithmetic operations on variable length alphanumeric operands.

The major data and control paths between the various units in FIG. 1 are depicted with lines which include an arrowhead to indicate the direction of data flow or the direction of control, and the lines include a rectangular or circular block with a legend therein to indicate the number of control lines or the number of binary bits in the data flow path. The legend uses CL for control lines, AB for address buses where each address bus has 24 lines, and DB for data buses where each includes 72 bits or 8 bytes of 8 bits and 1 parity bit each. The numbers used with the legends referring to control lines (CL) indicate the number of such control lines, and the numbers used with the address buses (AB) or the data buses (DB) arbitrarily indicate the number of such bus. In some instances the enclosed legend merely indicates the number of bits involved.

A maintenance and operator's console 102 in FIG. 1 receives data and control information from the remaining units in FIG. 1. The inputs to the console 102 are primarily individual data bit lines from the various units. Note, for example, that there are 926 bits which are received from the floating point unit 142, 629 bits from the fixed point unit 143, 1024 bits from the I-Box 134, 681 bits from the main storage control element (MSCE) 136, and 191 bits from the program storage control element (PSCE) 137. These bits are used for indication purposes. In addition a further group of 53 lines, designated by the reference numeral 144, convey information from the console 102 to a selector channel 122 whereby the console may communicate with the selector channel. Also, 28 control lines (CL 28) and 72 data bits (DB 1), constituting a total of 100 lines which are designated by the reference numeral 146, connect the selector channel 122 to the console 102, and they permit the channel to communicate with the console. Thus the lines designated generally by the reference numerals 144 and 146 provide two-way communication between the console and the selector channel 122.

INSTRUCTION UNIT

The instruction unit (I-Box) 134 performs under the control of instruction words of a program, and its serves the following assignments:

(1) Fetching and buffering of the stream of instructions.
(2) Partially decoding instructions and issuing or transferring them to the proper execution unit.
(3) Fetching of operands to the execution units.
(4) Complete execution of branching, I/O and status switching instructions and partial execution of instructions requiring multiple operations.
(5) Handling of program interrupts.

Figure 2A:
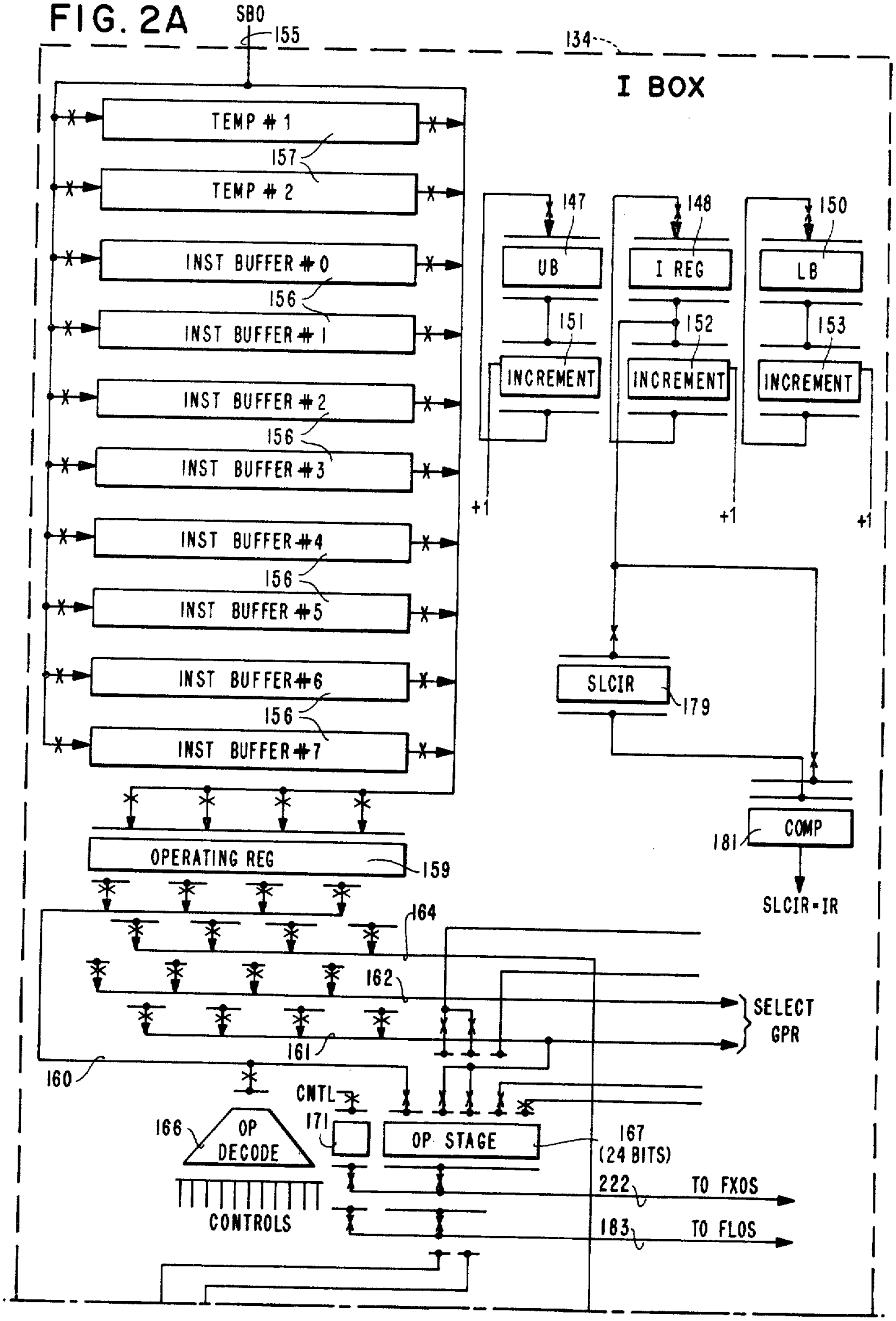
FIGURE 2*a* and 2*b* illustrate in detail the I-Box shown in block form in FIGURE 1.

The first assignment, instruction fetching, is under the control of three registers which are shown in FIG. 2*a* as the upper bound register, (UB) 147, the instruction register (I Reg.) 148, and the lower bound register (LB) 150. Each of these three registers has an associated incrementer unit 151, 152, and 153 which always has an output signal representing one more than the value held in the associated register. When the incremented output is fed back into a register, the register assumes the incremented value which then passes to the associated one of the incrementer units 151, 152 or 153 to raise its output to the next higher value. Thus each time the output of the associated incrementer unit is gated into its associated register, the register value increases by the quantity of one.

Instruction words from storage are double words of 72 bits each which are received by the I-Box 134 on a group of 72 lines forming a storage bus out (SBO) 155, and the instruction words are gated into a set of instruction buffers 156. A given instruction is stored in a selected one of the instruction buffers 0 through 7. Under some conditions an instruction word is stored in temporary buffer 1 or temporary buffer 2. The temporary buffers are designated by the reference number 157. The first fetched instruction word is stored in one of the instruction buffers 0 through 7, the selection being designated by the value of the three lowest order bits of the double word address of the fetched word. In a typical program successive fetched instruction words have sequential instruction buffer address, and the fetched instruction words are therefore stored in successive ones of the instruction buffers 0 through 7. Once all of the instruction buffers are filled, the next fetched instruction word will have an address in the three lowest order bits of the double word address of 000, and the fetched instruction word in this instance is stored in the 0 instruction buffer 156.

Initially all instruction buffers 156 are considered to be empty, and likewise the upper bound register 147, the I register 148 and the lower bound register 150 are considered to be empty. The starting address of the program is placed in the upper bound register 147, the I register 148 and the lower bound register 150, and a fetch is immediately initiated using the address in the upper bound register 147. On the next machine cycle a second fetch is initiated using the address from the incrementer 151 which address is also placed in the upper bound register 147. A third and fourth fetch operation are performed on the next two machine cycles by successively incrementing the upper bound register 147 on each fetch operation. After four fetch operations the content of the upper bound register 147 has a value which is three higher than the starting address which is held in the I register 148. The content of the upper bound register 147 indicates the address of the last word fetched. The destination of a fetched word is sent out on the machine cycle before the word is transmitted, and in this instance the input gates to the instruction buffer 156 having the address corresponding to the lowest three digits of the storage address will be selected to put the returned word into the appropriate one of the instruction buffers 156. The operating register 159 is initially empty and the first fetched instruction word is gated into this register Operating register 159 is controlled to receive instruction words from any one of the instruction buffers 0 through 7 or from either of the temporary buffers 1 or 2 or the storage bus out (SBO) 155. The operating register 159 holds the current instruction word for decoding and control purposes, and it also holds enough of the next instruction word or words to fill up its double word capacity. Successive instruction words are placed in the successive instruction buffers 156 as they are received. In the particular arrangement shown in FIG. 2 instructions may have a length of 16, 32 or 48 bits. The operating register 159 has an elaborate array of gates connected thereto. On the input side there are four sets of 16 bit gates which permit any one or more of the 16 bit positions of register 159 to be loaded independently. Initially the entire 64 bits of the first instruction on the SBO 155 are loaded into the operating register 159. Since decoding may start at any of the four positions of this instruction, it is clear that the current instruction address in the I register 148 needs two low order bits, in addition to the fetch address, to select the proper part of the instruction word in the register 159 to be decoded. One or more of the 16 bit groups to the left in the operating register 159 may belong to a different program which must not be decoded. The two low order bits in the I register 148 prevent the operating register from decoding undesired instruction of a different program. Additional bits of the current program are gated into the operating register 159 to replace the undesired bits of a different program when the second instruction word is fetched over the SBO 155. Thereafter, as instructions are used from the operating register 159, it is refilled from the instruction buffers 156 to maintain the operating register 159 filled with unexecuted instructions of the present program.

Among the out gates from the operating register 159 is the operating code set of four groups of eight gates supplying a bus 160 of eight lines. Since the current operating code is always the left most eight bits of an instruction in the operating register 159 and the instruction can start at any of the four positions within the operating register 159, the lines 160 are connected through the associated gates to the left eight bits of each group of 16 bits.

Storage addresses within instruction words may be in either of two formats. First are instruction for those operations requiring only the use of some of the general purpose registers (GPR's), to be described later, and designating one or two GPR's in the second group of eight bits of the first 16 bits of the instruction. These addresses are gated out of the appropriate positions to a bus 161 of eight lines. In the other format a storage address is set out in the second or third group of 16 bits of a longer instruction, and it includes four bits specifying a GPR which contains a base address and 12 bits specifying the displacement of the wanted address from the base address. The four bits for the GPR selection will, for this format, be gated out of the selected position to a bus 162 which has four bits. The accompanying bits of the address will be gated on a twelve bit bus 164 into a storage buffer 165.

The operation code portion of an instruction in the register 159 is gated out on the bus 160 into an operation decoder 166 under control of the two low order bits of the I register 148, which has been mentioned above, identified the location of the current instruction within the register 159. The two highest bits of the operation code specify the instruction format, and they control the read out of the address portion of the instruction to buses 161, 162 and 164. For a 16 bit instruction the address or addresses on the bus 161 normally specify GPR's which contain oeprands for an operation within the E-Box 133, and such signals are transmitted to the E-Box 133 along with operation control signals from the decoder 166.

Figure 2B:
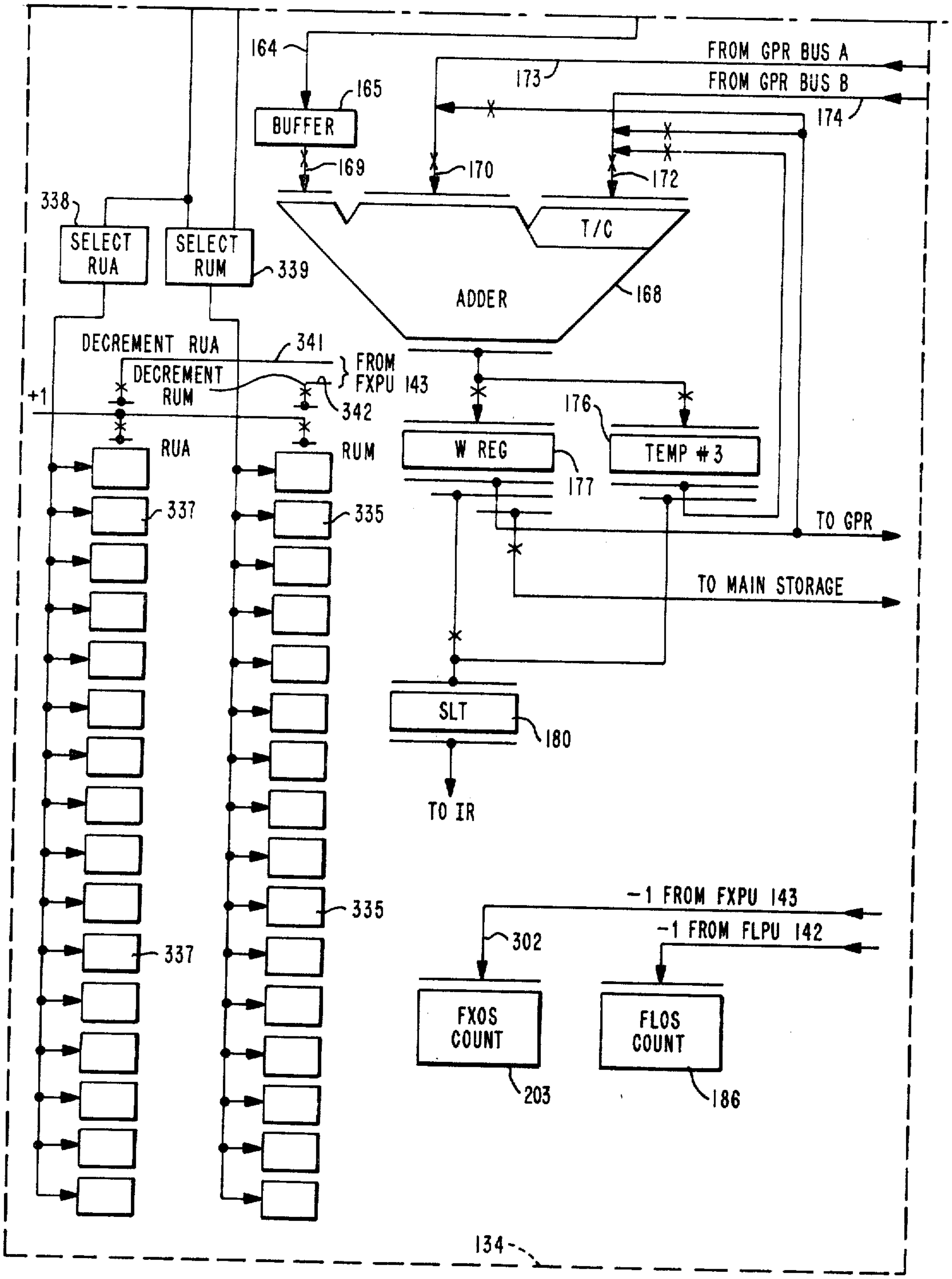

For a medium length instruction, 32 bits in length, the second half of the first 16 bits may still specify, a GPR, the contents of which is an address in the main store 104 in FIG. 1 or extended main store 105, for example, and such address may require modification in an I box adder 168 in FIG. 2*b*. The adder 169 has three inputs which are to be added together to produce the effective address of the operand to be fetched. One input 169 is 12 bits wide and is supplied by a buffer 165 which is loaded with the displacement part of the address directly from the operating register 159 in FIG. 2*a*. The base part of the address may include up to 24 bits which are stored in a GPR and gated into a second input 170 of the adder 168 in FIG. 2*b* under control of the address on the bus 162. Another factor of the effective address is to be found in an index register which also is a GPR. A given GPR is selected by signals on the bus 161, and the content of the selected GPR is transmitted to the third input 172 of the adder 168 in FIG. 2*b*.

It is pointed that the GPR's are arbitrarily located in the fixed point unit 143 in FIG. 1 and not in the I-Box 134. As the time required to send a gating signal to the GPR's and receive their stored value is substantial and entails at least a loss of one machine cycle in the time required to generate an effective address, the numbers stored in the GPR's are made immediately available to the I-Box 137 by extending "hot" lines, indicated in FIG. 2*b* as GPR bus A, which is designated by reference numeral 173 and GPR bus B which is designated by reference numeral 174, into the I-Box from the GPR's with gates disposed at the I-Box end of these buses. When a value in a GPR is needed, it may be immediately gated into the adder 168 in FIG. 2*b* despite the physical distance separating the GPR's from the adder 168. The only exception to the immediate availability of the GPR data arises when a value to be stored in a GPR is generated in the adder 168, and it is needed in the next machine cycle. In this case there is not sufficient time for the value to be stored in the GPR and the output returned on the buses 173 or 174 without losing a machine cycle. This exception is sensed in the I-Box 134 and is compensated by providing a third temporary register 176 in FIG. 2*b* which is loaded from the output of the adder 168. Whenever the I-Box 134 determines that the address of a required GPR is the same as that one which has just been loaded from the adder 168, the value stored in the temporary register 176 is gated to the adder 168 instead of the signals appearing on the associated GPR bus 173 or 174. Another register 177, termed the W register, also receives the output of the adder 168, and its contents may be gated out to the GPR' or to the main store 104, if immediately required.

OPERATION OF THE INSTRUCTION UNIT

In the operation of the I-Box structure thus far described it is seen that during the initial stage the upper buffer 147 in FIG. 2*a*, the I register 148, the lower bound register 150 and all instruction buffers 156 as well as temporary buffers 157 are cleared of significant values. The address of the starting instruction is loaded into the upper bound register 147, the I register 148 and the lower bound register 150, and instruction fetching is started by requests for double words from the addresses in the upper bound register 147. The upper bound register 147 is incremented at each fetch operation so that it always records the address of the last instruction fetch requested. The upper bound register 147 initiates fetch operation of instruction words until it is three word addresses ahead of the address in the I register 148 for a total of four initial words. When the first word returns it is gated into a selected one of the instruction buffers 156 in FIG. 2*a* or into the operating register 159 where the two lowest order bits of the I register 148, which have no address function in a fetch operation, control the read out of the initial half word instruction of 16 bits to the operation decoder 166, the GPR's, etc. As soon as the first instruction is processed by either execution in the I-Box, or by being transferred to another unit for execution, the address in the I register 148 in FIG. 2*a* is increased by the length of the last instruction, and this length is indicated in the first two bits of the instruction. They signify the location of the first part of the next instruction. At this time the used or executed instruction half words in the operating register 159 are replaced by instruction half words of the next instruction word from a selected one of the instruction buffers 156. Thus, there are available at all times in the operating register 159 at least the operating code part of the next instruction, and the remainder of the next instruction is available in an instruction buffer and can be loaded in the operating register 159 simultaneously as the operating code is being decoded in the operation decoder 166.

Each time the I register 148 in FIG. 2*a* is incremented to cause a carry from the two low order bits into a higher order bit, it signifies that another double word instruction has been completely utilized so far as the I-Box is concerned and that decoding has moved into a new instruction word. Since the upper bound register 147 is not now three double addresses ahead of the I register 148, a fetch of the next instruction is called for, and the upper bound register 147 again is incremented to be three ahead of the I register 148. The lower bound register 150 has, in the meantime, remained at the address of the first instruction word placed in the instruction buffers 156. When the upper bound register 147 is eventually incremented so that it calls for a fetch into the same instruction buffer where the first instruction word was stored, the address in the lower bound register 150 is incremented to signify the next higher address. Thus the upper bound register 147 contains the address of the last instruction word which has been used to initiate a fetch operation; the I register 148 contains the address of the instruction word being decoded; and the lower bound register 150 contains the address of the oldest instruction word remaining in the instruction buffers 156. These operations continue in this order until a branch operation of some type is reached. For a branch which forms a short enough loop so that the loop is contained in the past history of instruction words currently stored in the instruction buffers 156, as determined by a comparison of the address of the branch location with the address in the lower bound register 150, the I-Box 134 is set into the "loop mode" with the branch address specified in the current branch instruction.

In the loop mode the address in the lower bound register 150 is set to the target address of the branch instruction, and the lower bound register 150 is maintained or frozen in that state so long as the I-Box continues in the loop mode. This insures the preservation of all instruction addresses in the loop mode. It is possible also to generate a loop mode state of the I-Box if the target address of the branch instruction is not contained within the instruction buffers 156 provided the target address of the branch instruction is less than eight full double words prior to the address of the present instruction. In such case the entire loop can be stored within the storage capacity of the instruction buffers 156. Upon detection of a loop of this type, where the branch address is within eight double words of the address in the I register 148 but is not at this time contained in the instruction buffers 156, an initialization of the I-Boxes is started. Here the branch address of the instruction is placed in the upper bound register 147, the I register 148 and the lower bound register 150 to start instruction fetching as described above. In the loop mode the lower bound register 150 is maintained or frozen at the starting address, and the upper bound register 147 is permitted to increase to completely fill the instruction buffers 156 with the loop mode instructions as soon as the necessary machine cycles become available after the four machine cycles required for the initial instruction fetches and after such operand fetches and other storage operations, which may have a higher priority, have been completed.

In either type of loop mode operation, the complete instruction loop is contained within the instructions stacked in the instruction buffers 156, and such instructions are decoded and transmitted to the E-Box 133 for execution without any need for continuous fetching of the instructions of the loop from the main store 104 or the extended main store 105. It is pointed out that any branch instruction which leads to an instruction loop is a branch on condition type of instruction, for otherwise the machine would be locked into an unending loop. The operation of the I-Box 134 for all branch on condition instructions is substantially the same unless the instruction leads to the first type of loop mode where the target address of the instruction is already in the instruction buffers 156. No problem arises in the I-Box where there is an unconditional branch instruction or a conditional branch instruction in which the condition for the branch has occurred prior to the decoding of the instruction in the operating register 159. The target address of a branch instruction involving an unconditional or predetermined conditional branch is placed into the upper bound register 147, the I register 148 and the lower bound register 150 as soon as it is determined through the adder 168 and the condition, if any, is tested and a positive determination to branch has been made. Thereafter the I-Box 134 proceeds in the same manner as initially described.

If, however, a branch operation is dependent on a condition which has not been determined when a branch instruction is decoded, the I-Box must proceed in a manner which offers the best chance of avoiding loss of time. In this case the I-Box assumes that the condition, when determined, will not be met, and it continues to decode and transmit for execution the succeeding instructions. It does, however, set up a condition test circuit which is activated when the condition has been determined, and it pauses long enough to call for two storage fetches starting at the target address of the conditional branch operation. These two instruction words are stored in buffers 1 and 2 of the temporary buffers 157 in FIG. 2*a* when they are returned, and these two instructions are available immediately if the conditional branch subsequently materializes. Furthermore, the instructions issued to the I-Box 134 or the E-Box 133 after the conditional branch instruction is decoded are accompanied by a conditional tag which prevents execution of these instructions so long as the tag is present since the I-Box does not know if the branch is to be taken or not. When the condition on which the branch depends is determined, such conditionally tagged instructions have their tags removed if the condition is not met. If the condition is met, the conditionally tagged instructions are cancelled and not used. If the condition of the branch is not met, the instructions in the temporary buffers 157 are cancelled, or if they have not been received from storage, these instructions will be blocked at the gates which lead into buffers 157. If the branch condition is met, then the word in buffer 1 of the temporary buffers 157 is transferred into one of the instruction buffers 156 and subsequently into the operating register 159 for decoding and execution. The storage address of this instruction word is placed in the upper bound register 147, the I register 148 and the lower bound register 150, and this address determines which one of the instruction buffers 156 is selected to store the instruction word. The instruction word in buffer 2 of the temporary buffers 157 is next transferred to the next adjacent one of the instruction buffers 156, and the upper bound register 147 is incremented. Control is then transferred back to the upper bound incrementer 151 which now points to the branch address plus two. Further instruction fetching proceeds, if needed, to fill up the remaining six instruction buffers with new instructions, as described earlier.

If, however, the conditional branch sets up an instruction loop which can be contained within the storage capacity of the instruction buffers 156, the I-Box 134 proceeds for the first iteration in the same manner as described above, but additionally it is set into the loop mode to prevent the lower bound register 150 from exceeding the target address of the branch until the condition of the branch has been determined. If, on the other hand, the lower bound register 150 has already exceeded the target address of the branch, then the first loop instruction has been dropped from the buffers 156. In this case the I-Box is set into the loop mode, and it then proceeds as in any other branch, namely the target instruction is fetched into the temporary buffers 157, as described above.

So long as the I-Box 134 remains in the loop mode, there are not additional instructions fetching operations from the main store 104 after the instruction buffers 156 have been filled with eight words starting at the branch target address until after the branch condition ceases to be met at the branch point or the target address changes. It is normally assumed, as pointed out above, that a conditional branch operation will not take place, and the I-Box issues instructions along the main path with conditional tags which prevent their execution until after the conditional instructions are cancelled; the loop mode is mode, however, the alternative assumption is made that the branch will be made and the conditionally issued instructions will be in the branch back to the loop. They are, nevertheless, still tagged conditionally, and they are not performed until the condition precedent is determined. When the branch condition is no longer met, any such conditional instructions are cancelled; the loop mode is set off; and new instructions are issued along the main path. The lower bound register 150 is released or unfrozen and the upper bound register 147 immediately starts fetching new instruction words until the normal relationship between the values stored in the upper bound register 147, the I register 148 and the lower bound register 150 is reestablished as explained above.

It is possible to leave the loop mode or change to a different loop by some operation performed as a result of an instruction within a loop. It is recalled that when the loop mode is entered, the address of the branch target is generated in the adder 168 in FIG. 2*b* by summing the values in at least one GPR and the address displacement specified in the instruction which is stored in the buffer 165. If, during the processing of a loop, an instruction changes the values stored in one of the GPR's which was used to generate the branch address, the old address is no longer valid, and the branch instruction must be reprocessed to determine the new branch address. Such reprocessing of the branch address may be done at each iteration of a loop. However, this requires a full machine cycle, and is preferably to add some additional hardware to save this machine time. Such hardware comprises a save loop count instruction register (SLCIR) 179 in FIG. 2*a* into which is gated the address in the I register 148 when a loop mode branch is detected and a save loop target (SLT) register 180 in FIG. 2*b* which receives the target address of the branch when it is available from the adder 168. The save loop count instruction register 179 contains the address of the instruction which set the branch, and the save loop target register 180 contains the target address for the branch. Whenever a branch instruction is found in the loop mode, the setting of the I register 148 is compared in comparator 181 in FIG. 2*a* with the setting of the save loop count instruction register 179, and if they are found to be equal, the value of the save loop target register 180 is gated into the I register 148, thus saving one machine cycle. It is reiterated that loop instructions after the branch are not executed until the branch condition is subsequently determined.

The target address in the save loop target may be an error at the completion of an iteration of a loop if one of the GPR's has had its stored value changed since it was used to generate the address in the storage loop target register 180. In order to detect such a condition the address of the GPR's used to generate the address stored in the save loop target register 180 are preserved. The I-Box 134 monitors the activity of such GPR's and if there is any alteration of one of these monitor GPR's, the content of the storage loop target register 180 is considered invalid. Loop mode is therefore cancelled and a new branch address is generated in the same manner as the address was generated in the first loop iteration.

INSTRUCTION ISSUING

A second principal responsibility of the I-Box 134 is the issuing of instructions to the appropriate units for execution and the fetching of required operands from the main storage 104 or the extended main storage 105 in FIG. 1. This task is pipelined in three independent stages so that at any given time as many as three instructions may be in process in the I-Box with each instruction being at a different stage of processing. This pipeline type of operation naturally provides an improvement in the effective speed of the operation of the I-Box even though a particular instruction may be in process longer than the time needed to process a similar instruction with straight through hardware.

Assuming that there are no interlocks to hold up operation of the I-Box 134 in FIG. 1, the first pipeline stage gates out over the bus 160 in FIG. 2*a* the operation code (8 bits) of the instruction from a selected portion of the operating register 159 as determined by the two lower order bits in the I register 148. The operation code is supplied to and is decoded by the Decoder 166 to determine the type of operation to be performed, namely floating point, fixed point, or other type of instruction, and whether the execution unit will require operands from storage or not. For a floating point type of operation the I-Box will check to see if the floating point unit (FLPU) 142 in FIG. 1 can accept the instruction. The floating point unit (FLPU) 142 in FIG. 1 is analogous to a simple computer since it has an instruction stack to hold some instructions, floating point buffers to store operands, and some arithmetic and logic units to operate on the operands. If its instruction stack is full, the floating point unit 142 cannot accept the instruction from the decoder 166. If the instruction from the decoder 166 requires operands to be fetched from the storage 104 or storage 105 in FIG. 1, the I-Box 134 checks for availability of a floating point buffer register to receive the operands when fetched, and it checks the availability of the adder 168 in FIG. 2*b*. The adder 168 is not available if pipeline stage 3 is full, or if pipeline stage 2 is full and the main storage control element 136 in figure is not accepting addresses for storage fetches at this particular time. If any of these conditions is not met, the I-Box 134 in FIG. 1 stops until the condition is met. As soon as the I-Box 134 can proceed, the decoder 166 in FIG. 2*a* determines whether the I-Box is operating in the conditional mode i.e. whether a conditional branch has been previously decoded, whether the condition precedent to the branch has not been determined, and whether the operation will set a condition code signal.

As soon as the requirements to proceed are met, the I-Box 134 in FIG. 1 sends to the floating point unit 142 the following 14 bit signals:

1 Full/Empty—Sets tag to indicate valid instruction
1 Conditional Operation—Instruction not to be executed when bit is on 1 Condition Code—This instruction will set a condition code
6 Operation Code—Control the FLPU operations
2 Register Address—Designate the one of four registers having one of the operands
32nd Register Address—Designate a second register or a buffer having a second operand If the instruction is for a fixed point operation the I-Box makes similar checks of its own pipeline status and of the FXPU 143 status to detect any blocking conditions. As soon as there are no such conditions, the FXPU 143 receives a set of 24 bit signals as follows:

1 Full/Empty—Sets tag to indicate valid instruction
1 Conditional Operation—Instruction not to be executed when bit is on
1 Condition Code—This instruction will set a condition code
8 Operation Code—Controls the FXPU operations
4 GPR #1 Address—The location of operand #1
4 GPR #2 Address—The location of operand #2
3 Fixed Point Buffer—The address of the buffer register which is to have the source operand
2 Storage Address Register—Identifies a storage data buffer to receive a generated operand Since both the I-Box 134 and FXPU 143 can change the operands in the GPR's, an interlock is provided to prevent the I-Box from using these registers (1) when the FXPU has an issued but unexecuted instruction or (2) the GPR operand is to be used in an unexecuted operation. The structure for this interlock is associated with the GPR's and it is more fully described hereinafter. It includes, however, a register unavailable for addressing (RUA) counter 337 and a register unavailable for modification (RUM) counter 335 for each GPR. Every instruction in the I-Box which uses a GPR as a sink for data storage increments the associated RUA counter for that GPR, and the E-Box decrements the counter upon execution of the instruction. The I-Box 134 cannot use a GPR to generate an address until the RUA counter for that GPR equals zero, at which time the GPR holds the correct value for an address generation. Similarly, the associated RUM counter is incremented by the I-Box whenever an instruction is decoded which uses a GPR as a data source, and it is decremented by the E-Box when the instruction is executed. The I-Box is prevented from using such GPR in subsequent instructions until its stored data has been fully utilized by the E-Box. Only when both the RUA counter and the RUM counter of a GPR are zero can the I-Box use the GPR in a manner which would alter its stored value.

When the I-Box 134 decodes a branch on condition, it checks the condition code setting to determine which way to branch. Since there may be some instructions in the E-Box 133 which have not been executed and which may affect the condition code, the branch cannot be determined until the last instruction capable of changing the code has been performed. Each instruction issued by the I-Box 134 which can change the condition code includes a condition code bit, and it turns off all other set condition code tags in both the FXPU 143 and the FLPU 142. Thus, only one condition code tag is set at any given time, and this is the last one issued. The I-Box must hold off on determination of a branch until that condition code tag is reset.

The I-Box 134 continues to issue instructions tagged for conditional operation until that condition code tag is reset.

The I-Box 134 continues to issue instructions tagged for conditional operation until a branch is determined. Any such instruction may have a condition code tag set, but this does not reset the tag for the previously issued unconditional instructions. It will, however, reset the condition code tag on any previously issued conditional instruction so that one conditional instruction may have a set condition code tag also. When the conditional tag is cancelled on such an instruction, the presence of a set condition code tag immediately resets any condition code tag bits among the unexecuted instructions.

There are instructions which can be fully executed within the I-Box 134, such as the branching operations in the loop mode described above. In general, when the I-Box 134 encounters and I-Box instruction, it halts succeeding instruction processing until such instruction is completed, and for some instructions the I-Box may wait until all instructions in process, i.e. in the pipeline, are issued before it can proceed.

In pipeline stage two, address generation for the first of any required storage operands takes place. For this purpose the three operands in FIG. 2*b* on adder inputs 169, 170 and 172 are gated into adder 168, and the sum is gated to the working register 177. If the instruction is a store instruction, a quick check is made to see if the store can be to the storage address from which the next instruction now being decoded by OP decoder 166 was fetched.

In pipeline stage three the storage address of an operand is passed to and address buffer in MSCE 136 in FIG. 1, and in a store operation the address is also checked in the I-Box to detect if it is a store to an address from which an instruction fetch has already been made. If so, the I-Box stops for one cycle and orders a new instruction fetch from such storage address. The MSCE 136 has interlocks to insure that the store and fetch are executed in proper logical order.

EXECUTION UNIT

The execution unit (E-Box) in FIG. 1 may be considered as being divided into two almost independently operating sections (1) the floating point unit (FLPU) 142 and (2) the fixed point unit (FXPU) 143. Both receive instructions from the I-Box 134, and both are connected by data busses to the MSCE 136 for operand transfer. Next these units are described in greater detail commencing first with the floating point unit.

FLOATING POINT UNIT

Figure 3:
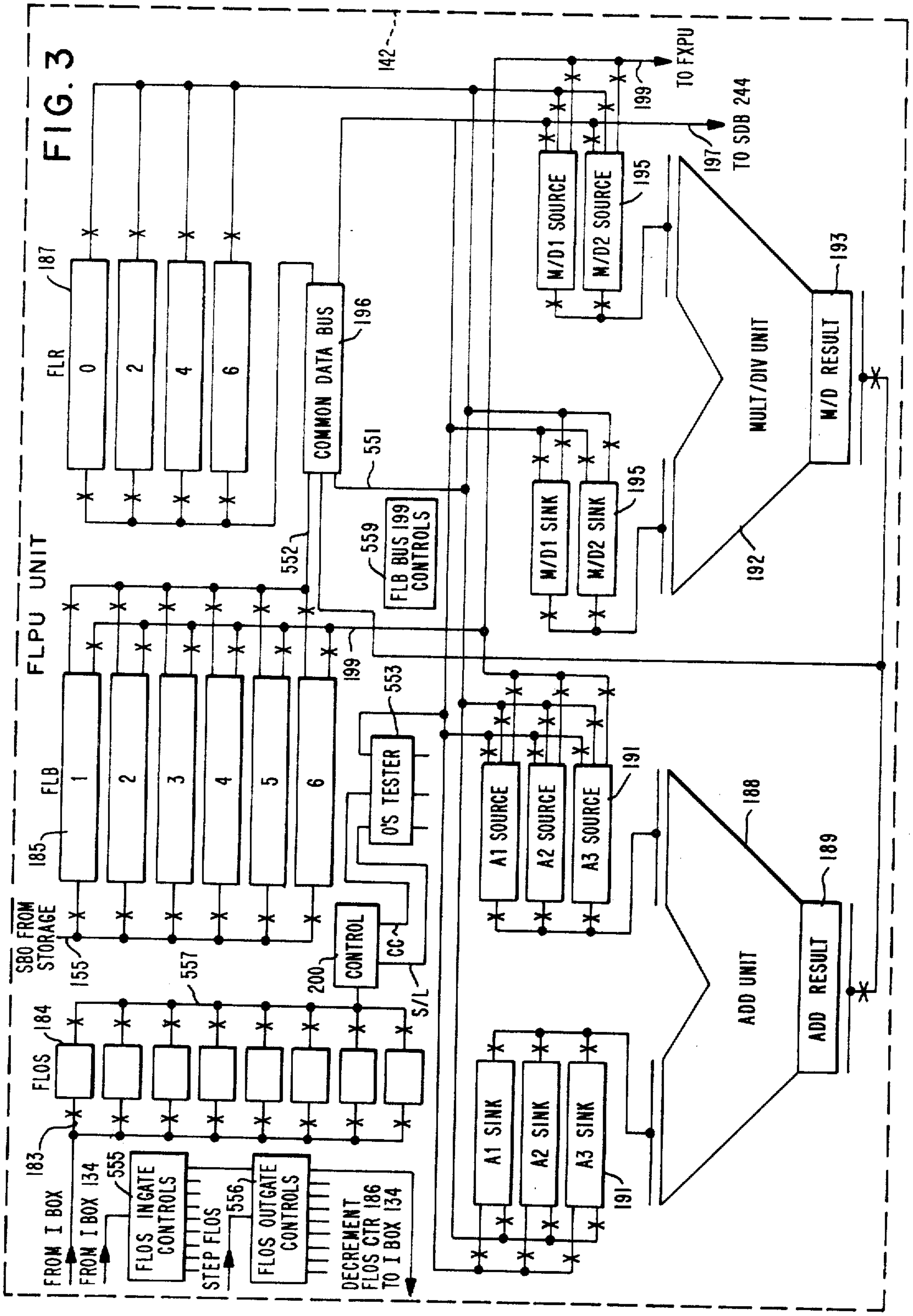
FIGURE 3 illustrates in detail the floating point unit shown in block form in FIGURE 1.

The overall data flow and instruction storage of the FLPU 142 in FIG. 1 is shown in detail in FIG. 3. The 14 bits of instruction signals from the I-Box 134 in FIG. 2*a* is received on the bus 183 in FIG. 3 and it is stored in the next available one of a set of eight registers, 14 bits each, which form a floating point operating stack (FLOS) 184. The I-Box may issue instructions for storage in FLOS 184 as long as the stack is not filled. The instructions in FLOS 184 are executed in a strict first-in first-out sequence.

The FLPU 142 also has a stack of six floating point buffer registers (FLB) 185 which store 64 bits each. Each of these registers is connected to the storage data out bus 155 to receive operands from main store or extended main store through MSCE 136. These operands are requested in advance from storage by the I-Box 134 as the instructions are decoded, and at that time the I-Box designates one of the FLB's 185 to receive the operand and transmits the address of the designated FLB to MSCE 136. The designated address, termed sink address, is the destination to which the fetched data is sent when it becomes available. Also the I-Box 134 sends this address to the FLOS register 184 along with the operating code to identify to the FLOS 84 where its operand is found. There is no requirement that the FLB's 185 be used in sequence for either receiving or transmitting operands.

There is also a stack of four 64 bit floating point registers (FLR) 187. These FLR's normally contain one of the operands for every instruction, and they are also the sink into which the result of an operation is placed.

An add unit 188 is provided to handle all floating point additions. This add unit 188 contains a full-carry-propagate, carry-look ahead type of adder in which the complete addition of two operands is made in one machine cycle with the sum latched in a set of add result latches 189. A floating point number consists of a fraction having an exponent with a base of sixteen as a multiplier factor. Since only fraction parts having the same exponent can be added or subtracted, it is necessary to compare the exponents of two addition operands and to right shift the fraction part having the lower value of exponent to align the fraction parts properly. This testing and shifting operation is performed in one machine cycle, and the aligned operands are set into latches for transmittal to the adder during the next machine cycle and latching of the result into latches 189. Thus, addition of two operands can be performed in two machine cycles, but as the output during the first cycle is set into latches, it is possible to gate the setting of the latches into the adder and at the same time to gate a second set of operands into the exponent comparing and fraction shifting stage for their preliminary handling. It is thus possible to have two sets of operands in adder 188 at the same time, and by such pipelining to produce results at the adder 188 output latches 189 at an effective rate of one per machine cycle.

To supply the operands required for such repetitive adder cycles, three sets of input buffers 191 are provided. Each set of input buffers includes two registers having 64 bits for storing a sink operand, 64 bits for storing a source operand and 10 bits for control purposes. The 10 bits for control purposes function as follows: (1) four bits serve as the address of the unit whose output is stored as the sink operand, all zeros indicating that the operand is from the FLR 187; and (2) a five bit address group indicates the address of the unit whose output is stored as the source operand, all zeros indicating that the operand is from the FLR 187, a setting of 10000 specifying that the operand is from the FLB 185, and a non-zero condition in the rightmost four bits specifying that the operand is from one of the other add or multiply-divide units; and (3) the remaining single bit, the S/L bit, is a part of the original instruction field in the operating stack 184, and it indicates whether the operation is to be performed with short or long precision, i.e., it controls the gating for the low order group of 32 bits.

The FLPU 142 also contains a multiply/divide unit (M/D) 192 for the multiplication or division of operands supplied thereto. The result of an M/D unit operation is temporarily held in a group of latches, M/D result 193. To keep the input of the M/D unit 192 supplied with operands, two sets of operand storage registers 195 are provided for each input to the M/D unit. This enables a new set of operands to be stored for the M/D unit 192 while a first set is being utilized in the unit. As in the add unit 188, there are ten register positions associated with a pair of registers 195, four positions to retain the address of the unit from which a sink operand is obtained, five positions to hold the address of the unit from which a source operand is obtained, and a short/long precision bit.

A common data bus (CDB) 196 is provided to transfer data between the inputs and outputs of the add unit 188, the M/D unit 192, and the FLR's 187. The CDB 196 is used to gate out the values in FLB's 185. Insofar as data is concerned the CDB 196 is an extensive set of gates feeding an output OR circuit whereby any selected input to the bus 196 may be connected to the output bus 197 which is common to all data receiving units including some register designated storage data buffers 244 in the MSCE 136 in FIG. 1. The CDB 196 also contains control circuitry to gate the units which are to utilize CDB 196 in accordance with a preselected priority. The FLB's 185 have first priority, and when they contain operands, they are gated out in sequence from the lowest numbered to the highest numbered one. When no operands are in FLB's 185, the add unit 188 has next priority for the CDB 196, and it is strictly on a first in-first out priority among the buffer registers 191 which have all of their needed operands. The M/D unit 192 has the lowest priority, and it can gate out its results with a first in-first out priority between its input registers 195 if both sets are ready at the same time. The first in-first out (FIFO) priority among the inputs of the add unit and the M/D unit allows staging of operations through these units in order to maintain a proper sequence of results, and it prevents any undue delay in supplying operand results.

When any unit requires the use of CDB 196 to transfer an operand, it transmits its request to the CDB priority circuit which, when on unit with higher priority is requesting the bus, returns an accept signal and transmits to every operand input circuit the address of the unit which is to place its operand on the CDB 196. It was noted earlier that each of the buffer registers 191 and 195 store the address of the unit which is to supply an operand, and such a register also is provided in the other units receiving data from CDB 196 such as the FLR's 187 and the SDB's 244 in the MSCE which is supplied by SDB 197. When the address of the transmitting unit appears on CDB 196, it is compared at every input with the stored address, and when an equality is detected, the receiving unit prepares to accept the operand. The CDB 196 gates out the selected operand to its output bus 197 on the next machine cycle at which time the receiving unit has its gates operated to receive the operand. On the same cycle which transfers an operand, the control section of the CDB 196 responds to a bus request and transmits on its address bus, the address of another unit which will supply the next operand on the bus in the next machine cycle. Thus the CDB 196 can transmit, at maximum efficiency, one operand in each machine cycle.

The FLB's 185 are provided on the right hand with direct access to the buffer registers 191 and 195 and the fixed point unit 143 by way of the buffer bus (FLBB) 199. Whenever an instruction in FLOS 184 indicates that an operand fetched to an FLB 185 is to be a source operand, the FLB, when it receives the operand, requests a time slot on the FLB 199. FLB 199 has controls similar to CDB 196, but they are simpler because the only priority is between the FLB's 185 according to their number. When an FLB's request for bus 199 is accepted, its address is sent to all receiving units and, as described above with respect to the CDB 196, on the next cycle the unit which is to receive the operand gates it in from FLB 199.

The FLOS 184 is a set of eight buffer registers holding the floating point instructions from the I-Box 134. It has a set of ingate controls 555 which can be set to control the gates progressively and transfer data from the bus 183 (from Box 134) to one of the FLOS registers 184. After an instruction from I-Box 134 has been stored in a FLOS register 184, the ingate controls 555 are stepped by a signal from the I-Box 134 to designate the next FLOS register 184 for ingating the next instruction. There is also an outgate control 556 which selects one of the FLOS registers for gating out to a bus 557 going to the control 200. After the instruction on the bus 557 is decoded by the control 200, a step flos signal steps the outgate controls to gate out the next FLOS register 184 to the control 200 for instruction decoding. Instructions are issued from FLOS 184 in the same order as received.

When the FLOS 184 is empty, the outgate control 556 is set to indicate the same FLOS register 184 as the ingate control 555 and that register, even though it is empty, is continuously outgated to the control 200. As soon as the first instruction is received from I-Box 134 on the bus 183, it passes through the FLOS register to the bus 557 and into the control 200 to be decoded in the same cycle as it is received. The ingate controls 555 are incremented as the instruction is received and the outgate controls 556 are stepped as the instruction is decoded so the outgate controls 556 cannot logically get ahead of the ingate controls 555. The FLOS counter 186 in FIG. 2*b* is incremented every time the I-Box 134 sends an instruction to FLOS 184. The FLOS counter is decremented by one every time the outgate controls 556 receive a step flos.

OPERATION OF FLOATING POINT UNIT

The FLPU 142 with its own stored program in FLOS 184 in FIG. 3, its own storage in FLB's 185 and FLR's 187, and its own execution units, add unit 188, and M/D unit 192 is essentially a small specialized computer under the overall control of the I-Box 134 in FIG. 1. Any instructions for the floating point unit are sufficiently decoded to identify that the instruction is for FLPU 142, and the operation part of the instruction is sent thereto. If the instruction also specifies the FLR's 187 in FIG. 3 as the source and sink of the required operands, these two addresses are also transmitted to FLPU 142. If, however, an operand from storage is needed, the I-Box 134 determines which of the FLB's 185 are available for use, inserts the address of the selected FLB 185 into the instruction sent to FLPU and includes the identification of the FLB as the sink of the fetch request sent to MSCE 136. These instructions are sent to and stored in FLOS 184 in sequential order.

When an instruction in FLOS 184 in FIG. 3 is ready for execution it is decoded in a control unit 200 on the output of FLOS 184 to determine what units are required for execution of the instruction. The full information for the instruction, i.e. OP code and 2 operand addresses, is transmitted to all execution units. Every execution unit which is not busy samples the transmitted information, and sampling continues on every cycle until it is selected for use. The sampling of the instructions comprises actually entering the control data from FLOS 184 into a set of latches and retaining it until the next set of control data is put on the FLOS output. When an execution unit is selected for the execution of an instruction, the operation codes already in its latches is retained or frozen in the control circuits of the selected unit, and the addresses which accompanied the OP codes remain in the selected buffer registers 191 or 195 or the SDB's. The execution unit is thereafter tagged busy, and it does not sample the control signals again until it has completed its operation and placed its result signals on the CDB 196. An execution unit may be considered to be an FLR 187 and a storage data buffer (SDB) or, for arithmetic operations, one pair of buffer registers 191 or 195 since any pair of these registers stores all of the operands required for an arithmetic operation. An arithmetic operation, with only rare exceptions, can start as soon as all operands are stored. It has actually been determined that the time saved by the provision of three separate add units and two separate M/D units instead of one add unit 188 with three sets of buffers 191 and one M/D unit 192 with two sets of buffers 195 is negligible or non-existent for most programs.

Before any execution unit can be selected for operation it is necessary to bring up a GO signal during a decode cycle. The conditions required for generation of a GO signal are dependent upon the operation to be performed, but they may include such tests as:

(1) A precision (S/L) match between an instruction and the data in a sink register.
(2) A precision (S/L) match between an instruction and the data in a source register.
(3) Is the execution unit available.
(4) Is the operation tagged conditional.
(5) Is the operation cancelled.
(6) Is the FLOS empty.

The next cycle of operation is the select cycle, and it comprises some combination of the following operations:

(1) Turn on execution unit's select trigger for one cycle.
(2) Set the unit busy trigger for the selected unit.
(3) Set the FLB name section of the address of the instruction into the FLB address part of the buffer 191 or 195 and turn on a GO when full (GWF) tag for the addressed FLB.
(4) Set the FLR part of the address of the instruction into the FLR address part of the buffer 191 or 195 and turn on a busy trigger for the FLR.
(5) Set a sink FLR outgate trigger.
(6) Set a source FLR outgate trigger.
(7) Step the operating stack to the next instruction.

During the decode cycle an execution unit receives the address of the unit which is to send it the required operand or operands, and such addresses are latched in when the unit is selected. During a select cycle of an arithmetic operation, the sink operand from the appropriate FLR 187 is put on the bus for receipt by the selected execution unit. If, however, the sink FLR has not yet received the operand from a unit, i.e. an FLB 185, the add unit 188 or M/D unit 192, it has its busy tag set, and it has in its control circuits the address of the unit which is to supply the operand to the CDB 196 for transmission to FLR 187. If the sink FLR 187 contains a set busy tag during the select cycle when its stored operand is to be transmitted, the FLR 187 instead transmits the address of the unit to supply the operand, and then it is set not busy. This address replaces the FLR 187 address sent to the buffer 191 or 195, so that when the execution unit which is to supply the operand puts its identification on CDB 196, the identification is recognized by the control circuits of the receiving unit which thereupon gate the operand into its buffer 191 or 195 on the next cycle. This scheme of transmitting the address of the operand supplying unit when the operand is not available is termed "forwarding," and it is evident it enables substantial time to be saved since in this arrangement it is not necessary to store the operand in the designated FLR 187 and then wait several cycles to transmit it to the using unit. An additional advantage is that the FLR 187 is free to receive a new operand as soon as it has transmitted the address from which its operand is to come.

If a second operand is also to be sent from an FLR 187, another select cycle takes place to transmit either the operand stored in the selected FLR 187 or the stored identification of the unit which is to supply the operand. When the source operand is from main storage, however, the operation is somewhat changed as the FLB 185 to receive the operand is assigned by the I-Box when the instruction is decoded in the I-Box. Now when the instruction is reached in FLOS 184, the control circuits 200 examine the addressed FLB, and if it is full on the first select cycle, it is gated out to the execution unit where the operand is to be used. If, however, the operand has not been received by the FLB, it is directed to GO when full (GWF), and it will put its operand on the FLB 199 after it is received and priority permits.

NON-ARITHMETIC FLPU OPERATIONS

The control 200 in FIG. 3 in conjunction with FLOS 184 can perform a number of operations without the use of an arithmetic execution unit. These operations include a number of variations, in either short or long precision, of a load routine such as load one FLR 187 from an FLB 185 or from another FLR 187, or load from one FLR to another and test for a zero, positive or negative condition of the operand. The operations also include a store routine to transmit an operand from a sink FLR 187 to an SDB by way of the CDB 196. None of these operations involve an arithmetic unit, and they simply transfer data unchanged. If the move operation is to load an FLR 187 from another FLR 187, the operand storage address is sent on the decode cycle, and the operand is sent on the next cycle. If, however, the sending FLR is tagged busy, its address register contents are forwarded to the receiving register's address register, and the sending one is reset to not-busy. When the sending device is an FLB 185, the FLB transmits over the CDB 196 if it is full; if not full, it is set to GO when full; and it transfers data when priority permits. The address register contents cannot be forwarded for these operations because the SBO 155 of the FLB's does not connect directly to the FLR's 187.

If the operation is a store operation, a similar sequence is followed except that the SDB in the MSCE 136 receives the operand from the FLR 187. The SDB is given the address of the source FLR, or the contents of the source FLR's address register is forwarded to it if the FLR is busy and has not yet received the operand.

FIXED POINT UNIT

Figure 4A:
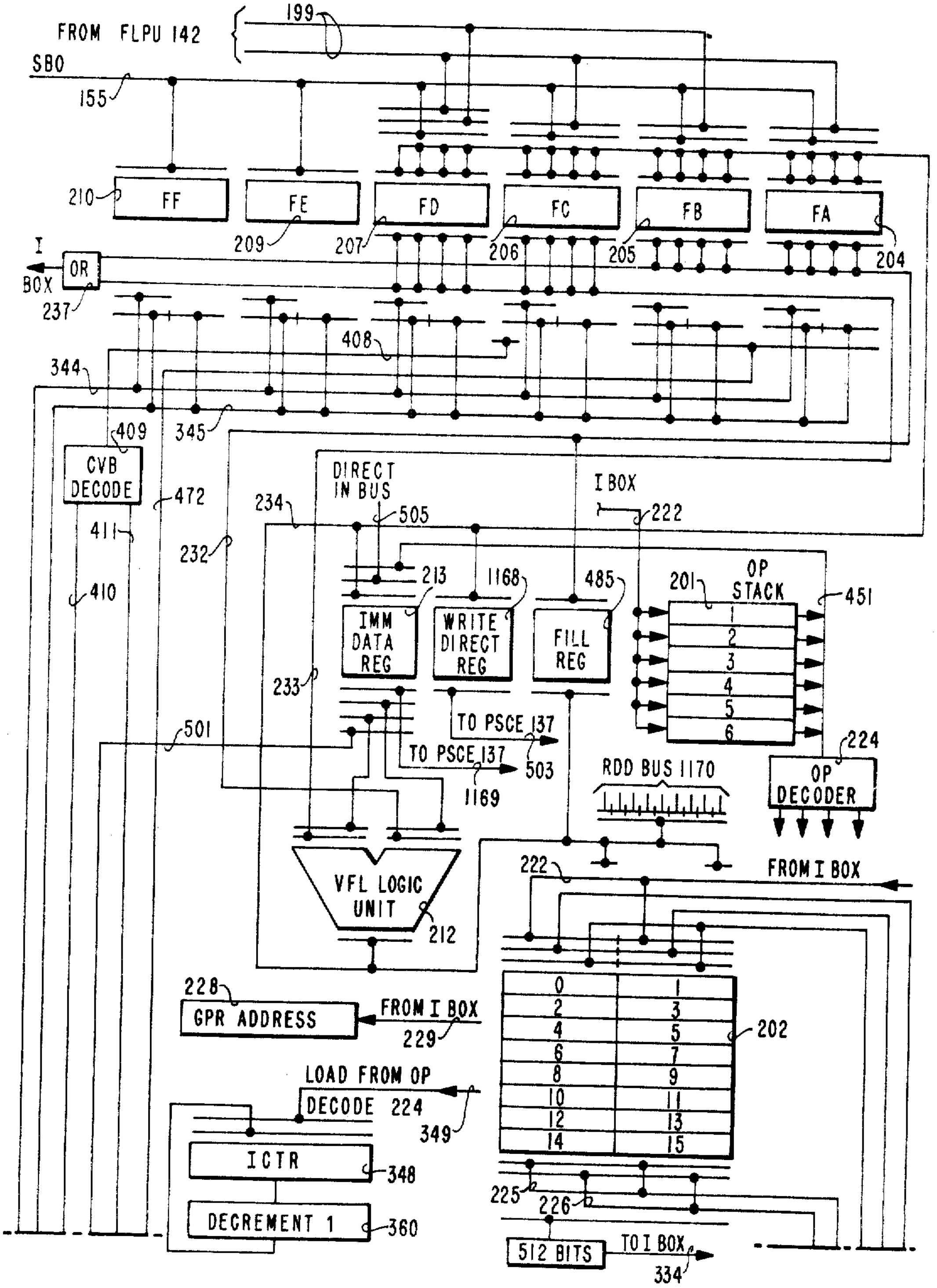
FIGURES 4*a* and 4*b* illustrate in detail the fixed point unit and variable field length unit in combination.
Figure 4B:
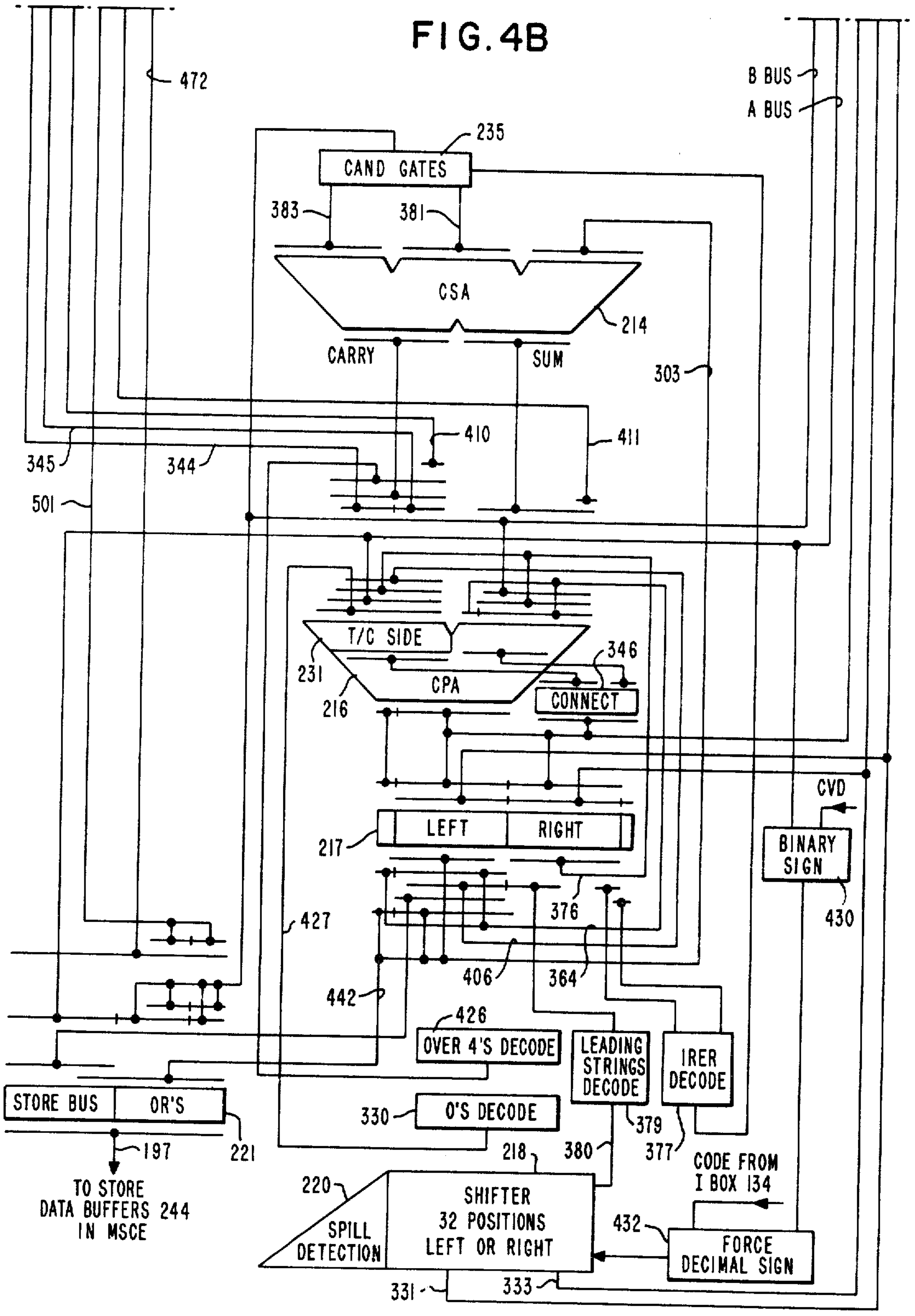

The fixed point unit (FXPU) 143 in FIG. 1 is a part of the E-Box 133, and it executes all operations using fixed point hexadecimal numbers and all variable length operands, alphabetic and/or numeric. The FXPU 143 comprises five functional units as indicated in FIGS. 4*a* and 4*b*. These units are: (1) an operation stack 201 for both fixed point and variable field length operations; (2) a group of 16 general purpose registers (GPR) 202 of 32 bits each and, as previously mentioned in the description of the I-Box 134, each is connected by "hot" lines to the I-Box GPR A bus 173 and GPR B bus 174; (3) six fixed point buffer (FPB) registers, FA through FF, individually referenced as FA 204, FB 205, FC 206, FD 207, FE 209, and FF 210; (4) a VFL logic unit 212 having associated with it an immediate data input register 213; and (5) a fixed point execution unit which includes a 36 bit, three input carry save adder (CSA) 214, a 38 bit carry propagate adder (CPA) 216 which can feed its output into either half of a 68 bit accumulator 217, and a shifter 218 on the output side of accumulator 217. Shifter 218 is capable of shifting the output signals to the right or to the left up to 32 bit positions, and it includes an overflow detector 220 to detect any significant digit loss on a left shift. A group of store bus Or's 221 can combine and funnel data, to be transferred from different units in the FXPU 143 to the storage data buffers in the MSCE 136, into the one bus 197.

The fixed point operating stack (FXOS) 201 contains six 24 bit buffer registers. The function of FXOS 201 is to receive micro-coded operation codes on an input bus 222 from the I-Box 134 and to issue the operation codes on a first in-first out basis to the Op decoder 224 for control of the fixed point/VFL operations.

The 16 GPR's 202 are used as the sink and source of the operands for most instructions. There are two full word output busses. A bus 225, and B bus 226, and only full words are gated from a GPR 202 to a bus 225 or 226. The GPR address register 228 is a nine bit register set from the I-Box 134 on bus 229 to control the address of the GPR which is the sink of an operation, and it controls the ingating of operands into the GPR's 202. A single byte (eight bits), a full word (32 bits), or a double word (64 bits) can be ingated on any cycle. An ingated byte is always stored in bit position 24 to 31, i.e. the right side of a GPR, and a double word is stored in an even-odd pair of GPR's, e.g. numbers 2 and 3, 4 and 5, etc.

The six fixed point buffers 204–210 are used during fixed point/VFL operations as sink and source data registers, and all operands from storage enter the FXPU 143 through these buffers. Four of the six buffers FA–FD are used for all multi-operation instructions, both fixed point and VKL, but the other two FE and FF are used only for fixed point operations. A buffer may have either the right or the left 16 bit half outgated to the left half of the left input of CPA 216, or the right half of the buffer can be gated into the right half of the same left input of CPA 216, or the right half of the bufler can be gated into the right half of the same left input of CPA 216, either alone or in conjunction with the gating of the buffer's left half into the remainder of the CPA input. It should be noted that this left input of CPA 216 has a T/C side 231 which may be set to cause entry of the operand (T) or its complement (C) for effective addition or subtraction of the operand.

For VFL operations the FA and FB buffers 204 and 205 may be used as one 64 bit sink register, and any byte may be outgated to the sink bus 232 of the VFL logic unit 212. The other two buffers FC and FD, 206 and 207, may be used as a 64 bit source register, and any byte may be outgated to the source bus 233 of the logic unit 212. A byte address register is associated with each buffer FA, FB, FC and FD. Those associated with FA and FC are three bits each to permit addressing any byte of the combined 64 bits of FA–FB and FC–FD, and those for FB and FD are two bits each to permit addressing any one of the four bytes in a register when it is used alone as a 32 bit register. Each address register may be incremented or decremented by a unit, and the data in the byte address register controls the bytes to be outgated to busses 232 and 233.

The carry save adder 214 is used only for multiply operations, and it has multiplicand gates 235 connected to two of its inputs to supply to one input all zeros or a one multiple or a two multiple of the multiplicand and to the other input all zeros or a four multiple or an eight multiple of the multiplicand. All multiples are the multiplicand operand with a zero, one, two or three bit position left shift, and any multiple can be supplied either plus or minus as required.

The carry propagate adder 216 has 38 bits on each input. It is used as a 32 bit adder for add and subtract operations and as a 36 bit adder for multiplication and division operations. It is used over its full width in convert to decimal operations. Only on the left input is a complement function available.

The accumulator 217 has 70 bits with a right 32 bits, a left 32 bits and a six bit left extension. It is used particularly in multiplication to buffer partial results. The outgating circuits go to the shifter 218 or back to the inputs of CPA 216. The CPA 216 input circuits are settable for a left shift of either one or three orders or for a right shift of four orders of only the left part and the extension. The outgating for the right part of accumulator 217 enables the value stored in the right half of the accumulator 217 to be sent to either input of CPA 216, to be partially decoded along with the left part for a string of leading zeroes in leading strings decoder 379, or to a multiplier decoder 377 which controls the multiplicand gates 235.

The shifter 218 spans a full 64 bits, and it is ingated from accumulator 217. For a multiply operation it can receive the right four bits of the six bit left extension. The input can be shifted to the right or to the left, and it can be shifted any extent up to 32 orders. Zeroes are filled in on the right or left end, and ones are filled on the left end when a complemented negative number is shifted. Any significant digit shifted to the left out of the effective output bus is detected as a spill.

The immediate data register 213 is linked to the VFL data flow, and it is also linked to the operation stack 201. Its primary function is to hold immediate data which is included in the instruction word. This register 213 may outgate to either input of the VFL logic unit 212.

The VFL logic unit 212 has the sink bus 232 and the source bus 233 as its two eight bits inputs, and it has the ability to AND, to OR, or to XOR (Exclusive OR) the two sets of inputs or to gate either input unchanged to the result bus 234.

The I-Box suplies data directly to the GPR's 202 in FIG. 4*a* by sending a 32 bit word, generally an address base, on a bus 236 and by specifying the GPR 202 to receive the data by selection signals sent on bus 229 to the GPR address register. The I-Box 134 receives signals by the 512 "hot" lines connected to the GPR's, and an eight bit OR circuit 237 drives a bus which can transmit any eight bit byte from the FXB's 204, 205, 206 or 207 to the I-Box 134.

The storage bus out (SBO) 155 is a 32 bit wide bus, and it carries a word from storage in response to a fetch request. Data on this bus 155 is preceded by the I-Box assigned address of the FXB into which the operand is to be stored. The detection of its address by an FXB 204–210 opens its ingates on the next cycle to allow the data to enter the selected FXB.

The floating point bus 199 of FIG. 3 comprises a 64 bit data part and a three bit address part to select an FXB as described above. Data is supplied on the bus 199 as a result of a request from the FXPU 143.

The store bus OR's 221 in FIG. 4*b* may be loaded with up to 64 bits of data to be sent to a storage data buffer (SDB) 244 not shown, in MSCE 136 in FIG. 1. The OR's 221 in FIG. 4*b* also are supplied the address of the SDB 244 to which the data is to be sent. The store bus OR's 221 may collect data from the FXB's 204–210, from the GPR's 202, or from the accumulator 217. Either one, two, four, or eight bytes of eight bits each may be gated through the store bus OR's 221.

FIXED POINT UNIT OPERATION

The primary purpose of the decoder 224 is to control the issuing of instructions from the operating stack 201. The instructions in FXOS 201 are microcoded with the left eight bits containing the Op code. As the instructions are processed certain signals must be sent to the I-Box 134 in FIGS. 2*a* and 2*b* to maintain up-to-date the I-Box counters indicating the status of the GPR's 202 and FXOS 201 in FIG. 4*a*. The RUA and RUM counters 337 and 335 in FIG. 2*b* are incremented as instructions are sent to the FXOS in FIGS. 4*a* and 4*b*, and during execution of these instructions the same counters are decremented to indicate that a specific GPR has just completed its function as a sink or a source field. The specific RUM or RUA counter decremented is indicated by the register address field of the instruction or the GPR sink address register 228 in FIG. 4*a*.

The I-Box 134 maintains the FXOS counter 203 in FIG. 2*b* at a count which indicates the number of unexecuted instructions in FXOS 201 in FIG. 4*a*. Each operation or instruction issued by the I-Box 134 to FXPU 143 causes the FXOS counter 203 in FIG. 2*b* to be incremented, and each operation or instruction executed by the Op decoder 224 in the FXPU in FIG. 4*a* sends a stack counter decrement signal on the line 302 to the FXOS counter 203 of the I-Box in FIG. 2*b*.

Fetches of all operands are requested by the I-Box when instructions requiring operands are decoded, and a specific FXB 204–210 in FIG. 4*a* or floating point buffer (FLB) 185 in FIG. 3 is assigned to receive the data. In general, all 32 bit operands are brought into the FXB's while 64 bit operands are sent to an FLB 185. Data in a given FLB 185 may subsequently be transferred on bus 199 to a given FXB in 32 bit words. The address of the assigned FLB or FXB is included in the operation code sent to FXOS 201. The I-Box 134 keeps track of the full or empty status of the FXB's and FLB's by setting a busy trigger when an FXB or FLB is assigned, and such trigger is reset by the operation decoder 224 in FIG. 4*a* when the data in the FXB or FLB is used. Also, address generation of operands, branches, etc., in the I-Box 134 takes place concurrently with the execution of operations in the FXPU 143. To prevent delay in the I-Box processing when fixed point operations are in process, the I-Box is given priority in making a store into the GPR's 202 in FIG. 4*a* even to the point of blocking fixed point/VFL processing if necessary. This priority is controlled by an ingate priority circuit which monitors all I-Box requests for GPR ingating, and as soon as the I-Box request for ingating is accepted, it blocks an ingate request from the FXPU execution units until the I-Box has completed its storing into the GPR's.

In the FXPU 143 the normal processing of operations in the FXOS 201 is in a serial manner. As an operation is issued to one of the execution units, fixed point or VFL, any data required from a FLB 185 is requested and assigned to an FXB 204–210. The FXB's are monitored to detect when all data fields are available to execute the issued operations.

While the execution of one instruction is in process in the execution units, the next instruction in FXOS 201 is decoded in the decoder 224, and this applies for the successive operations of a multiple operation instruction as well as for an operation which may be executed in a single cycle. Each succeeding operation is issued as soon as the data facilities for its execution are available. This is permissible to the extent that two or more operations may be executed simultaneously where they do not have overlapping hardware requirements.

Most operations for the FXPU 143 are single instructions of 21 bits. Bits zero through seven specify the operation code; bits eight through eleven identify a GPR 202 for the first operand; bits twelve through fifteen identify a second GPR 202 for a second operand; and bits sixteen through nineteen specify which FXB or FLB contains the operand to be sent to storage. Instruction formats and bit assignments are discussed more fully hereinafter.

The operations performed by the fixed point unit (FXPU) 143 in FIGS. 4*a* and 4*b* may be grouped into single cycle instructions and multiple cycle instructions. The single cycle instructions include the LOAD instructions in which all operands go through the adder 216 in FIG. 4*b*. The source register, either a FXB or GPR, is gated to the left input of the adder 216 and then back to the GPR sink register. If the LOAD instruction includes a test of the operand condition, the test is made at the adder 216 according to the instruction with the condition code being set in accordance with the result of the test. For a LOAD POSITIVE or LOAD NEGATIVE, the T/C gates 231 of adder 216 are conditioned to pass the operand, complemented or not, as required for the instruction. A LOAD COMPLEMENT instruction always complements the operand. The numeric operations, ADD, SUBTRACT, COMPARE, and the CONNECTIVES, require two operands each, and they have a GPR 202 as a sink operand storage. The source operand may be from either a GPR 202 source or from an FLB 204–210. For SUBTRACT and COMPARE instructions one of the operands is directed to the left input of adder 216 where it can be complemented as required. The CONNECTIVE instructions, i.e., AND, OR, and EXCLUSIVE OR, are performed within the adder 216 in a separate data path, and at the results are provided at the adder output. STORE operations route a data operand from the selected GPR 202 to store bus OR's 221 for transmittal to the MSCE.

The multicycle operations are either a fixed number of cycles, e.g. single word shifts, or they are data dependent as MULT, DIV, CONVERT TO BINARY, SHIFT DOUBLE WORD, etc. The RUM and RUA decrement signals and the FXB not busy signals are sent to the I-Box during the execution of these operations at times dependent upon the operation, and the FXOS 201 buffer register is released to the I-Box as soon as all data has been extracted from it, generally on the second execution cycle.

VARIABLE FIELD LENGTH OPERATIONS

The VFL execution unit 212 in FIG. 4*a* generally operates with alphanumeric operands having no fixed length. Such operands cannot normally be encompassed in a double word length. The operation generally involves one operand from storage and a second operand from either storage or a GPR 202. The VFL logic unit 212 operates for each cycle on a maximum of eight bits from each operand, and these eight bit bytes are supplied over the source and sink busses 232 and 233 from the FA–FB and FC–FD buffers. Since the length of storage in a buffer is eight bytes, it is necessary for the I-box 134 to keep these buffers filled until the whole of the VFL operands is utilized. The I-Box 134 issues an operation for each word to be used as either a source or a sink, refills each buffer as the data word therein is utilized, and indicates when the VFL operation is to terminate.

MAIN STORAGE CONTROL ELEMENT

Reference three above provides a description of the main storage 104, the extended main storage 105, the MSCE 136, and the PSCE 137, both as to their construction as well as their operation.

DETAILED OPERATION OF EXECUTION UNIT

As previously indicated with respect to FIGS. 3, 4*a* and 4*b* the execution unit 133 comprises two substantially independent units, the floating point unit 142 and the fixed point/VFL unit 143. The operating codes and other information are ingated from the Op stage latches 167 and the code and validity latches 171 of I-Box 134 in FIG. 2*a* over busses 183 and 222 to the appropriate FLOS 184 in FIG. 3 or FXOS 201 in FIG. 4*a*. No I-Box selection is needed for determination of the register of the stack which is to receive the instruction since the FXOS 201 and FLOS 184 are first in-first out stacks, and they automatically assign a received instruction to the next available buffer. The I-Box, however, does maintain a FLOS counter 186 and a FXOS counter 203 to keep track of the number of unexecuted instructions in each of the operation stacks 184 and 201. The I-Box 134 also orders a fetch of the operands from the MSCE 136 which are needed for the instruction it is issuing, and it calls for the return of these operands to specific ones of the floating point buffers 185 or the fixed point buffers 204–210. The selection of the FLB or FXB for assignment to an operand return is on the basis of an availability list kept in the I-Box 134. The list is updated by the I-Box and an execution unit as they are assigned to an operand and as the operand stored therein is utilized. Fetches are received on SBO 155 and gated into the sink register identified by the signals on the address part of SBO 155 in the preceding machine cycle. Stores are made by assignment of a storage address in main store 104 and a buffer in the MSCE 136. The address of the store and the identification of the register which contains, or will contain the data for storage, are inserted in a storage address register not shown, in the MSCE. As soon as the data is available it is gated into the assigned storage data buffer of the MSCE.

FIXED POINT/VFL EXECUTION UNIT

Figure 5:
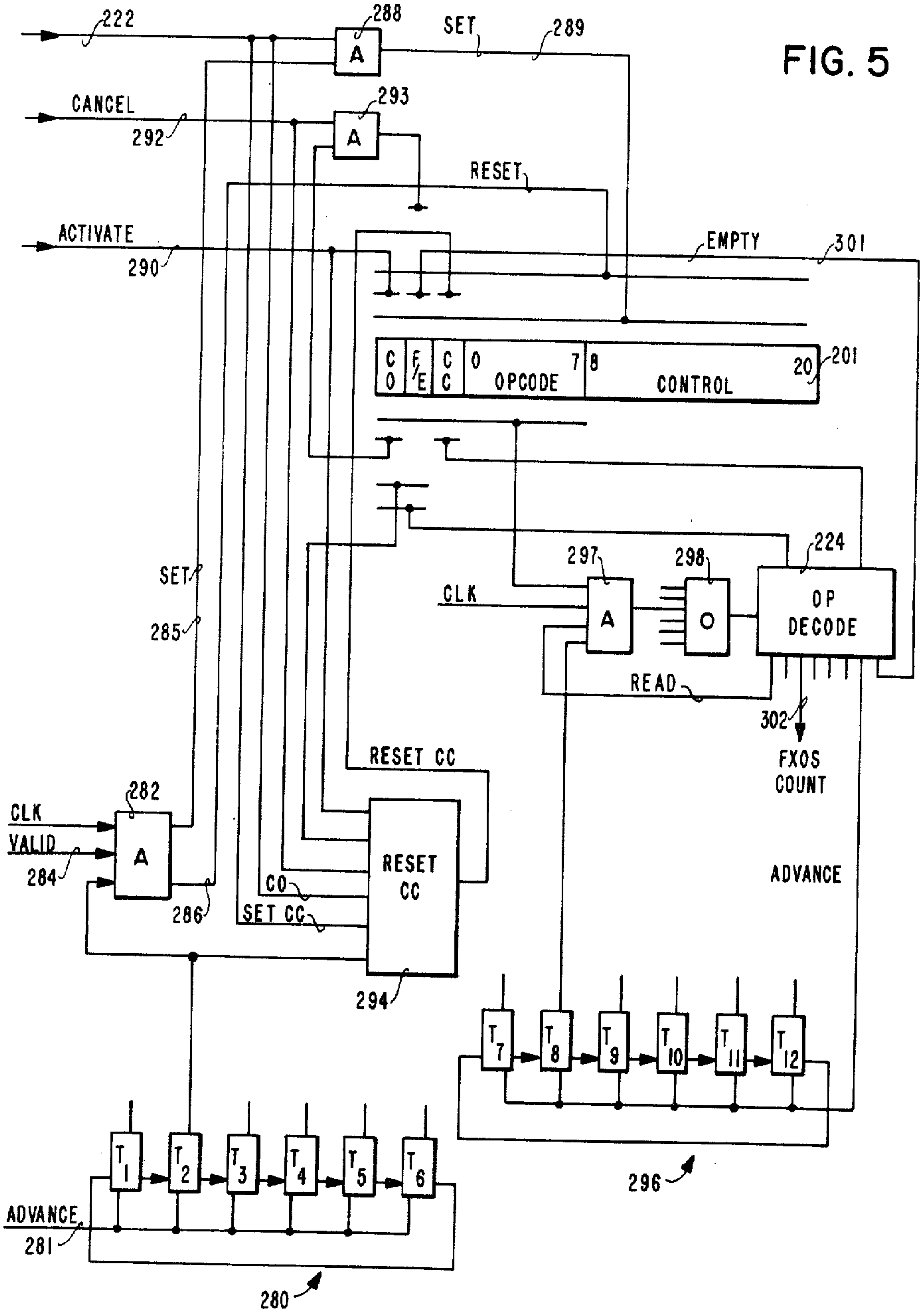
FIGURE 5 is a more detailed illustration of the parts of the OP Decorder of FIGURE 4*a*.

The FXPU 143 includes the FXOS 201 as more particularly detailed in FIG. 5. This figure shows only one of the six registers in FXOS 201, but it is representative of each of the registers. The register is a set of 24 latches or bi-stable circuits. Each latch is of the set dominant type wherein the latch goes to a set condition upon application of both a set and a reset signal thereto, and it remains set after the fall of both signals provided that the reset signal is not supplied after the fall of the set signal. The 24 bits of data stored in each buffer register of the FXOS 201 include a CO bit settable to indicate that the instruction is conditionally issued, an F/E bit settable to indicate that such register has a valid instruction stored therein, a CC bit settable to enable the instruction to set the condition code bits in the I-Box 134, a group of eight operation code bits zero through seven to specify the operation to be performed, and 13 control bits eight through twenty to specify the storage locations of operands, etc.

There is a group of six triggers T1–T6 connected to form an ingate ring 280. The triggers are settable sequentially into an active state. The presence of a signal on an ADVANCE line 281 serves to shift the active state of any trigger to the next trigger of the ring in the conventional manner. Each trigger T1 to T6 corresponds to one of the buffer registers of FXOS 201, and an active trigger designates its associated buffer register to receive an instruction from the operation stage 167 of I-Box 134 in FIG. 2*a*. When any one of the triggers T1 to T6 in FIG. 5 is set, its output signal is applied to an AND circuit 282 which also receives a VALID signal from the I-Box 134 on a line 284 common to all FXOS 201 buffers and a timing signal. The AND circuit 282 responds to the simultaneous presence of the three signals by emitting a SET signal on a line 285 and a RESET signal on a line 286. Line 286 is connected to the reset input of each latch of its buffer register of FXOS 201, and the reset signal sets all of the latches to represent a "O" digit. The set signal on the line 285 is applied to a group of AND circuits represented by the block labelled 288. And's 288 also receive information signals from the operation stage 167 of I-Box 134 over bus 222 from FIG. 2*a*, and they pass the "1" signals from the bus 222 to the set inputs 289 of the corresponding ones of the latches of the associated buffer register 201 in FIG. 5 to set such latches to represent a "1" digit. Since both the set and reset input are derived from AND circuit 282, they both drop simultaneously and the latch, if set, remains set. The ADVANCE signal on the line 281 is raised to shift the active state of ring 280 to the next sequential trigger thereby to select the next sequential buffer register of FXOS 201 for receiving the next instruction. The I-Box 134 maintains in FXOS counter 203 in FIG. 2*b* a count of the number of unexecuted instructions in FXOS 201 in FIG. 5, and the I-Box 134 is prevented from sending a new instruction if the FXOS 201 is full. Thus it is permissible to have the ring 280 select a buffer register in FXOS 201 in FIG. 5 before the instruction stored therein is executed since the I-Box 134 is prevented from issuing an instruction until the stored instruction is executed.

The I-Box 134 is capable of issuing instructions to FXOS 201 before the validity of the instruction is determined, and it tags such instructions conditional by setting the CO bit in the buffer register of FXOS 201 storing such instruction. When it is determined in the I-Box 134 that the previously tagged CO instructions should be performed, it puts a signal on an ACTIVATE line 290 which thereupon resets all set CO bit latches in all registers of FXOS, thus freeing them for execution. If, however, the I-Box 134 later determines that the CO tagged instructions should not be executed, it issues a signal on a CANCEL line 292 which is connected to a group of And circuits 293 which includes one And circuit for each buffer. The other active input to each of the And circuits 293 is connected to the CO bit latch of its associated buffer register. If the CO bit of a buffer register is set, the CANCEL signal on the line 292 passes through And circuits 293 to the reset input of the F/E bit of each buffer register containing a set CO bit. The presence of a set CO bit and a reset F/E bit in a buffer results in a NO-OP operation. More specifically, the OP decoder 224 in FIG. 5 passes over the instruction without execution, but the OP decoder 224 decrements the count in the FXOS count 203 in 2*b* so that the I-Box is free to issue another instruction for the associated buffer register.

The CC (set Condition Code) bit position also requires special handling. More than one of the instructions in the FXOS 201 in FIG. 5 may have its CC bit set. A reset CC device 294 is provided for each buffer register. It serves to reset the CC bit of its associated register whenever such reset is needed. Each device 294 is responsive at its input to the settings of the CO and F/E bit latches of its associated register, to the set CC and CO signals on the bus 222, and to the CANCEL and ACTIVATE signals on lines 292 and 290. For any register which stores a valid instruction which does not have a CO bit latch set, the reset CC 294 serves to reset the set CC bit latch each time the CC bit line signal is brought up on bus 222. The CC signal is passed through its And 288 to the selected buffer register 201, and thus only one CC bit is set, all others having their CC bits reset. If, however, instructions are conditionally issued, the set CC bits of the valid unconditionally issued instructions should not be reset since it is possible that the conditionally issued instructions may not be valid. The reset CC 294 is therefore responsive to the presence of a set F/E bit and a set CO bit in its own register, and to the presence of both a CO bit and a CC bit on bus 222 to reset its CC bit only if its instruction had been conditionally issued and a later conditional instruction is now issued having a set CC bit. By putting this condition on the CC bit position, it is possible to have a set CC bit in two registers of FXOS 201, on storing a valid unconditional instruction and one storing a valid conditional instruction.

Since, however, the conditional instructions may be set to an unconditional status by I-Box 134, reset CC 294 in FIG. 5 is also controlled by the ACTIVATE line 290 which resets all set CO bit latches to an inactive condition when the I-Box 134 determines that its conditionally issued instructions are to be executed. The reset CC 294 of each register of FXOS 201, where a CO bit has not been set, then resets its CC bit whenever an ACTIVATE signal appears on line 290 if there is a CC bit set in one of the previously conditionally issued instructions, i.e. the CC bit previously in a conditional instruction is now valid unconditionally and any previously set CC bits should be reset. Obviously if there is no set CC bit among the conditional instructions, there should be no change in the set CC bits, if any, of the unconditionally issued instructions. CANCEL line 292 is used to reset the F/E bit of any register of FXOS 201 which contains a set CO bit latch when the I-Box 134 determines that the conditionally issued instructions are not to be executed. Only those buffer registers of FXOS 201 which have their F/E bit latch set to the F (full) state have valid instructions therein and may take part in the setting and resetting of the CC bit latches.

On the outgating side of FXOS 201 an outgate ring 296 in FIG. 5, comprising triggers T7 through T12, determines, by the active state of one of its triggers, a buffer register which is to be outgated for execution of its instruction. The ring 296 has the output of the set one of the trigger T7 to T12 applied to one input of an And circuit 297 (one for each latch of the associated buffer register) which also receive a READ signal from the operation decoder 224 and a timing clock pulse. The outputs of the And circuits 297 pass through an Or circuit 298 to the Op decode 224 which generates the control signals needed to operate the other parts of FXPU 143 in performance of each instruction. Among the other control inputs to Op decode 224 are the CO, F/E, and CC bit signals of the buffer registers of FXOS 201 which serve to prevent execution of conditionally issued instructions, enable only valid (full) instructions to be executed, and control setting of the condition code (CC) bits by the execution units performing the instruction. Among the output signals of the Op decode 224 are (1) a signal on a line 301 which resets the F/E bit latch of any register when the instruction in such register has been executed, (2) the previously mentioned READ signal to bring in the next instruction for decoding, (3) an ADVANCE signal to step outgate ring 296 to the next active state, and (4) an FXOS count signal on a line 302 to decrement the FXOS count 203 in the I-Box in FIG. 2*b*.

It will be remembered that the FXOS count 203 is incremented by the I-Box for each instruction, conditional or unconditional, issued to FXOS 201 and that it cannot issue further instructions when FXOS 201 is full. Since the I-Box 134 does not keep track of the number of issued conditional instructions and cannot therefore correct FXOS count 203 when a number of conditional instructions are cancelled, the correction of FXOS count 203 is left to the FXPU 143. The Op decode 224 therefore processes each cancelled conditional operation far enough to detect the set CO bit latch and the reset F/E bit latch, and it thereupon issues the FXOS count decrement signal on the line 302. It does not issue any execution signals, in effect a No-Op instruction, and it immediately proceeds to read out the next instruction. In addition, for each cancelled instruction, all storage requests for such instruction are nullified by setting the FXB's 204–210 to which such fetches are to be returned to a not busy condition, i.e. empty regardless of the setting of the data bit latches thereof and not receptive to data input signals on FLPU bus 199 or SBO 155. All manipulations of general purpose registers 202 in FIG. 4*a* which may have been preperformed for the normal processing of such cancelled instruction must be undone, and the RUA 227 and RUM 335 counters of the I-Box 134 in FIG. 2*b* are decremented by the Op decoder 224 to eliminate the effect of the issuance of the cancelled instruction.

ADDERS OF FXPU

There are two adders in FXPU 143, the carry propagate adder (CPA) 216, and the carry save adder (CSA) 214. CPA 216 can receive a 40 bit input operand at its right input in FIG. 4*b* and a 40 bit operand at its left input, and it can generate their sum at its output in one machine cycle. The general configuration of the CPA 216 is described in the article, "High Speed Arithmetic in Binary Computers," by O. L. MacSorley, pp. 67–91, January 1961, Proceedings of the IRE. For the present 40 bit adder, it is preferable to utilize a byte (eight bit) basis for the first level carry generation which then requires only five bytes to be tested for second level carry generation. It may also be noted that the left input has a T/C side 231 for entry of a complemented operand when required. Since the T/C signal enables either the operand to pass through one set of gates or the complement of the operand to pass through another set of gates and since both sets of gates cannot pass an operand simultaneously, there is effectively only one input to the left inputs, and no combining of the true and complement signals is required. In actual practice the exclusive Or of the operand bits with the T/C signal is applied to the left inputs. Such exclusive oring in effect generates the ones complement of the input operand, and this is changed to the twos complement by the insertion for complements of a bit into the carry input lead of the lowest denominational order byte. The output of CPA 216 is storable in either the right or left half of the accumulator 217, but it is normally placed in the left half since the double width factor is needed only for multiplication operations.

The CSA 214 is used to combine the two operands generated by the multiplicand gates 235 with the previously generated partial product of the multiplication stored in the left half of the accumulator 217 and supplied to CSA 214 on a bus 303. For each bit position there are thus three inputs but only two outputs. See Fig. 1 of MacSorley referred to above. These two outputs for some instructions are the two inputs to CPA 216.

SHIFTER

The shifter 218 of FXPU 143 is fully described in reference 3 above.

GENERAL PURPOSE REGISTERS

The 16 general purpose registers (GPR) 202 in FIG. 4*a* are the main operand retaining mechanism for the fixed point unit 143 and the I-Box. Each GPR is a set of 32 data bit latches which can be selectively set by data from three input busses. Bus 222 is a 32 bit bus from the I-Box 134 which can be gated into any GPR. The 64 bit output of shifter 218 is divided into two busses, 331 for the left half and 333 for the right half. Bus 331 can be gated into any even number GPR 202, and bus 333 can be gated into any odd numbered GPR. It is possible to gate both busses 331 and 333 simultaneously into two GPR's by selecting an even-odd numbered pair of GPR's. The even-numbered GPR's (including #0) receive the data signals on bus 331, and the odd numbered GPR's receive the data signals on the bus 333. It may also be noted from FIG. 4*a* that the right eight bits of each GPR can also receive data over bus 234 from the VFL logic unit 212 or by way of logic unit 212 from any byte position of FLB's 204, 205, 206 or 207.

As previously mentioned, every bit position of all GPR's is connected to the I-Box 134 by an ungated line forming a 512 bit bus 334 with two sets of individual gates on the I-Box end. The I-Box has available to it all data in all of the GPRs 202, and it can utilize this data without waiting for data to be gated on to a bus as a result of a signal from I-Box 134. There are two other busses, A bus 225 and B bus 226, each of which can be gated to receive the data from any GPR 202. As in the case of busses 331 and 333, a 64 bit data word stored in an even-odd numbered pair of GPR's can be transmitted at one time by putting the left half of the word from the even numbered GPR on A bus 225 and the right half of the word on B bus 226. Both busses are connected to store bus Or's 221 with the A bus 225 also gating into the left (T/C) input of CPA 216 and the B bus 226 gating into the right input of CPA 216 and also into the multiplicand gates 235 of the CSA 214.

The ingating to the GPR's 202 is under control of the GPR address register 228 which is loaded from I-Box 134 over a bus 229. Register 228 is a nine bit register containing four bits to designate the GPR of 202 which is the sink register and two bits to designate what part of the GPR is to receive data from the input busses 222, 331, 333 or 234. The gating can be eight bits into bit positions 24–31, 32 bits into the full GPR, or 64 bits into an even-odd numbered pair of GPR's. The other bits of Register 228 are used to indicate the one of the FXB's 204–210 which is to put the operand (through CPA 216) on the busses 331 and 333.

The RUM counters 335 and the RUA counters 337 in FIG. 2*b* are each three bits wide and are physically located in the I-Box 134 to save transmission time in referencing them, but they are more closely associated in operation with the GPR's 202 in FIG. 4*a* in that there is one RUM counter 335 and one RUA counter 337 for each GPR 202. A select RUA decoder 338 in FIG. 2*b* is responsive to the sink GPR address signals in Op stage 167 to select the RUA counter 337 for the addressed GPR, and this counter is incremented by one unit when an instruction in the Op stage 167 in FIG. 2*b* is issued to FXPU 143. Similarly, the select RUM decoder 339 is responsive to the address of a source GPR 202 in Op stage 167 to select an RUM counter 335 for the source GPR. The selected RUM counter 335 is incremented when an instruction is issued to FXPU on the bus 222. Each time a GPR 202 is used as a sink register in a fixed point instruction, the Op decode 224 in FIG. 4*a* transmits a decrement RUA signal on an appropriate line of a bus 341, and similarly each use of a GPR 202 is a source register of a fixed point instruction causes an appropriate signal to be sent on one or more of the wires of a DECREMENT RUM bus 342 to decrement the appropriate RUM counter 335.

For each instruction which controls the I-Box 134 to change the value in a GPR, i.e. by storing therein a new base address, the I-Box 134, upon decoding such instruction, checks the status of the RUM counter 335 for that GPR. If such RUM counter is not at zero, it means that unexecuted instructions in the FXOS 201 are to use the data stored in the given GPR as a source operand, and further processing in the I-Box is held up until such RUM counter 335 is restored to zero. When a GPR register is to be used as the sink in a number of instructions, the stored data will probably be altered at each instruction. This is of no consequence because the FXOS 201 instructions are executed in sequence, and the data in a GPR 202 at the start of the execution cycle of an instruction is the operand for that instruction. It is the I-Box which is processing advanced instructions and which must be careful not to interfere with concurrent processing of earlier issued instructions.

When the I-Box 134 in FIG. 1 decodes an instruction which specifies a storage address in MS 104 or EMS 105 as the value in a GPR (base register) plus a displacement value and either with or without addition thereto of the value in another GPR (index register), the I-Box 134 insures that the values in the GPR's to be used for generation of the address are those which should be used. If a GPR 202 has any value in its RUA counters 337, it is an indication that some previously issued (but unexecuted) instruction will use that GPR as a sink register and that the data in the GPR is not current with respect to the instruction being decoded. The I-Box must wait until the GPR's RUA counter 337 has been decremented to zero by the Op decoder 224 of the FXPU 143.

FXPU OPERATIONS

The FXPU 143 is capable of executing a substantial group of instructions most of which require transmission of only a single instruction from I-Box 134 to FXOS 201. The fixed point instructions, mnemonics and format are:

| Mnemonic | Instruction | Format |
|---|---|---|
| AR, AH, A | Add H/F | RR, RX |
| ALR, AL | Add Logical | RR, RX |
| CR, CH, C | Compare F/F | RR, RX |
| CLR, CL | Compare Logical | RR, RX |
| CVB | Convert To Binary | RX |
| CVD | Convert to Decimal | RX |
| DR, D | Divide | RR, RX |
| LR, LH, L | Load H/F | RR, RX |
| LTR | Load and Test | RR |
| LCR | Load Complement | RR |
| LPR | Load Positive | RR |
| LNR | Load Negative | RR |
| LM | Load Multiple | RS |
| NR, N | Logical And | RR, RX |
| OR, O | Logical Or | RR, RX |
| XR, X | Logical Exclusive Or | RR, RX |
| MR, MH, M | Multiply H/F | RR, RX |
| SLA | Shift Left Single | RS |
| SRA | Shift Right Single | RS |
| SLDA | Shift Left Double | RS |
| SDRA | Shift Right Double | RS |
| SLL | Shift Left Single Logical | RS |
| SRL | Shift Right Single Logical | RS |
| SLDL | Shift Left Double Logical | RS |
| SRDL | Shift Right Double Logical | RS |
| STH, ST | Store H/F | RX |
| STC | Store Character | RX |
| STM | Store Multiple | RX |
| SR, SH, S | Subtract H/F | RR, RX |
| SSRL, SL | Subtract Logical | RR, RX |

In the mnemonic listing the presence of an R except in shift instructions indicates that the required operands of the instruction either are or will be stored in GPR's 202 prior to execution of the instruction, and an H indicates that the operand is to be a half word of sixteen bits. In shift instructions an R means that the shift of the operand will be to the right. In the instruction column the H/F indication means that the execution is performed, except for in and out gating, in the same manner for both half and full word operands. In the format column the designation RR means that both operands will be present in designated GPR's 202, and they are indicated by the R in the mnemonic column. RX indicates that one operand will in a named GPR 202, and a second will be in a storage address specified by the sum of a base address and an index amount both in named GPR's and a displacement value present in the instruction. For an RS format the storage address is the sum of the base address in a GPR 202 and the displacement value of the instruction, no index amount being included.

The only distinction between the RR, RX, and RS instructions is the location of the second operand. In an RR instruction the source operand is in a GPR, but in an RX or RS format the same operand is in a storage address. It is fetched into an FLB 204–210 as assigned by the I-Box 134, and execution cannot proceed until the FLB has received the fetched operand.

SINGLE CYCLE INSTRUCTIONS

Most of the above instructions are executed by the FXPU 143 in one machine cycle, and they include the adds, subtracts, compares, one loads, stores and logical connectives. During such machine cycle the DECREMENT RUM, DECREMENT RUA, FXOS COUNT and FXB NOT BUSY signals are sent by the Op decoder 224 to I-Box 134 to keep current the I-Box counters. More specifically, all loads (LR, LH, L, LTR, LCR, LPR, and LM) including both RR and RX format types, go through the adder 216 in FIG. 4*b*. During such machine cycle the DECREMENT RUM, DECREMENT RUA, FXOS COUNT and FXB NOT BUSY signals are sent by the Op decoder 224 to I-Box 134 to keep current the I-Box counters. A load instruction performs the function of loading a specified sink GPR 202 with data already in another specified location, either another GPR 202 or a storage address fetched into an FXB 204–210. All data paths are from the source register through GPR A bus 225 or by FXB out busses 344 and 345 to the left input of CPA 216. The data passes through the CPA 216, accumulator 217 and shifter 218, and it is then gated into the sink GPR 202. If the data being moved is only a half word long (an LH instruction), the half word is gated on FXB out bus 345, and FXB out bus 344 receives the sign bit on each of its sixteen lines. Load and test is a load instruction which also sets the condition code latches as called for by the instruction. Load positive or load negative require that the sign of the data be sensed to enable rather a true or complement setting of the T/C side 231 of the CPA 216 as required to get the proper sign for the output data, and load complement always sets the T/C side for a complementing of the data.

The adds, subtracts, compares, and connectives (AR, AH, A, ALR, AL, SR, SH, S, SLR, SL, CR, CH, C, CLR, CL, NR, N, OR, O, XR and X) all have the common property of requiring two operands, a source operand from either a GPR 202 or an FXB 204–210 and a sink operand from a GPR 202, and except for the compares, all have a sink in a GPR 202. The source operands are all directed over GPR A bus 225 or FXB out busses 344 and 345 to the left input of the CPA 216, and for subtract or compare operations they are complemented in T/C side 231. The output of CPA 216 is returned to the sink GPR 202 through the shifter 218 and out bus 331 or 333. The logical operations are the same as the arithmetic ones except that the condition code is set differently. The arithmetic ones set the condition code to zero, positive, negative or overflow; whereas, the logical ones set one code bit to indicate either zero or not zero and the other bit to indicate a carry out or no carry out. The connective operations are performed in a small connect unit 346 in FIG. 4*b* which is fed from the data flow diverted out of the data paths of the CPA 216, and the connect units 346 Or's is output into the data paths of the CPA 216. As in load operations half words are transmitted on the right half of a bus, and the sign bit is replicated to fill the left half of the bus data.

Store instructions (STH, ST, STC) route data from a selected one or pair of GPR's over the GPR A bus 225 and/or the GPR B bus 226 to the store bus 221 in FIG. 4*b* for transmission to the MSCE. The difference between the instructions lies in the gating into store bus Or's 221 where a half word is duplicated in both parts of the output bus 197 and a character of one byte is replicated across the entire word. Such gating enables the half word or character to be ingated into any half word or character position of the full storage word addressed in the main store 104 in FIG. 1.

MULTI-CYCLE INSTRUCTIONS

The multiple cycle operations may be either a fixed number of machine cycles, i.e. single word shifts of up to 32 denominational orders to the right or to the left, or a variable number of machine cycles depending on (1) the instruction and data content, i.e., divide, multiply, convert decimal to binary or (2) shift value dependent, i.e., double word shifts where a double word may be shifted up to 64 denominational orders in either direction. The signals to the I-Box 134, RUM and RUA decrement and FXB not busy, are sent by the E-Box as soon as the execution of the operation has progressed to a point where no further use of the GPR registers or FXB by I-Box 134 can cause erroneous operations.

Figure 6:
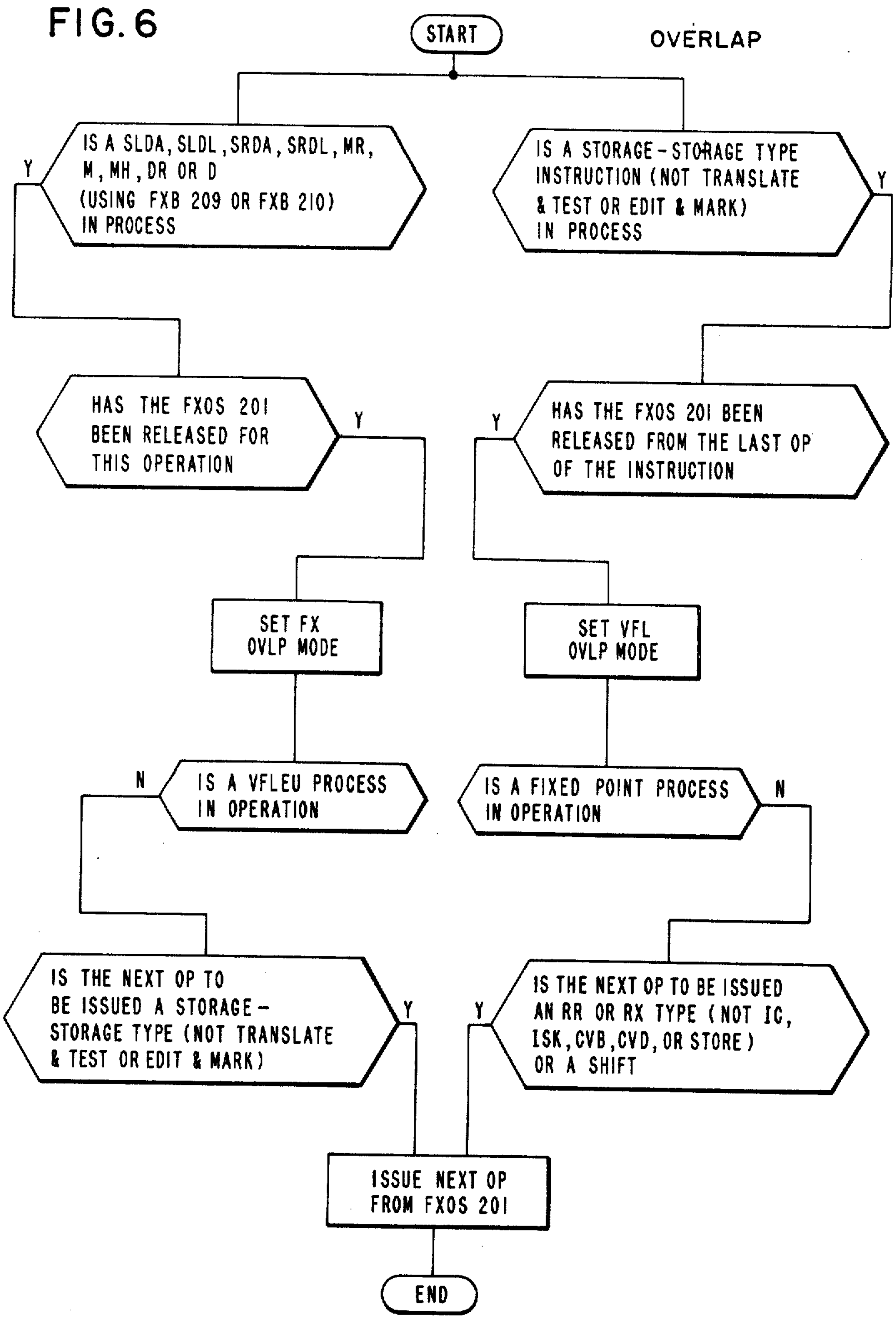
FIGURE 6 is a flow chart of the overlap type of operation of the fixed point unit.

The FXOS 201 is released to the I-Box 134 as soon as all data has been extracted therefrom, usually about the second machine cycle. After FXOS 201 has been released to the I-Box, the next Op code is tested to determine if it is of a type which can be overlapped with the operation being executed. Generally, all of the VFL operations involving two storage addresses for the two operands can be overlapped with either single cycle or mulitcycle instruction since the hardware used by each instruction is distinct from that of the other. The conditions for overlap processing of FXPU instructions are indicated in FIG. 6. Here the fixed point operations are indicated in the left hand where the first test is to determine if an instruction which can be overlapped is being processed. If yes, the next test is whether there is a release of FXOS 201, i.e. does the ring 296 in FIG. 5 point to the next instruction. When both tests are affirmative, the FXPU 143 is set into the FX overlap mode. If the VFL unit is not processing an instruction, the next Op in FXOS 201 is tested during FX overlap mode, and if it is for a storage to storage operation, except a translate and test (TRT) or an edit and mark (EDMK) instruction, the next instruction in FXOS 201 is issued to Op decode for immediate execution.

In a similar manner a fixed point instruction may be overlapped with execution of a VFL instruction. As indicated on the right side of FIG. 6, if a storage to storage instruction is being executed by the VFL part of FXPU 143 (except the above TRT and EDMK instructions) and the FXOS 201 has been released from the last instruction, the FXPU is set to VFL overlap mode. In this mode if there is no fixed point operation in process and the next instruction in FXOS 201 is a shift, a GPR to GPR (RR), or a GPR to indexed storage address (RX) format (excepting the IC, ISK, CVB, or CVD or a storage instruction) then the next instruction in FXOS 201 is issued to Op decode 224, and its execution is started. Once either overlap mode is set, the FXPU stays in that mode until the end of execution of one of the two overlapped operations at which time another test is made to determine if another overlap operation is permissible.

MULTI-OP INSTRUCTIONS

There are two fixed point instructions which require more than one Op code in FXOS 201 to perform the instruction which is received by the I-Box 134. For these instructions the I-Box generates a sequence of micro-orders, and each micro-order performs one phase of the instruction. The first such instruction considered is the load multiple (LM) instruction which causes the movement of a block of data from consecutive storage addresses into the group of consecutively numbered GPR's 202 starting with the one named in the instruction. The I-Box first fetches from the first storage address the double word containing the first word to be stored in the designated GPR, and it directs it into a given FLB in FIG. 3. The I-Box 134 calls for a fetch of the double words at succeeding addresses until either the FLB's 185 are all full or the required number of words are fetched. Any initially unfetched words are requested as soon as an FLB is free to receive them. The first micro instruction in FXOS 201 requests a double word to be transferred from the named FLB in FIG. 3 to a pair of FXB's, either 204–205 or 206–207 in FIG. 4*a*, and it identifies the GPR 202 which is to receive the first 32 bit word. As the word to be loaded can be either the zero to 31 bit number part of the double word or the 32 to 63 bit number part of the double word, the first instruction contains an indication that it is the first instruction (bit 14 set) and that either both parts of the word or just the low order half (bit 13 set) are to be loaded into the GPR's. If both halves are to be loaded, the high order or left half is first loaded into the named GPR whose address has been loaded into GPR address register 228; whereas, if only one half of the word is to be loaded, the low order or right half is loaded into that GPR. On the next machine cycle, if bit 13 is not set, the GPR address register 228 is incremented to name the next numbered GPR and the remaining half of the first double word is loaded into that GPR. If bit 13 is set or after the second cycle with bit 13 not set, the next micro-instruction in FXOS 201 is executed on the next cycle by transferring the next named FLB's data into the other pair of FXB's, and then the left half of that next word in this other pair of FXB's is loaded into the next GPR. On the next cycle the remaining half word is loaded into the succeeding GPR. Simultaneously the next double word is fetched from the next identified FLB. The GPR address register 228 is incremented on each cycle to indicate the next GPR to receive a word. It pointed out that the register 228 will wrap around from bit 15 to bit zero.

Each instruction in FXOS 201 can thus load two GPR's 202 with either one or both halves of the first double word, and with both halves thereafter until the last load multiple micro-instruction. This last instruction (bit 15 is set) can load either the high order half of the data in the FXB's or it can load both halves. A set bit in the instruction (bit twelve), indicates that only the high order 32 bit word is to be loaded into a GPR 202. After the proper number of loads required by the last instruction have been made, the FXPU resets itself and steps FXOS 201 to the next instruction.

On each cycle wherein a GPR is loaded, the corresponding DECREMENT RUA signal is sent to the I-Box 134 on lines 341. Data is fetched alternately into the FXB pairs 204–205 and 206–207 from the FLB's and it is outgated in the order 206, 207, 204, 205, 206, 207, etc., to load the GPR's in the proper order. As soon as the both parts of data in a pair of FXB's have been loaded, another fetch of a double word from the next FLB is initiated. Consequently, after an initial delay of two cycles for the first fetch from an FLB, data can be loaded into the GPR's at a maximum rate of one word per cycle. Delays can be caused by the I-Box having priority for storing into a GPR, lack of available data in the FLB's or disruption in the issuing of micro-coded Op's from I-Box 134 to FXOS 201. During the last machine cycle, FXB not busy signals for FXB's 204, 205, 206 and 207 are sent to I-Box 134.

The data path for words from any FXB is from the FXB outgates to busses 344 and 345, the high order half of the word to bus 344 and the low order half of the word to bus 345, and these busses are gated true into T/C side 231 of CPA 216. From the output of CPA 216, the word is gated into the left half of accumulator 217 for transfer straight through shifter 218 to bus 331 for gating to an even numbered GPR 202, or from the output of CPA 216 to the right half of accumulator 217, and straight through shifter 218 to bus 333 for gating into an odd numbered GPR. The single LM instruction is thus broken up into a number of micro-instructions each of which causes transfer of two words from an FLB 185 to two GPR's. As above noted, the first and last micro-operation may cause transfer of only one word if the group of words to be loaded starts or ends in the middle of a double storage word. The determination of the last micro-instruction and whether one ro two words are to be stored thereby is under control of a counter in the I-Box 134 which is set to the number of the first GPR to be loaded as given first in the instruction. It is incremented by one or two for each micro-instruction issued until the I-Box 134 determines that the next micro-instruction to be issued shall be the one to load the last GPR, i.e., the GPR number given second in the instruction, and this last micro-instruction is set to cause either one or two words to be loaded.

The other multi-operation instruction is store multiple (STM) which, when decoded in I-Box 134 is issued as a series of micro-instructions wherein each transfers a pair of words from an even-odd pair of GPR's over the A bus 225 and B bus 226 to the store bus Or's 221, for transmittal over the bus 197 to the MSCE 136 in FIG. 1. If the first GPR in FIG. 4*a* to be stored is an odd numbered one, both it and its lower numbered even GPR are gated out to the busses 225 and 226. However, the I-Box 134 notifies the MSCE 136 in FIG. 1 beforehand that only the right word of the double word is to be stored. Each micro-instruction thereafter transfers two GPR's into buffers in the MSCE 136 in FIG. 1 for storage in main or extended main storage until the I-Box determines, in the same manner as for loads, that the next micro-instruction is the last one required by the original instruction, and it so tags the instruction (bit fifteen set), together with a tag bit (bit twelve set), to indicate that only the even numbered GPR is to be transferred if it is the one named in the instruction as the last GPR to be stored. Here again the MSCE receives the content of both the even-odd pair of GPR's, and it is notified to store only the left half of the double word received.

The DECREMENT RUA signals for the registers being stored are sent to the I-Box 134 in FIG. 2*b* on the bus 341 with two signals for operations storing two GPR's, but only one DECREMENT RUA signal is sent to the RUA counter for the GPR actually being stored if the micro-instruction is for only one GPR to be effectively stored, even though both GPR's are outgated to the SDB 244. The GPR's are stored at the machine cycle rate for each micro-instruction which can store the data in either one of two GPR's per cycle without delay. Delays in such store processing may be caused (1) by a condition in the I-Box 134 in FIG. 4*a* and *b* which delays issuance of the micro-instructions in view of higher priority operations or (2) by the availability of buffers in the MSCE 136 in FIG. 1 to receive the GPR data.

VFL EXECUTION UNIT

The variable field length execution unit (VFLEU) is considered to be the group of units which work in the FXPU 143 in FIGS. 4*a* and 4*b* to control and execute relating to variable length operands, and it is described in detail in reference three above.

INSTRUCTION UNIT

Figure 7A:
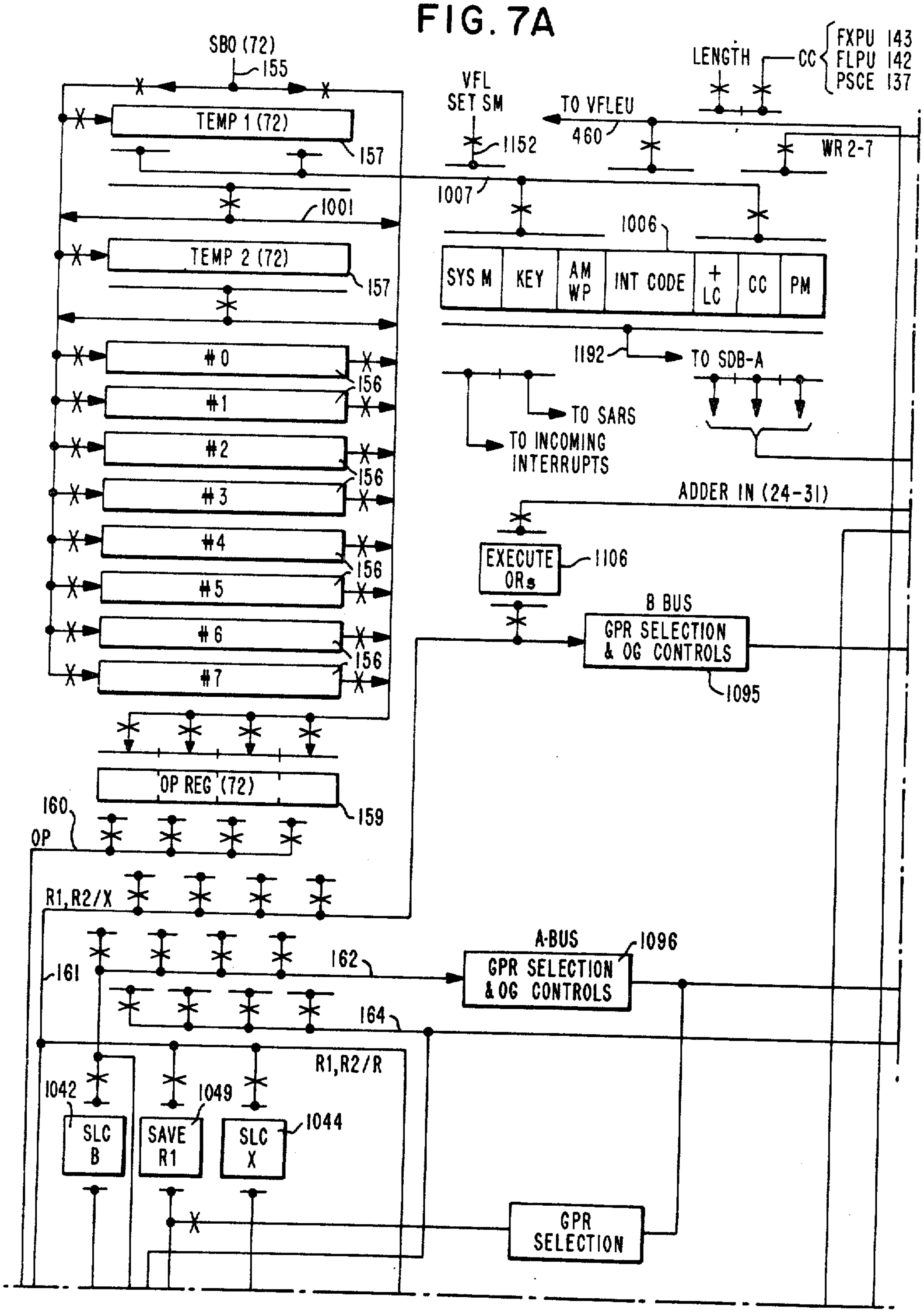
FIGURES 7*a* through 7*h* illustrate in detail the functional units and data flow paths of the I-Box.

The instruction unit 134, outlined in a functional format in FIGS. 2*a* and 2*b*, is shown in substantially more detail in FIGS. 7*a* through 7*h*. The I-Box 134 contains ten 64 bit buffer registers, as explained earlier, for storing instructions sequentially. Eight of the registers, designed by the reference numeral 156 in FIG. 7*a*, are normally used for storing eight double words of instructions with each register 156 identified by a three bit binary number. Every instruction word fetched from storage and placed in the register 156 has its proper location or destination identified by the last three bits of its storage address, i.e., bits 19, 20 and 21 of the 21 double word address. The other two buffer registers, designated by the reference number 157, are temporary 1 and temporary 2, and they are used for storing instruction out of the normal stream of instructions. All ten registers 156 and 157 are connectable by gates to a storage data out (SBO) bus 155; all registers 156 and 157 as well as SBO 155 can be gated to an output bus 1001; and any or all 16 bit half word groups can be gated into the corresponding areas of a 64 bit operations register 159 for instruction decoding.

Figure 7B:
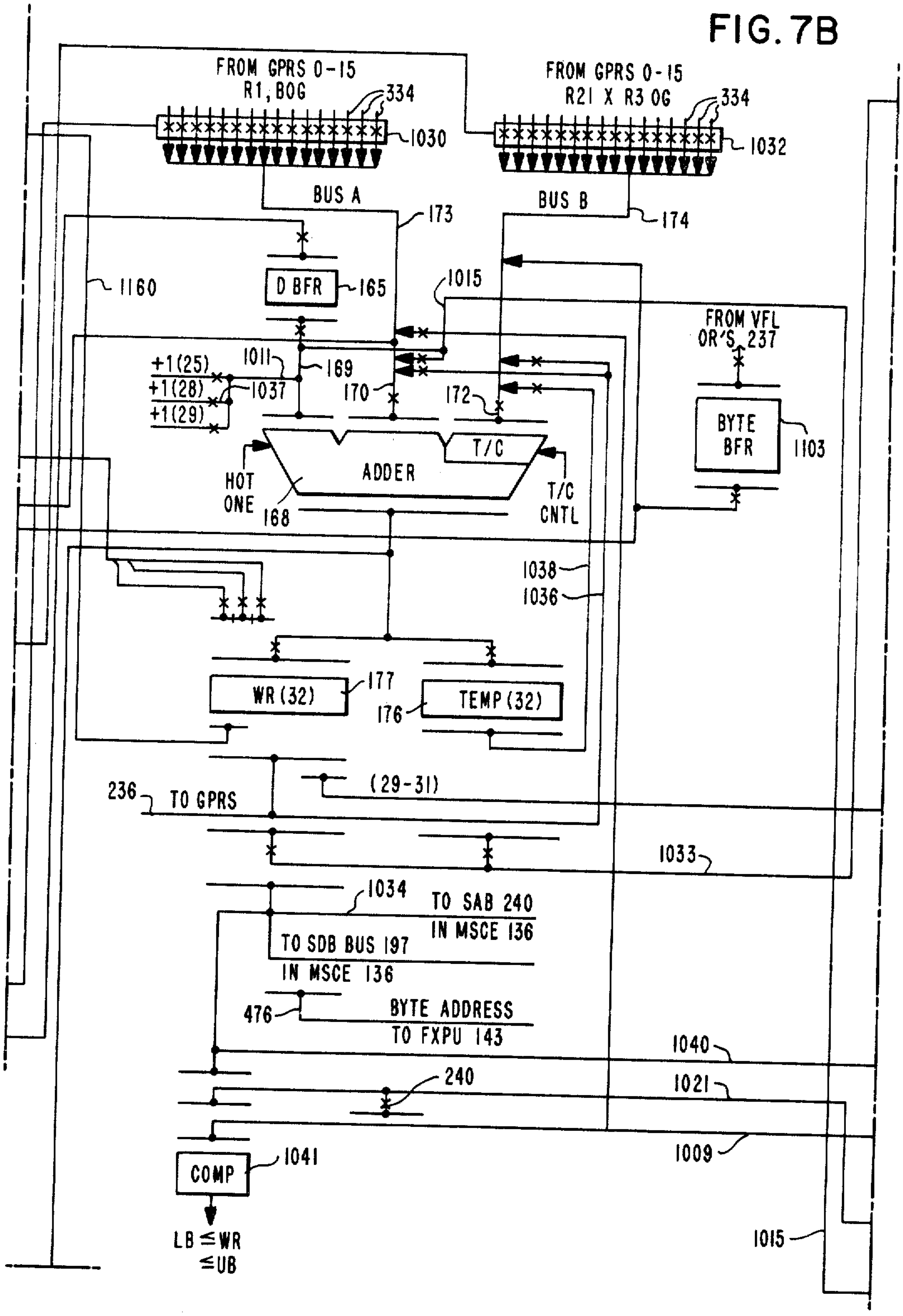

For the purpose of fetching instruction words and loading and unloading the buffer registers 156 and 157, a plurality of instruction count registers are provided. As explained earlier, these counters are the upper bound (UB) registers 147 in FIG. 7*d* with an upper bound incrementer 151, a lower bound (LB) register 150 with a lower bound incrementer 152, a seven bit instruction register (IR) 148 in FIG. 7*e* with an IR incrementer 153, and an advanced outgate register (AOR) 1002 in FIG. 7*c* with its AO incrementer 1003. Each register with its incrementer forms a counter wherein the actual count is stored in the register, and it is sent to the incrementer which generates a count one unit higher and transmits the count back to the registers input gates. The IR incrementer 153 in FIG. 7*e* is somewhat modified in that it can receive either a +1 signal a +2 signal or both signals from an operation decoder 1005 to generate an output signal of either 1, 2, or 3 units more than is held in the instruction register 148. In each instance when it is desired to increment the register, the output of the incrementer is gated into the register to change the value stored therein. After a latching interval, usually one half of a system clock cycle, the input gates are closed again, and the output from the register sends the new value to the incrementer for generating the next sequential value to be entered into the system.

There is a considerable amount of information needed in a large data processing system in addition to the constantly changing information available in registers, and in the present embodiment this information collectively is known as the program status word (PSW) which is stored, except for the instruction address, in the PSW buffer 1006 in FIG. 7*a*. The instruction address part of a PSW is entered from bit positions 40 to 63 inclusive of the SBO 155 into UB reg. 147, IR 148, LB reg. 150 and AO reg. 1002, with the indicated group of the right 24 bits of a 32 bit wide word (bits 8–31) going into each register as indicated by the numerals within the block representing the various registers. Generally, a change to a new PSW is equivalent to changing to a new program, and it is made whenever it is necessary to depart from the current program. The old PSW may be retained in storage to enable performance of programs of higher priority, and when it is desired to resume the interrupted progam, the old PSW can be bought back into the PSW buffer 1006 to continue the old program from the interrupted point.

When the PSW is to be changed, the new PSW is fetched and bits zero through 39 are held in #1 temporary register 157 in FIG. 7*a* until all previous instructions, if any, have been processed, and it is then transmitted over a bus 1007 into PSW buffer 1006. The instruction address part, bits 40–63 thereof, on SBO 155 in FIG. 7*d* is gated to a transmission bus 1008, and from there bits 25–28 are set into AO register 1002 in FIG. 7*c*, bits 8–28 into UB register 147 in FIG. 7*d*, all 24 bits 8–31 into LB register 150, and bits 25–31 into the I register 148 in FIG. 7*e*. The UB register is the fetch control for new instructions and it retains the address of the last instruction word requested from storage, irrespective of whether the word is in the buffers 156 or not. The output of the UB incrementer is therefore the address of the next instruction word to be fetched, and since the UB register 147 does not include address bits 29, 30 or 31, the UB address is a double word address. The I register 148 contains the address within the buffers 156 of the instruction word being decoded which is in half word units so that the bit 31, which is for the byte within the half word, is not used, but it is received from SBO 155 to be checked for a zero to insure that an improper odd-byte address was not received. As instructions can be 1, 2, or 3 half words long, and this length is set into IR incrementer 153. Thus the output of incrementer 153 is the address within buffers 156 of the first byte of the next instruction to be decoded. Bit 25 of the instruction address is not needed for identification of an instruction in the buffers 156, but it is required to regenerate the full instruction address when it is wanted. The LB register 150 contains the full instruction address when it is wanted. The LB register 150 contains the full address of the earliest instruction word which is contained within the buffer registers 156. It is not to be replaced by an instruction word being fetched but not yet received. The full storage address of the instruction in the buffer registers 156, which is the next to be decoded, can be regenerated by combining bits 8 through 25 of LB register 150 with the output of IR incrementer 153, i.e. the buffer address of the next instruction. Since the IR incrementer 153 could be indicating an address which is within the same group of eight double words as is the address in LB register 150 or it could indicate an address in the next group of eight double words, bit 25 of LB register 150 and bit 25 of IR increment are compared in an exclusive Or circuit 1007 in FIG. 7*d* to see if they are the same (thereby indicating the same group of eight) or are different (thereby indicating that the LB register address and the IR increment address are in different groups of eight). When the next instruction word address is generated, bits 8 through 25 of LB register 150 in FIG. 7*d* are gated on the LB bus 1009 into the corresponding bit positions of the middle input 170 of the three input adder 168 in FIG. 7*b*, and bits 26 through 31 of the IR incrementer 153 in FIG. 7*e* are gated to a common bus 1010 which is connected to a bus 1015 in FIG. 7*d* to transmit the IR incrementer address to bit positions 26 to 31 of the same adder input 170 in FIG. 7*b*. If the exclusive Or 1007 in FIG. 7*d* indicates that the bits 25 it receives are the same, the combined inputs to the input 170 of the adder 168 in FIG. 7*b* are correct, but if the exclusive Or 1007 determines that the bits 25 are different, a unit is added to bit position 25 by a signal on a line 1011 in FIG. 7*b* to change the generated address to a corresponding one within the next group of eight words.

As it is also desirable at times to know the full address of the instruction being decoded, another exclusive Or circuit 1012 in FIG. 7*d* compares the bit positions 25 of the LB register 150 and I register 148 to determine if they are the same or are different. The address is generated in adder 168 as above described for the next instruction address except that bit positions 26 to 31 of I register are gated to bus 1010. The additional unit on line 1011 is gated under control of the exclusive Or 1012 rather than exclusive Or 1007 as for the next instruction address.

Figure 7C:
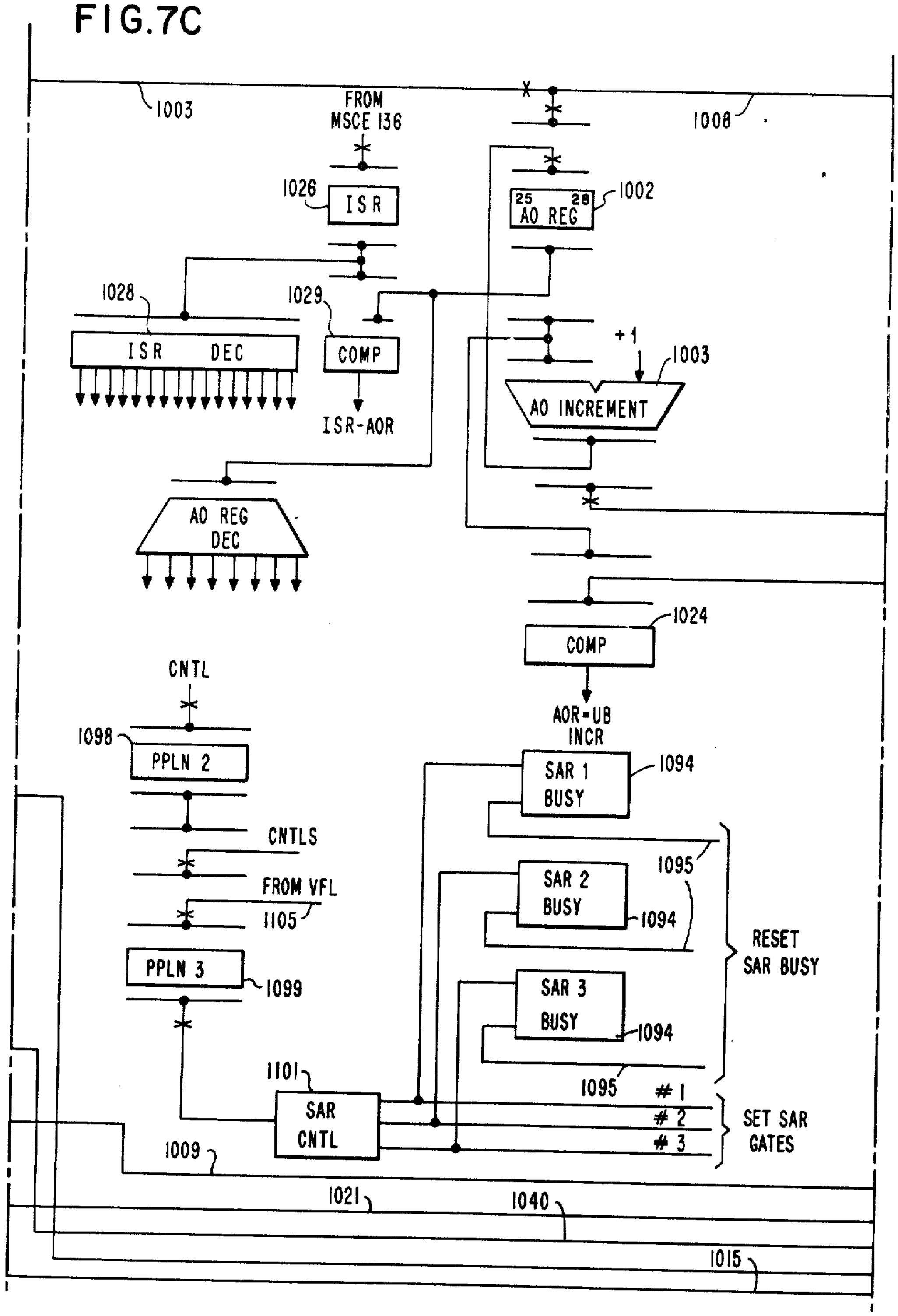
Figure 7D:
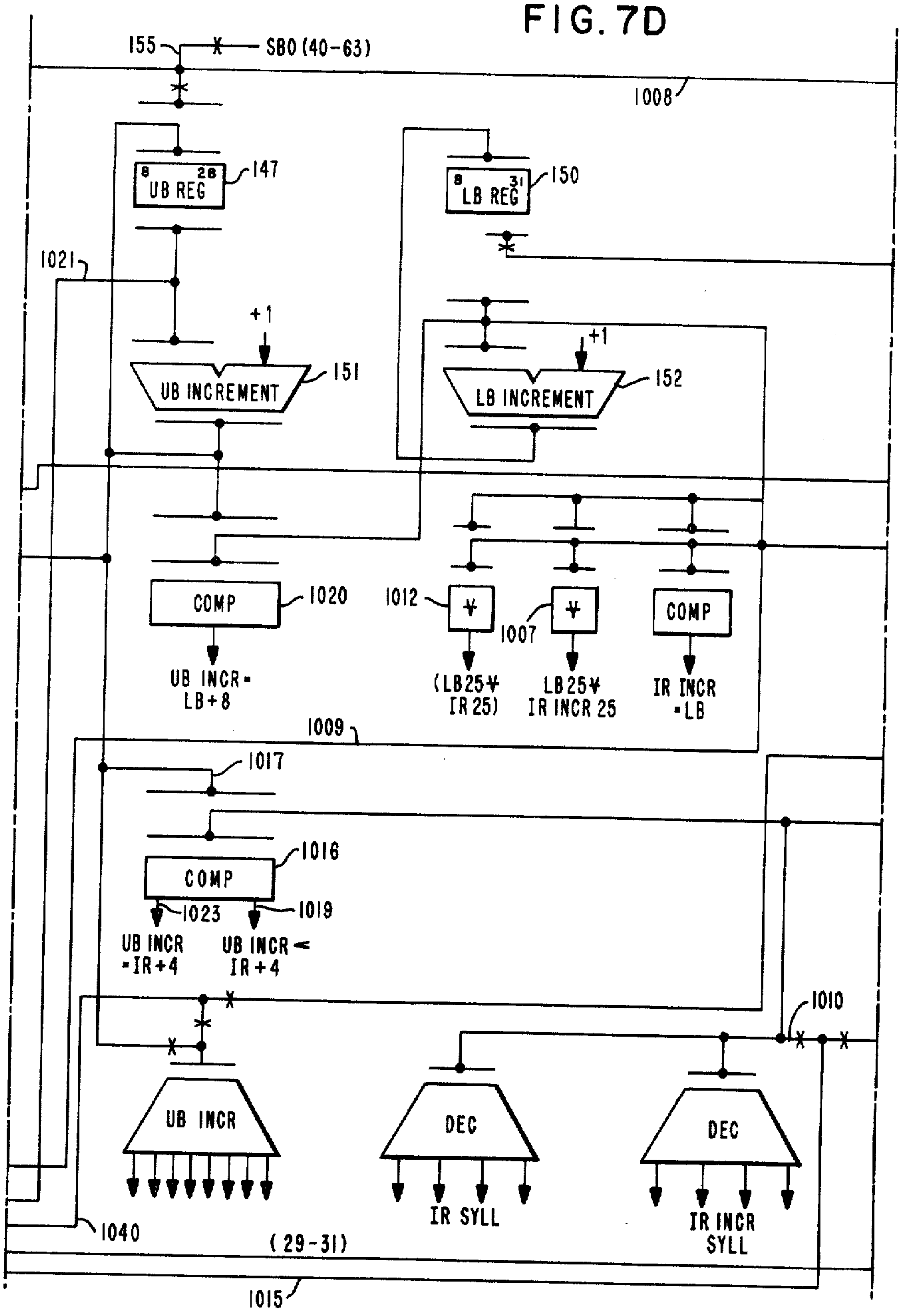
Figures 7E, 7J:
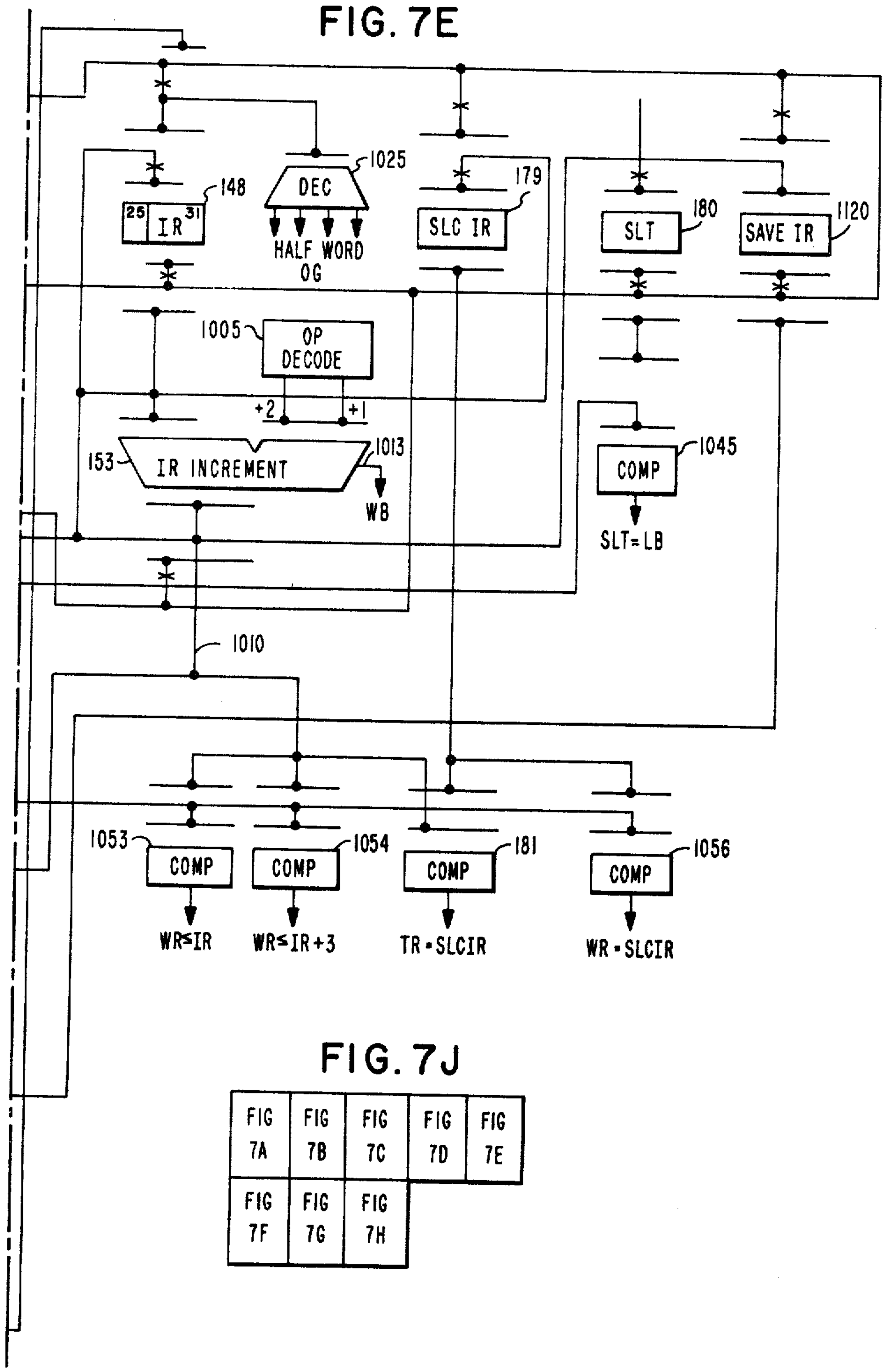
FIGURE 7*j* is a diagram indicating the manner in which FIGURES 7*a* through 7*h* should be arranged with respect to one another.

The AO register 1002 in FIG. 7*c* contains the identification of the selected location of the buffer register 156 from which the 16 bit groups are to be gated into the OP register 159. The AO register 1002 in FIG. 7*c* is usually one word ahead of the word address in the I register 148 in FIG. 7*e*, and it is incremented under control of a signal on a word boundary line 1013 from the IR incrementer 153 in FIG. 7*e* which detects each time the incremented address is in a new double word, i.e., when bit position 29 sends a carry signal into position 28.

The initialization of the I-Box 134 previously has been described rather broadly, and it is appropriate at this point to consider this in more detail. As soon as the starting instruction address has been set into UB register 147, LB register 150, I register 148 and AO register 1002, a comparator 1016 in FIG. 7*d* compares the low order part of the output of UB incrementer 151 on a bus 1017 and the I register output on a common bus 1010, and signals on a line 1019 indicate if the upper bound address is less than four greater than the I register. Another comparator 1020 compares the bit positions 25 to 28 of UB incrementer 151 on the bus 1017 with those of LB register 150 on bus 1009 to determine if the next upper bound address is not eight more than the lower bound address. If these conditions are met, the data in UB register 147 is gated to an upper bound bus 1021 and sent to storage address bus 240 as the address part of an instruction fetch. On the next machine cycle, the UB register 147 receives the incrementer 151 address data which is also transmitted over bus 1021 for a second instruction fetch address. This is repeated until comparator 1016 signals on a line 1023 that the incremented upper bound address is four more than the I register address, and instruction fetching stops. When the first fetched instruction is sent, a comparator 1024 in FIG. 7*c* compares the AO register 1002 address, one more double word than the I register 148 address, against the UB incrementer address to determine if the fetched instruction world should be gated from the SBO 155 in FIG. 7*a* directly into the Op register 159 as well as into the buffer register 156. A decoder 1025 in FIG. 7*e* at the input to the I register 148 from transmission bus 1008 decodes the starting instruction address to outgate the proper words (16 bit groups) of the first fetched instruction into Op register 159.

The words may not return from storage in the same order as they are requested, but every word put on the SBO 155 is preceded by the address of the sink into which it is to be gated. An incoming sink register (ISR) 1026 in FIG. 7*c* receives the sink address from MSCE 136 in FIG. 1, and if the sink is within the I-Box 134, it decodes this address in the decoder 1028 to select the correct buffer register 156 or 157 to receive the data which arrives in the next machine cycle. A comparator 1029 responds to the ISR 1026 address and the AO register address, now one unit more than the first instruction address fetched, and if it indicates that the next sink address is less than the AO register address, the next instruction word received has its valid instruction groups gated into OP register 159 in FIG. 7*a* directly from SBO 155.

Each time that the I register 148 in FIG. 7*e* is incremented past a double word boundary, as indicated by a signal on word boundary line 1013 and gating of the IR incrementer 153 address into I register 148, the comparator 1016 signals that UB incrementer 151 address is no longer four more than the I register 148 address, and a new instruction fetch is initiated from a storage address specified by the UB increment 151. This address is also gated into UB register 147 to increment it to the last instruction address requested. These I register conditions also cause AO register 1002 to be incremented to stay one double word address ahead of the I register 148.

If it is assumed that no instruction words have been returned from storage into buffers 156 at this point in time, no further I-Box action takes place until the first requested instruction word is returned and gated into buffer register 156, at which time the first instruction is decoded. The UB register 150 is incremented, and a new fetch of an instruction word is made each time a word boundary is crossed until comparator 1020 determines that the UB incrementer address is eight more than the address of the LB register 150. This means that the next fetched instruction word from the address in the UB incrementer 151 would be returned to the buffer register 156 holding the lower bound instruction word. Therefore, to avoid this no more fetching from the upper bound register address is performed as long as this condition is present, but normally there is no further need for the instruction word at the lower bound register address. When the next instruction word is fetched, both the UB register 147 and the LB register 150 are incremented each time the I register is incremented past a word boundary. Under such conditions the UB register maintains instruction word fetches three double words ahead of that being decoded under control of the I register 148, and the LB register 150 contains the address of the earliest instruction still surely available in the buffer registers 156. It is recalled that some of the last fetches initiated by the UB register may not have been returned. Therefore some instruction words prior to that at the LB address may still be present in registers 156, but these could be changed at any moment by return of a fetch to that address. It is preferred not to rely in any manner on such program dependent events.

It may be noted as a matter of interest that when UB incrementer 147 is four words ahead of I register 148, as indicated by comparator 1016, this does not constitute a condition for a full stopping of advance word fetches, but it does drop such fetches to a lower priority rating. If a time slot to MSCE 136 becomes available for an instruction word fetch under these conditions, the word fetch is initiated. It therefore is possible for the UB register to be a full seven words ahead of I register 148 whereby the entire set of buffer registers 156 is full of unused instruction words. Such a condition may occur when a loop of programs starting at the LB address is present within buffers 156. The UB register 147 is permitted to call for new fetches at each opportunity until the UB increment 151 address is eight more than the LB register 150 address as indicated by the output of comparator 1020.

INSTRUCTION STREAM DISCONTINUITIES

The I-Box 134 continues to fetch and decode instruction words as described above with the UB register 147 trying to remain about three instruction words ahead of the one the I-register 148 has selected for decoding and with about four used words in the buffer registers 156, until a discontinuity in the instruction stream is reached. Such a discontinuity may be a branch operation, a machine interruption or a store into the instruction stream. Branch operations may be subdivided into four categories, each of which is processed differently. Branches may be grouped as (1) unconditional branches (including branch on a condition which has been determined at the decoding time) to a word address in advance of the I register address, or to a word address more than eight word addresses back, (2) a branch on a condition not yet determined and to an address as above, (3) a branch on condition, determined or not at the decoding time, to an address less than eight words back but beyond the address in the LB register 150 and (4) a branch on condition, determined or not at the decode time, to an address between that in the LB register 150 and that in the I register 148. The branch operations are described in detail in reference 3 above, and they are not discussed further herein.

INSTRUCTION ISSUING

The second principle responsibility of the I-Box 134 is the decoding of instructions in sequence, the issuing of instructions to the appropriate units, and the issuance of fetch instructions for the required storage operands. Instructions may be received in five different formats, one of which is one half word long, three of which are two half words long, and the last of which is three half words in length. The first format is designated as the RR format, and such instructions use operands which are in the registers within the E-Box 133, either the GPR's 202 for instructions using the FXPU 143 or the FLR's 187 for instructions using the FLPU 142. Instructions in this format are one half word (16 bits) in length. They comprise an eight bit operation code, a four bit code identifying the register in which a sink operand is stored, either a GPR 202 or an FXR 187 depending upon the operation code, and a second four bit code identifying the similar register in which a source operand is stored. The first two bits of an RR format instruction are 00 which is interpreted to mean an RR format. The third bit has a one in instructions for the FXPU 142; whereas the third bit has a zero in instructions for the FXPU 143 or the I-Box 134. The fourth bit distinguishing between the latter with a zero for the I-Box 134 instructions and a one for FXPU 143 instructions. The remaining four bits of the operation code distinguish between the different instructions within a unit.

The second format is the RX format identified by the first two bits from the left being 01. This instruction is two half words long (32 bits) and it includes an eight bit operation code, a four bit identification of a register, either a GPR 202 or an FXR 187, for storing the sink operand, a four bit identification of a GPR 202 containing an index value, a third four bit group identifying a second GPR 202 containing a base address and a 12 bit address displacement. The values in the index and base GPR's are added to the displacement value to generate the effective storage address of the source operand to be fetched. In some instructions no sink register is utilized and the four bit sink register address can be utilized for other purposes, e.g., as a mask group. For this instruction format a one in the third bit position indicates an instruction for FLPU 142, and a zero in that position designates an instruction for either the I-Box 134 or the FXPU 143.

The third and fourth formats are RS and SI formats, and they may be considered together since both are two half words (32 bits) long. Each has the three leftmost bits as 100. In the RS format the first eight bits are the operation code, as in all of the other instructions, and the next four bits specify a GPR 202 which contains a sink operand or which is the first operand of a series. The second four bits holds the identification of a second GPR 202 which may contain a second operand or the last operand of a series, or the second four bits may be meaningless in some instructions. The last 16 bits always hold the identification of a storage address, a four bit identification of a GPR 202 having a base address, and a 12 bit displacement value which is added to the value in the base GPR to generate the effective storage address for the instruction. In the SI format instructions only one byte of the storage word is processed, and the second operand, if any, is always the byte of immediate data in the second eight bits from the left of the instruction which includes bits 8 to 15. Some instructions using the SI format do not have an immediate operand byte. For these instructions the bits 8 to 15 are meaningless, and they are ignored. Most of these operations are I-Box 134 instructions relating to machine status changes or to input/output equipment commands.

The last format is the SS format, and it is used where two storage locations are to be specified. The left eight bits hold the operation code with the two leftmost bits being 11 to identify the format. The SS format is always three half words (48 bits) long with the two right hand 16 bit half words each (1) having four bits which identify a GPR 202 storing a base address and (2) containing 12 bits which constitute a displacement value. The content of the designated GPR 202 and the displacement value are added to generate the storage address. The remaining eight bits can be either two four-bit length fields to specify the number of pairs of operands to be processed or an eight bit length field to specify the number of bytes of data to be processed, the specific meaning depending upon the operation code.

The I-Box 134 in FIGS. 7*a* through 7*h* processes instructions in three pipelined stages with up to three instructions being in different phases of execution at the same time. In the first pipeline stage the left eight bits of the instruction are gated from the Op register 159 in FIG. 7*a* on the Op bus 160 to Op decode 166 in FIG. 7*f* which sets the Op stage 168 with control information including: (1) the operation code, (2) information for selection of the E-Box unit (FXPU or FLPU) to receive the instruction, (3) whether the results of the instruction are to set the condition code, and (4) the identification of all registers and buffers which are to contain the operands.

As previously mentioned there are six FXOS buffer registers 201 in FIG. 4*a*, and each time an instruction is issued to the FXOS buffer registers 201 over bus 222, an FXOS counter 203 in the I-Box 134 in FIG. 2*b* is incremented by a unit value. This is done under control of an FXOS counter control 1060 in FIG. 7*g*. It is responsive to issuance of an instruction to FXOS 201 from Op stage 169 in FIG. 7*f* to gate into FXOS counter 203 in FIG. 7*g* the incremented value from the counter incrementer 1061. When an instruction in the FXOS 201 is executed in the FXPU 143, a signal STEP FXOS is generated by the Op decoder 224 in FIG. 4*a* and sent on a line 302 to FXOS counter control 1060 in FIG. 7*g* which is thereby conditioned to gate into FXOS counter 203 the output of the decrementer 1062. This reduces the reading in the FXOS counter 203 by one unit. A compare unit 1064 is continuously coupled to the FXOS counter 203, and it generates a signal when the value in FXOS counter 203 is equal to six (0110). This signal is returned on a line 1065 to the FXOS counter control 1060 which responds thereto and sends a signal on a line 1066 to stop the I-Box 134 from issuing any more instructions to FXOS 201 since it is full and cannot accept them. FXOS counter control 1060 is also capable of balancing out the increment and decrement signals so that if both are received on the same cycle, no signal is passed to the FXOS counter 203 which remains unchanged. FXOS counter control 1060 also provides a fast control over the stop signal on line 1066 since it can utilize the incoming STEP FXOS signal on line 302 to block the signal on line 1065 substantially before the decremented value can pass through the counter 203 and comparator 1064 to change the signal on the line 1065.

A substantially similar set of units is provided to control issuance of instructions to the eight instruction buffer registers in the FLOS 184 in FIG. 3. The FLOS counter 186 is provided with an incrementer 1068, a decrementer 1069 and a comparator 1070 which generates an output signal when the value in FLOS counter 186 is equal to eight, thereby indicating that FLOS 184 is full and can accept no more instructions. The FLOS counter control 1072 receives a signal from bus 183 each time an instruction is issued to FLPU 142, and in response thereto it gates the incremented value from incrementer 1068 into counter 186. When a STEP FLOS signal is received on a line 1073 in FIG. 7*g*, the counter control 1072 gates the counter 183 the value output from the decrementer 1079, and as noted above for FXOS counter 203, if both signals are received on the same cycle, no change is made in the counter 186. Similarly also, the stop signal from comparator 1070 on a line 1074 is passed through FLOS counter control 1072 to a line 1076 which signals the I-Box 134 to stop issuance of instructions to FLPU 142.

Many of the machine instructions for the FXPU 143 identify one or more general purpose register 202 as the source register for operands or as the sink register for operands to be generated by the instruction, and other instructions use the values in identified GPR's 202 as base addresses. Since the I-Box may decode and execute instructions out of order, it is important to prevent the I-Box 134 from using the data in a GPR 202 for an address before the execution unit 133 has generated the correct data for such GPR 202. The I-Box 134 is therefore provided with a register unavailable for addressing (RUA) counter 337 and a register unavailable for modification (RUM) counter 335 for each GPR 202. One of the RUA counters 337 is incremented by a unit each time an instruction is issued from Op stage 167 which specifies the associated GPR 202 as the sink register for an instruction, and one RUM counter is decremented by a unit each time the associated GPR 202 is used as such a source by the I-Box.

It is necessary to prevent the I-Box 134 from changing the data in a GPR 202 if there is an outstanding instruction which specifies that a given GPR 202 is the source of data for an unexecuted instruction, and therefore each instruction issued from OP stage 167 which identifies a GPR 202 as a source register causes the RUM counter 335 associated with the GPR to be incremented by a unit. This RUM counter 335 is decremented by the E-Box when the given GPR 202 data has been utilized in the instruction being executed. The RUA counters 337 and RUM counters 335 are essentially the same and they may be any one of various well known types of add-substract counters. A principal condition of interest is a counter reading of zero to indicate the availability to the I-Box of the associated register for executing instructions out of turn or out of order. Each instruction set into Op stage 167 in FIG. 7*f* receives from the bus 161 the identification of a sink register, designated by the R1 portion of an instruction, and possibly a source register, designated by the R2 portion of an instruction. The R1 sink register identification on bus 161 is decoded in select RUA control 338 in FIG. 7*h* to determine an RUA counter 337 to be incremented, and if the instruction is determined by Op decoder 166 to be one in which a sink GPR 202 is specified, the select RUA control 338 is signalled on a line 1077 to send an increment signal over bus 1078 to the selected RUA counter 337. When the FXPU 143 subsequently executes this instruction, it returns a signal to the same RUA counter on a corresponding line of decrement RUA bus 341 to decrement the RUA counter by a unit. When a RUA counter is at zero, there are no outstanding instructions which can change the data therein, and its data is now logically available to the I-Box 134 for use as an address factor in a later instruction.

Figure 7F:
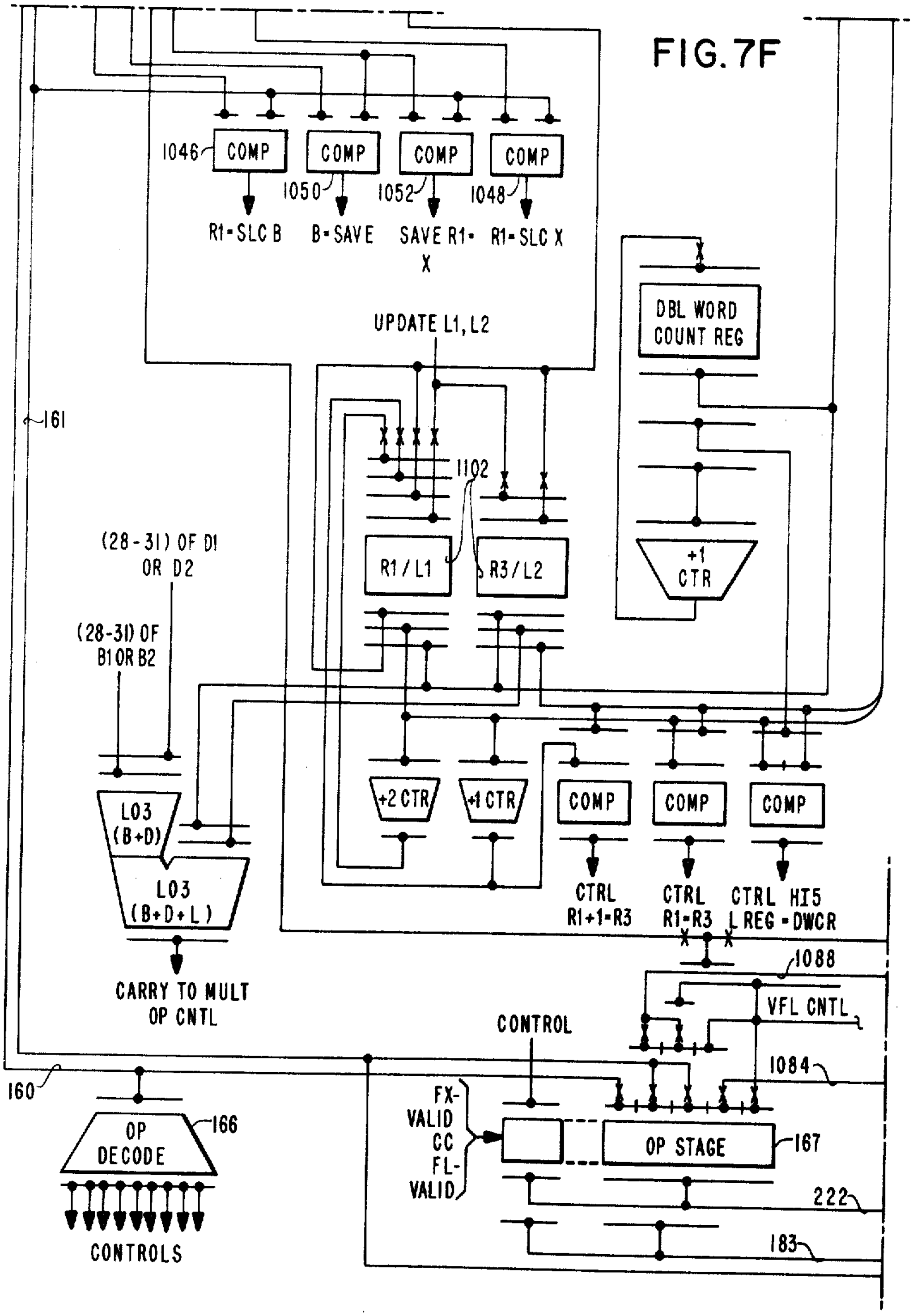
Figure 7G:
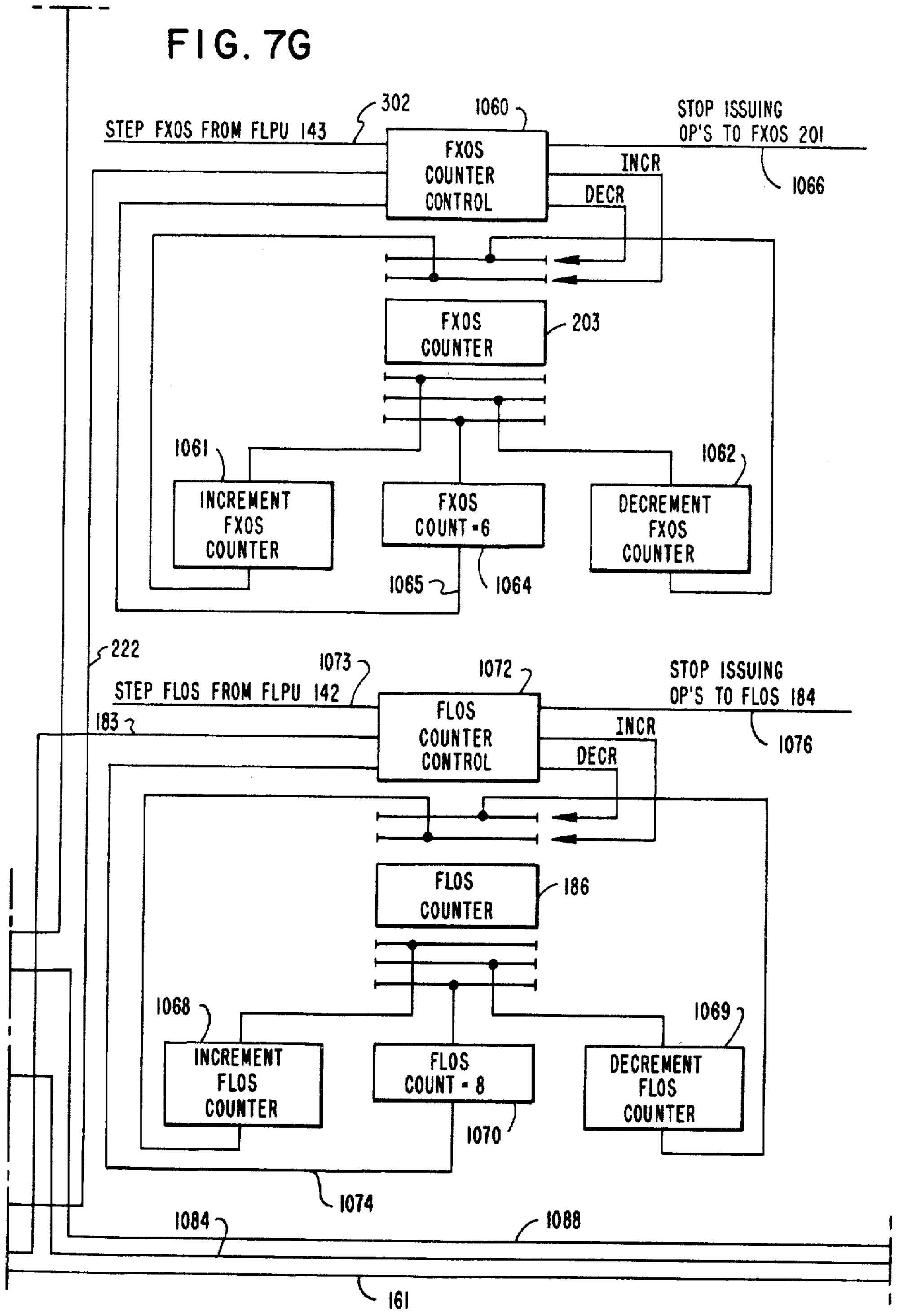
Figure 7H:
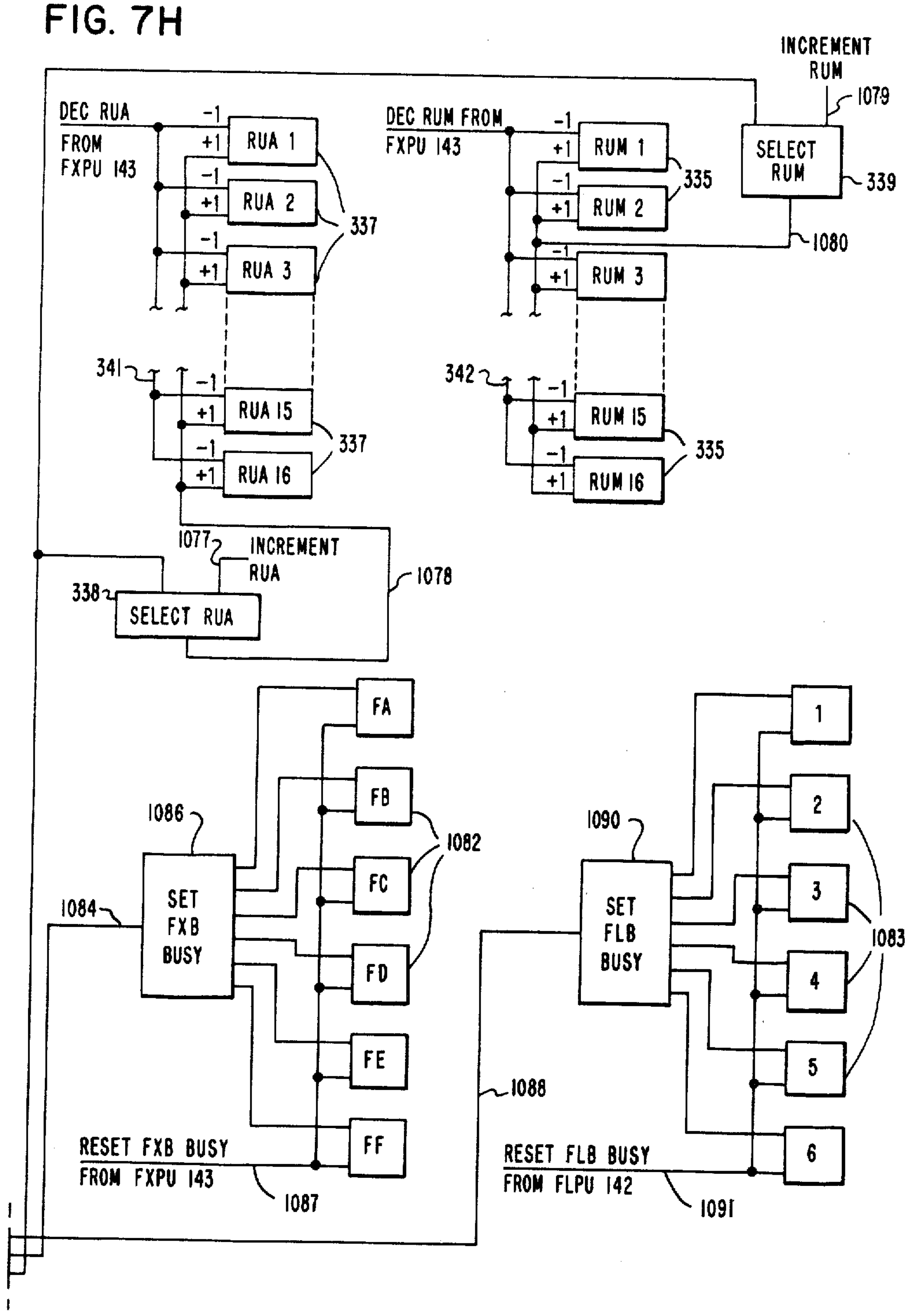

The set of RUM counters 335 are physically the same as the RUA counters 337, and they are selected for incrementing by the select RUM control 339 in FIG. 7*h* when an address for what could be a source register designation is present on address bus 131. If the Op decode 166 in FIG. 7*f* determines that the instruction being issued is one using a GPR 202 as a source register, it sends a signal on line 1079 to the select RUM control 339 in FIG. 7*h* to cause an increment signal to be sent on bus 1080 to the selected RUM counter. When the FXPU 143 executes the instruction for which the identified GPR is the source operand storage, the FXPU sends a decrement RUM signal to the appropriate RUM counter on a bus 342 in FIG. 7*h*. As long as the FXPU 143 needs the data in a given GPR as a source operand, it is not permissible for the I-Box to modify the data for use in a logically following instruction although it would be permissible to use the data in such GPR 202 as an address since there is, so long as the corresponding RUA counter is at zero, no instruction to be executed which will change the data in the GPR. Thus the I-Box 134 is not allowed to use or modify a GPR 202 as long as the associated RUA and RUM counters 337 and 335 are not at zero.

One of the major functions performed by the I-Box 134 when it issues an instruction to the FLPU 142 or the FXPU 143 is to call for a fetch of the operand or operands required from storage for the execution of the instruction, and it must send with the fetch request the identification of the buffer register which is to receive and retain the operand until it is utilized. This same identification is sent with the instruction in place of the original storage address so that the E-Box can find the operand. To determine the buffer register which may be assigned for an instruction the I-Box 134 maintains a busy trigger 1082 in FIG. 7*h* for each of the six fixed point buffer registers 204–210 and a busy trigger 1073 for each of the six floating point buffer registers 185. When an instruction requires the use of an FXB 204–210, the I-Box selects a non-busy one, transmits its identification with the fetch request to MSCE 136, and enters the identification over a bus 1084 into Op stage 167 as a part of the instruction to be sent to FXOS 201. This identification on bus 1084 is decoded in a set FXB busy control 1086 to set the corresponding FXB trigger 1082 to a busy status. This trigger 1082 remains set and prevents further assignment of this FXB 204–210 by I-Box 134 until the operand in the FXB is gated out and used in the FXPU 143. At this time, the FXPU 143 sends a reset FXB busy signal on the proper line of a bus 1087 to reset the busy trigger 1082, thereby freeing the associated one of the buffer registers 204–210 for further assignment by the I-Box 134.

The FLB's 185 are similarly assigned by I-Box 134 for buffering of fetched storage operands, and they may be assigned on either a floating point or a fixed point instruction. The FLB address bus 1088 receives the address of an assigned FLB 185 from the Op stage 167 in FIG. 7*f* and transmits the identification as a part of an instruction to the set FLB busy control 1090 in FIG. 7*h*. The control 1090 decodes the FLB address and sets the corresponding FLB busy trigger 1083 to prevent further assignment of the corresponding FLB 185. When the operand in FLB 185 has been transmitted to an operand utilizing area, a reset FLB busy signal is sent on the corresponding line of a reset FLB busy bus 1091 to reset the FLB busy trigger 1083 and free the corresponding FLB for reassignment by the I-Box 134.

A substantially similar arrangement is provided for control of storage operations. There are three storage address registers (SAR) and three storage data buffers (SDB) in the MSCE 136. See reference 3 above for details. When the I-Box 134 decodes a store instruction, it selects one SAR to receive the storage address and simultaneously the Op stage 167 sends, on either the FXB address bus 1084 or the FLB address bus 1088, the identification of the selected source register or operand location which operates the control circuits 1086 or 1090 to set an appropriate busy trigger. The storage address is sent to the selected SAR from the W register 177 in FIG. 7*b* on the bus 1034 to the MSCE 136 and the pipeline 3 storage Op register 1099 in FIG. 7*c* simultaneously receives the SAR control information. This information is utilized to operate the SAR control 1101 and to set an SAR busy trigger 1094, thereby preventing further assignment of the assigned SAR. After the E-Box has executed the instruction by sending the desired operand to the associated SDB in the MSCE 136 and the MSCE fully executes its part of the store operation, a reset SAR signal is returned by the MSCE 136 on one of the lines 1095 to reset the associated SAR busy trigger 1094 and free the associated SAR for another assignment by the I-Box 134.

It previously was stated that I-Box 134 can handle instructions in several phases at the same time. In the first cycle an instruction has its first eight bits on the left decoded in the Op decoder 166 which then: (1) determines the unit to receive the instruction, (2) assigns buffer registers for the operands to be fetched, (3) passes to the Op stage 167 the designations of the registers (either GPR's 202 or FLR's 187) to be utilized in the execution of the instruction, and (4) transmits this assembled information to the executing unit. If the instruction has an RR format, that is all that is needed, and it will be complete at the end of the cycle unless, as earlier noted, the executing unit cannot accept additional instruction in which case the I-Box 134 stops until it can transmit the instruction.

If an instruction has an RX format, an address generation is required for the storage operand, and the operation code is decoded in the Op decode 166 in FIG. 7*f*. The GPR selection controls 1095 in FIG 7*a* receives the four instruction bits (bits 12–15) designating the GPR 202 which stores the index value; the A bus GPR selection controls 1096 receive the four instruction bits (16–19) designating the GPR 202 storing the base address; and the buffer 165 in FIG. 7*b* receives the 12 bits (20–31) of the displacement value directly from the Op register 159 on the line 164. On the next machine cycle the information supplied to the A bus GPR selection controls 1096 in FIG. 7*a* is decoded to open the gates 1030 in FIG. 7*b* to gate to the A bus 173 the data in the GPR 202 designated as the index register; the information supplied to the B bus GPR selection controls 1095 in FIG. 7*a* is decoded to open the gates 1032 in FIG 7*b* to gate to the B bus 174 the data in the GPR 202 designated as the base register; and the content of the buffer 165 is gated to adder input bus 169. The three sets of data are added together in adder 168 to generate the effective fetch address, and at this time a check of the three low order bits of the address is made in a store instruction to see if the instruction can be a store into the next instruction already being decoded. If the store could be in the next instruction, the next instruction is held up for one machine cycle. At the end of this cycle, the effective address is retained in the W register. All control information necessary for the fetch or store is sent in the decode cycle to a pipeline 2 buffer register 1098 in FIG. 7*c* for retention, and at the end of the second cycle this data is transferred to pipeline 3 buffer register 1099.

During the third cycle the address in the W register 177 is transmitted on the bus 1034 to the MSCE 136, and the control data in the pipeline 3 buffer register 1099 is sent to MSCE. If the instruction is a store instruction, the previously noted comparison is made. The address in the W register 177 is compared in comparator 1041 to determine if the store is to an address (1) already in the instruction buffers 156 or (2) being fetched for a buffer 156. If so, the buffer 156 is set to an empty status, and a new fetch is issued to follow the store instruction. Also, on a store instruction the address of the designated SAR is decoded in SAR control 1101 to set the appropriate SAR gates to receive the address and control data and to set the associated SAR busy trigger 1094 to prevent selection of the given SAR for another store operation.

If the instruction has an RS format, the I-Box operation is the same as that for an RX format except that the bits 12–15 of the instruction are not used as the designation of an index register. Consequently, the B bus GPR selection controls are not set to open a set of gates 1032 on the next cycle. In an SI format instruction the I-Box operation is the same as for an RS format even to gating the eight bits 8–15 of the instruction into the Op stage 167. In this instruction, however, these bits represent data, not register designation.

The SS instruction format is distinct in that it may contain one or two length fields, and it contains two storage addresses, each with a base register designation and a displacement factor. The length fields or field are transferred on the bus 161 to an L register 1102 in FIG. 7*f* for later use, and the first address, bits 16–31, is decoded as in the RS format. In this SS format the decoding of the next instruction is held up for one machine cycle during which the second address is processed in the same manner as the first address was processed in the previous cycle, thus enabling the pipeline buffers 1098 and 1099 in FIG. 7*c* to issue two fetch instructions on successive cycles. If there should be any holdup in the acceptance of instructions by the MSCE 136, the entire I unit 134 stops processing all instructions requiring communication with MSCE 136 until the instructions can be accepted.

There are two inputs to I-Box 134 which are mentioned briefly at this time. In the instructions translate and translate and test, the FXPU 143 requires bytes from a table in storage. The address of the byte is generated by adding to the basic table address held in the W register 177 in FIG. 7*b*, a byte transmitted from the Or 237 in FIG. 4*a* to byte buffer 1103 in FIG. 7*b* which is then gated to the adder B bus 174. The resultant address is used to fetch the needed table word. The other input is used in operations such as pack and unpack in the VFL part of FCPU 143. Here it is at times possible to have operands stored in and fetched from the same address on successive cycles. Because of the prefetching of operands required to maintain rapid processing, this condition must, if it exists, be detected for special processing. When the I-Box 134 finds this condition, it sets controls to insure that the FXPU 143 is not given a fetched byte of such a word until the new word has been stored. In effect all prefetching is suppressed when such an overlap can occur. To speed this up as much as possible, the store and fetch control information from the VFL section of FXPU 143 is introduced directly into pipeline 3 buffer register 1099 over a bus 1105 to start the fetch or store in the first available cycle.

INSTRUCTIONS USING RUA AND RUM COUNTERS

Figure 8A:
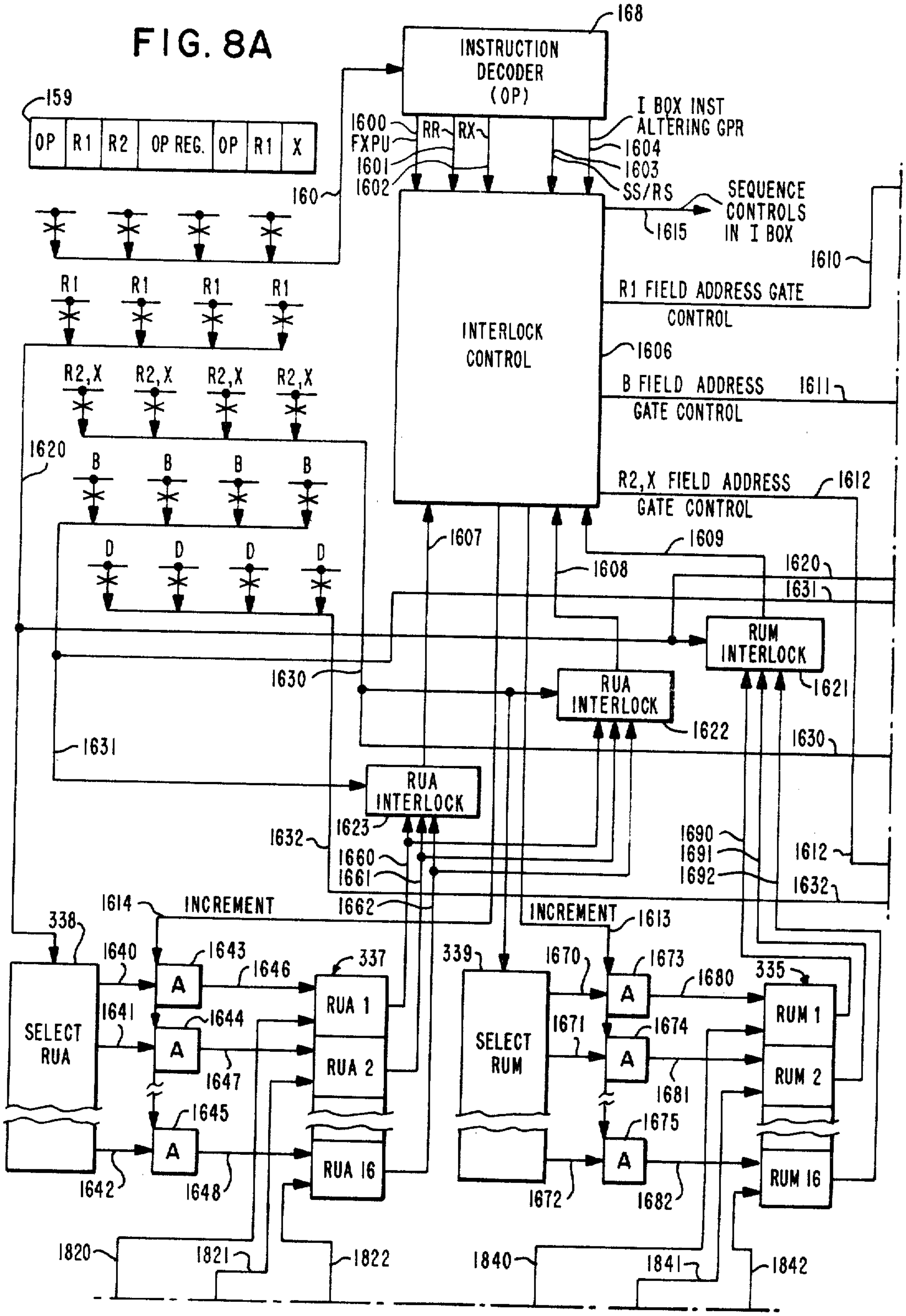
FIGURES 8*a*, 8*b* and 8*c*, when arranged in the manner indicated in FIGURE 8*d*, illustrate in detail selected portions of the I-Box and the E-Box rearranged for convenience to show the invention more precisely.
Figure 8B:
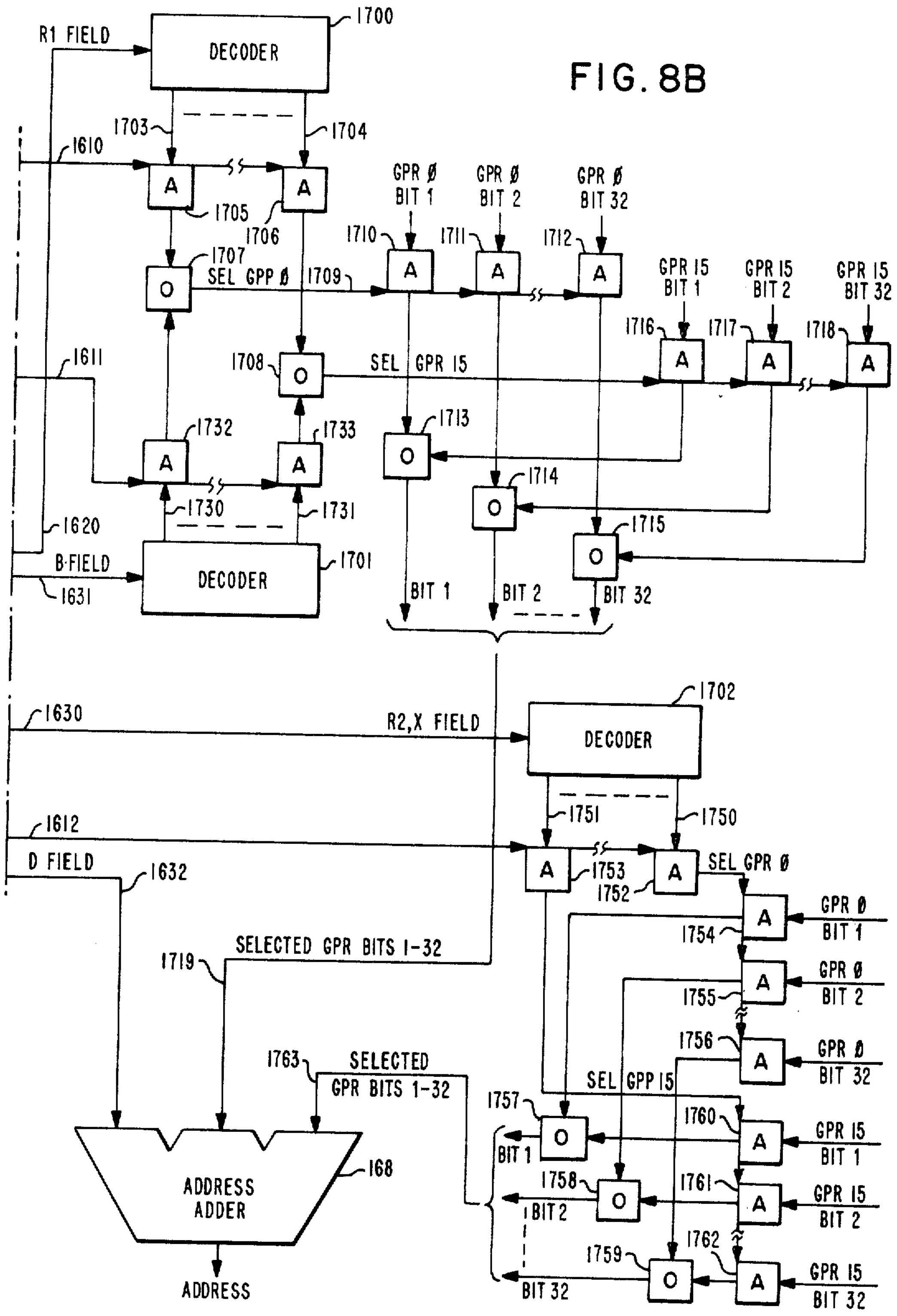
Figures 8C, 8D:
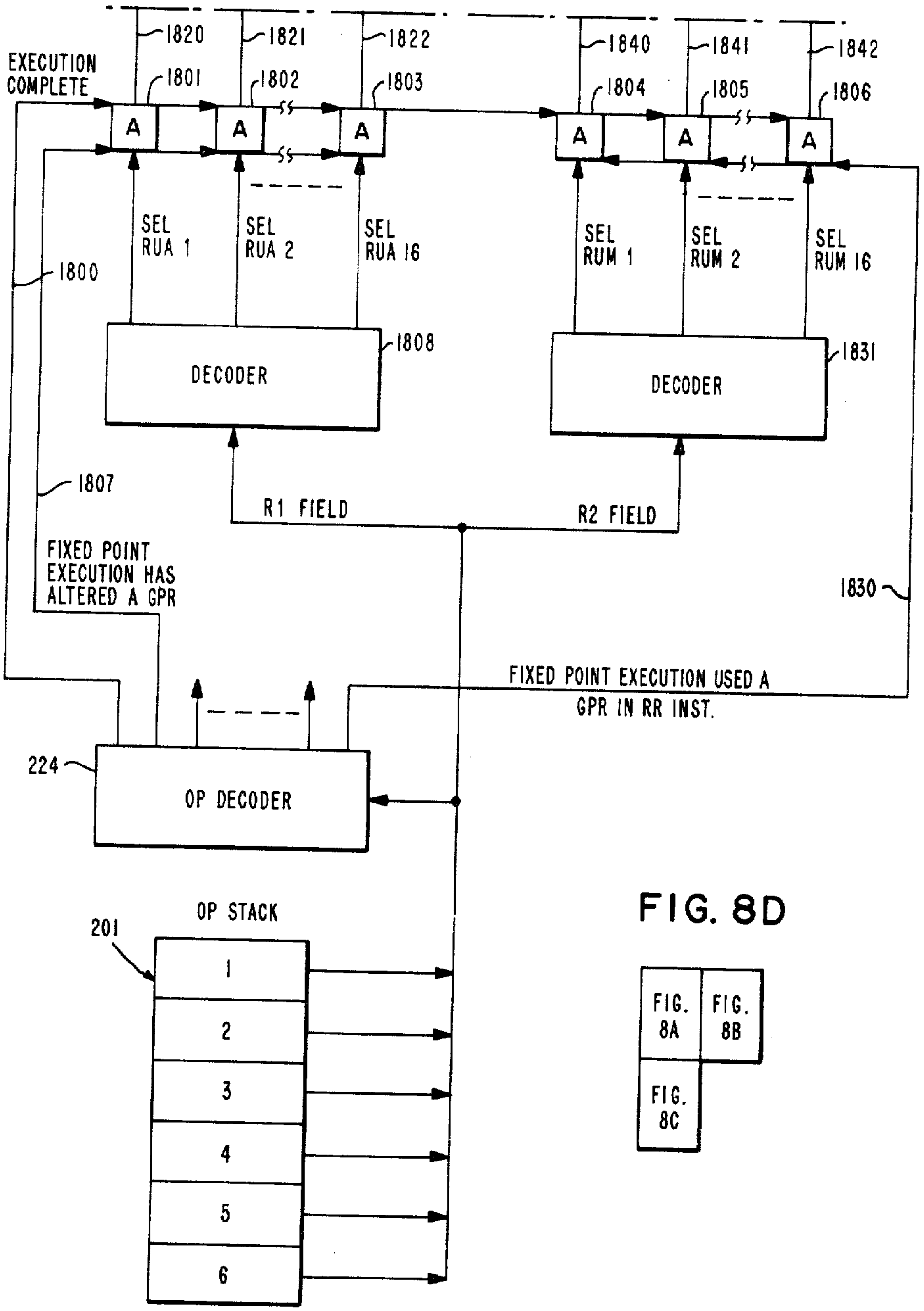

The RUA and RUM counters are used to reserve selected GPR's for various purposes. This is done automatically under program control and it is important from a programming standpoint. The RUM counters may reserve as source registers selected GPR's for subsequent use as operands, and the content of the selected GPR will be used but not modified by the instruction. The RUA counters may reserve selected GPR's for the purpose of address modification, and the content of the selected GPR will be used and modified by the instruction. The RUA and RUM counters in combination with interlocks prevent subsequent instructions in the pipeline from interfering with the content of selected GPR's which hold data yet to be used by earlier instructions. As soon as the earlier instructions have been completed, the RUA and the RUM counters permit execution of the subsequent instructions. Thus a programmer is relieved of the task of spacing instruction in a program which might interfere with each other because they use GPR's, and a further benefit is a more efficient use of computer time in executing programs. In order to understand more fully the unique arrangement and usefulness of the RUA and RUM counters, they are illustrated in greater detail in FIGS. 8*a* through 8*c* in combination with other related portions of the system previously shown and described. FIGS. 8*a* through 8*c* include some components which are scattered throughout various portions of the foregoing system, and they are collected together in these figures along with additional components, to show the system aspects directly concerned with operations involving the RUA and RUM counters. These figures show portions of the I-Box 134 and portions of the E-Box 133 as they relate specifically to the FXPU 142. Corresponding parts of the system previously shown and described are labeled with the same reference numerals where it is convenient to do so. FIG. 8*d* shows how FIGS. 8*a* through 8*c* should be arranged with respect to one another.

Reference is made first to FIG. 8*a* which shows the operation register 159 and its gating network for distributing the various fields of an instruction. Bits of an instruction which relate to an operation code are supplied through a set of gates along the line 160 to the instruction decoder 166 which determines the type of instruction to be performed, and the particular type of instruction decoded is indicated by the lines 1600 through 1605. For example, if the fixed point unit is involved, the line 1600 is energized. The lines 1600 through 1605 are supplied to an interlock control 1606. The interlock control 1606 receives additional inputs on lines 1607 through 1609. The interlock control 1606 supplies outputs on lines 1610 through 1612 which control the selection of gates and hence the addressing of selected GPR's, and the interlock control 1606 supplies signals on the lines 1613 and 1614 for incrementing the associated RUA and RUM counters. Signasl are supplied by the interlock control 1606 on the line 1615 to the sequence control of the I-Box.

Information in the R1 field of an instruction is supplied from the operation register 159 through a set of gates and along a line 1620 to a circuit 338 labeled select RUA. There are four bits conveyed along the line 1620 to the select RUA 338, and these bits are supplied also to a circuit 1621 labeled RUM interlock. The RUM interlock 1621 and RUA interlocks 1622 and 1623 serve to indicate the state of the associated RUM counters 335 and RUA counters 337.

Data in the R2, X fields of an instruction is supplied from the operation register 159 through a set of gates along a line 1630 to the RUA interlock 1622. There are four bits in the R2 field which is supplied along the line 1630 to the RUA interlock 1622, or there are four bits in the X field which is supplied along the line 1630 to the RUA interlock 1622. Data in the B field of an instruction is supplied from the operation register 159 through a set of gates along a line 1631 to the RUA interlock 1623. The B field includes four bits. Data in the D field of in instruction is supplied from the operation register 159 through a set of gates along a line 1632 to one input of an adder 168 in FIG. 8*b*. There are 12 bits in the D field.

The select RUA 338 responds to the four bits of the R1 field and it selects one, and only one of 16 output lines.

Only three output lines 1640 through 1642 are shown, however, and they are connected to associated And circuits 1643 through 1645. The output of these And circuits are connected by associated lines 1646 through 1648 to respective RUA counters 1, 2 and 16. The remaining RUA counters and their associated And circuits are not shown in the interest of simplicity. As explained earlier the I-Box may execute subsequent instructions out of order if specified GPR's are not reserved by earlier instructions. For this reason it is necessary for the I-Box to sample the state of specified RUA counters at such times to determine whether or not the associated counters contain all zeros. All zeros indicates that the associated GPR is available. For this purpose the lines 1660 through 1662 are employed with the associated RUA counters 1, 2 and 16 to indicate whether their content is zero or not. The lines 1660 through 1662 are connected to the RUA interlock 1623. These lines are energized with a given signal level to indicate that the content of its associated RUA counter is all zeros, and these lines are energized with a different level to indicate that the content of the associated counters is not all zeros. The magnitude of the content of a counter, if it is not all zeros, is not material to the I-Box since it cannot use the associated GPR to execute an instruction out of order.

The select RUM 339 responds to four bits in either the R2 or X fields which are supplied as an input on the line 1630. The select RUM 339 energizes one, and only one, of its 16 outputs, but only three output lines 1670 through 1672 are shown, however. These lines are connected to associated And circuits 1673 through 1675, and these And circuits are connected by respective lines 1680 through 1682 to the RUM counters 1, 2 and 16. The remaining associated And circuits and RUM counters are omitted in the interest of simplicity. The state of the RUM counters 1, 2 and 16 are indicated by signals on the respective lines 1690 through 1692 which are connected to the RUM interlock 1621. The signals on the lines 1690 through 1692 have one level when the associated RUM counters contain all zeros, and these lines have a different level when the associated RUM counters do not contain all zeros. The state of the RUM counters is sampled by the I-Box for reasons stated above.

Reference is made next to FIG. 8*b* wherein decoders 1700, 1701 and 1702 are employed for the purpose of selecting a given GPR for transfer of its content to the add 168. The four bits in the R1 field are transferred on the line 1620 to the decoder 1700, and this decoder responds to these four bits to select one, and only one, of the sixteen GPR's. The decoder 1700 has sixteen output lines for selection purposes, but only lines 1703 and 1704 are shown in the interest of simplicity. These lines are connected to respective And circuits 1705 and 1706. These And circuits in turn are connected to the respective Or circuits 1707 and 1708. If the And circuit 1705 is operated, the Or circuit 1707 is operated to send a signal on a line 1709 to condition a set of gates 1710 through 1712 to pass the content of GPR 0 (zero) through a set of Or circuits 1713 through 1715 along a line 1719 to the center input of the added 168. If the And circuit 1706 is selected by the decoder 1700, it passes a signal through the Or circuit 1708 to energize a set of gates 1716 through 1718 to pass signals from GPR 15 through the set of Or circuits 1713 through 1715 along the line 1719 to the center input of the adder 168. The circuitry for passing the content of GPR's 1 through 15 to the adder 168 is not shown in the interest of simplicity.

The four bits in the B field are passed on the line 1631 to the decoder 1701 which then selects one, and only one, of its sixteen outputs. Only two output lines 1730 and 1731 are shown. These lines are connected to associated And circuits 1732 and 1733 which in turn are connected to the respective Or circuits 1707 and 1708, the outputs from which select GPR 0 or GPR 15 as explained above.

Four bits in the R2 field or four bits in the X field are transferred on the line 1630 to the decoder 1702 which then selects one, and only one of its sixteen outputs, but only two of such outputs are shown. The two output lines are 1750 and 1751 which are connected to respective And circuits 1752 and 1753. If the And circuit 1752 is selected by the decoder 1702, its output conditions a set of gates 1754 through 1756 which in turn pass the content of GPR 0 through an associated set of Or circuits 1757 through 1759 to the right most input of the adder 168. If the And circuit 1753 is selected by the decoder 1702, its output conditions a set of And circuits 1760 through 1762 which pass the content of GPR 15 through associated Or circuits 1757 through 1759 to the right most input of the adder 168.

The D field of the operation register 159 in FIG. 8*a* is supplied on a line 1632 to the left most input of the adder 168 in FIG. 8*b*. It is pointed out that the D field is supplied to the adder 168 without further gating after it is gated from the operation register 159 in FIG. 8*a*. However, a GPR selected by the decoder 1700, the decoder 1701 or the decoder 1702 is not gated unless the respective one of the control lines 1610, 1611 or 1612 is energized by the interlock control 1606. The interlock 1606 serves to prevent the use of a selected GPR when it is not permissible to do so because it has been reserved by a previous instruction. For this purpose the interlock control 1606 first samples the state of the selected counter or counters through the interlocks 1621–1623, and if such a counter or counters contain all zeros, it issues proper signal levels on the control lines 1610 through 1612 to permit the transfer of the content of the GPR or GPR's selected by the decoders 1700, 1701, or 1702. One or two, but not three, GPR's may be selected by a given instruction.

Reference is made next to FIG. 8*c* for the purpose of illustrating the decrementing of the RUA and RUM counters upon execution of instructions which have reserved or preempted selected GPR's. The Op stack 201 in FIG. 8*c* supplies instructions in sequence to the Op decoder 224 for execution in the FXPU as previously explained with reference to FIGS. 4*a* and 4*b*. Once the Op decoder 224 completes an instruction, it sends a signal on a line 1800 which signifies the completion. The signals on the line 1800 condition one set of And gates 1801 through 1803 and another set of And gates 1804 through 1806. If the fixed point unit has altered a GPR in the course of executing an instruction, a signal is passed also on a line 1807 to condition the set of And circuits 1801 through 1803, and the R1 field used by instruction is supplied to a decoder 1808. The decoder 1808 responds to the four bits of the R1 field of such an instruction and selects the same RUA counter which previously was incremented by this instruction. In this case, however, the selected one of the And circuits 1801 through 1803 supplies a signal on a respective one of the lines 1820 through 1822 to the selected RUA counter, and this counter is decremented. If the decrementing operation causes the selected RUA counter to return to all zeros, then the GPR associated with the selected RUA counter is available for use by the I-Box to execute subsequent instructions out of order.

If, on the other hand, an instruction is completed by the Op decoder 224 and such instruction involves the FXPU using a GPR in an RR instruction, a line 1830 is energized to condition the set of gates 1804 through 1806. Again, the line 1800 is energized to signify completion of the instruction, and the signal on this line conditions the set of gates 1804 through 1806. The four bits of the R2 field of this instruction are supplied to a decoder 1831, and one of its sixteen outputs is selected. The associated one of the And circuits 1804 through 1806 passes a signal on a respective one of the lines 1840 through 1842 to the selected RUM counter. The signal on the selected one of the lines 1840 through 1842 decrements the associated RUM counter, and if such counter is returned to all zeros by the decrementing operation, its associated GPR becomes available for use by the I-Box to execute subsequent instruction.

Figure 9:
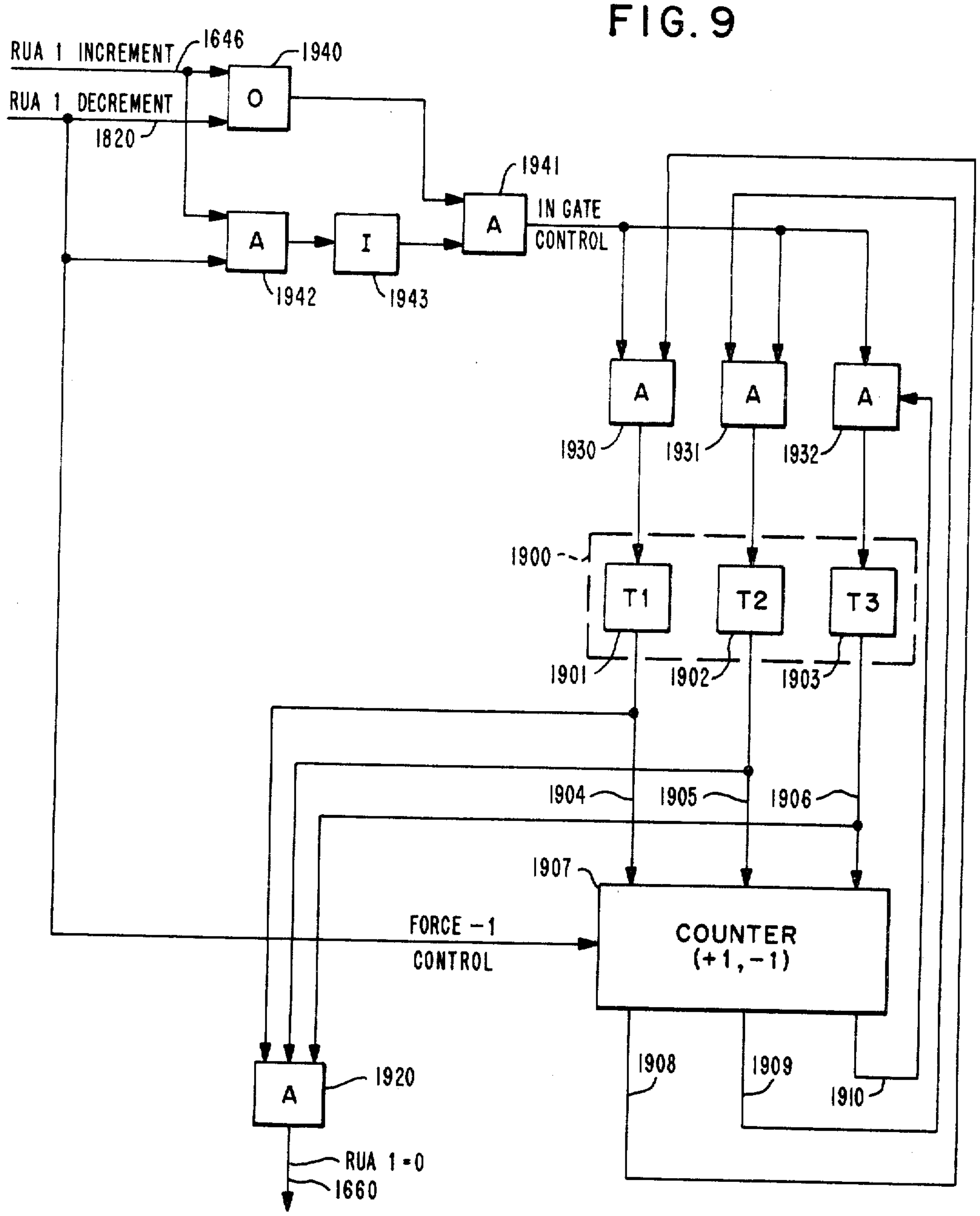
FIGURE 9 illustrates in detail the RUA and RUM counters illustrated in block form in FIGURE 8*a*.

Reference is made next to FIG. 9 for a detailed illustration of a suitable circuit which may be employed as an RUM counter or an RUA counter depicted in block form in FIG. 8*a*. The circuit in FIG. 9 includes a register 1900 composed of triggers T1, T2 and T3 labeled 1901 through 1903. The triggers are connected by associated lines 1904 through 1906 to a counter 1907 which responds to the value represented by the input signals and supplies on the output lines 1908 through 1910 a value of one unit greater than the input value. The circuit in FIG. 9 is arbitrarily designated RUA 1, and the input lines and the output lines are labeled accordingly. If the line 1820 is energized with a decrement signal, the counter 1907 responds to this signal and supplies on its output lines 1908 through 1910 a value which is one less than the the value supplied on the input lines 1904 through 1906. The counter 1907 serves as an incrementer unless it is forced to decrement by a signal on the line 1820. The output from the register 1900 is supplied on the lines 1904 through 1906 to an And circuit 1920, and if each of the stages T1 through T3 of the register 1900 are reset to zero, the And circuit 1920 supplies a level on the output line 1660 to the RUA interlock 1623 in FIG. 8*a* to signify this fact. If the stages 1901 through 1903 all contain zeros, this indicates that the associated GPR is available for use. Otherwise, the associated GPR is not available for use if any one of the stages T1 through T3 is not zero.

The output from the counter 1907 is supplied on the lines 1908 through 1910 to respective And circuits 1930 through 1932. These And circuits are normally blocked, and they are operated if, and only if, an incrementing or decrementing operation takes place. Whenever an incrementing operation takes place, the line 1646 is energized with a signal which is passed by an Or circuit 1940 to an And circuit 1941. Let it be arbitrarily assumed that an incrementing or decrementing signal on respective lines 1846 or 1820 is a positive level, and let it be assumed further that these lines are energized with a negative signal level when an incrementing or a decrementing operation does not take place. If an incrementing operation takes place, a positive signal on the line 1646 passes through the Or circuit 1940 and conditions one input of the And circuit 1941. The line 1820 has a negative level at this time because a decrementing operation is not taking place. The negative level on the line 1820 deconditions the And circuit 1942, and its negative output is converted by an inverter 1943 to a positive signal level on the second input of the And circuit 1941, thereby conditioning the And circuit 1941. Thus the And circuit 1941 passes a positive signal level which operates the gates 1930 through 1932 and permits entry of the incremented value to the triggers T1 through T3 of the register 1900. An incrementing operation takes place because the negative level on the line 1820 to the counter 1907 is not effective to force decrementing. When the positive signal level on the line 1646 terminates, the And circuits 1930 through 1933 are de-energized thereby blocking the passage of signals from the counter 1907 to the register 1900. The value then stored in the register 1900 is one greater than the old value previously held therein.

If a decrementing operation takes place, the line 1820 is energized with a positive signal level, and the line 1646 is energized with a negative signal level. The positive signal level on the line 1820 forces the counter 1907 to reduce the content of the register 1900 by the value of one, and the decremented value is supplied on the lines 1908 through 1910 to the And circuits 1930 through 1932. The positive level on the line 1820 passes through the Or circuit 1940 to condition one of the inputs of the And circuit 1941. The negative signal level on the line 1646 deconditions the And circuit 1942 whereby it supplies a negative level to the inverter 1943 which in turn supplies a positive output signal on the second input of the And circuit 1941, thereby conditioning this And circuit. The positive signal level from the And circuit 1941 operates the And circuits 1930 through 1932 to pass the decremented value to the register 1900 where it is stored. As soon as the positive signal level on the line 1820 terminates, the And circuits 1930 through 1932 are deconditioned, thereby isolating the inputs of the register 1900 from the outputs of the counter 1907.

Figure 10:
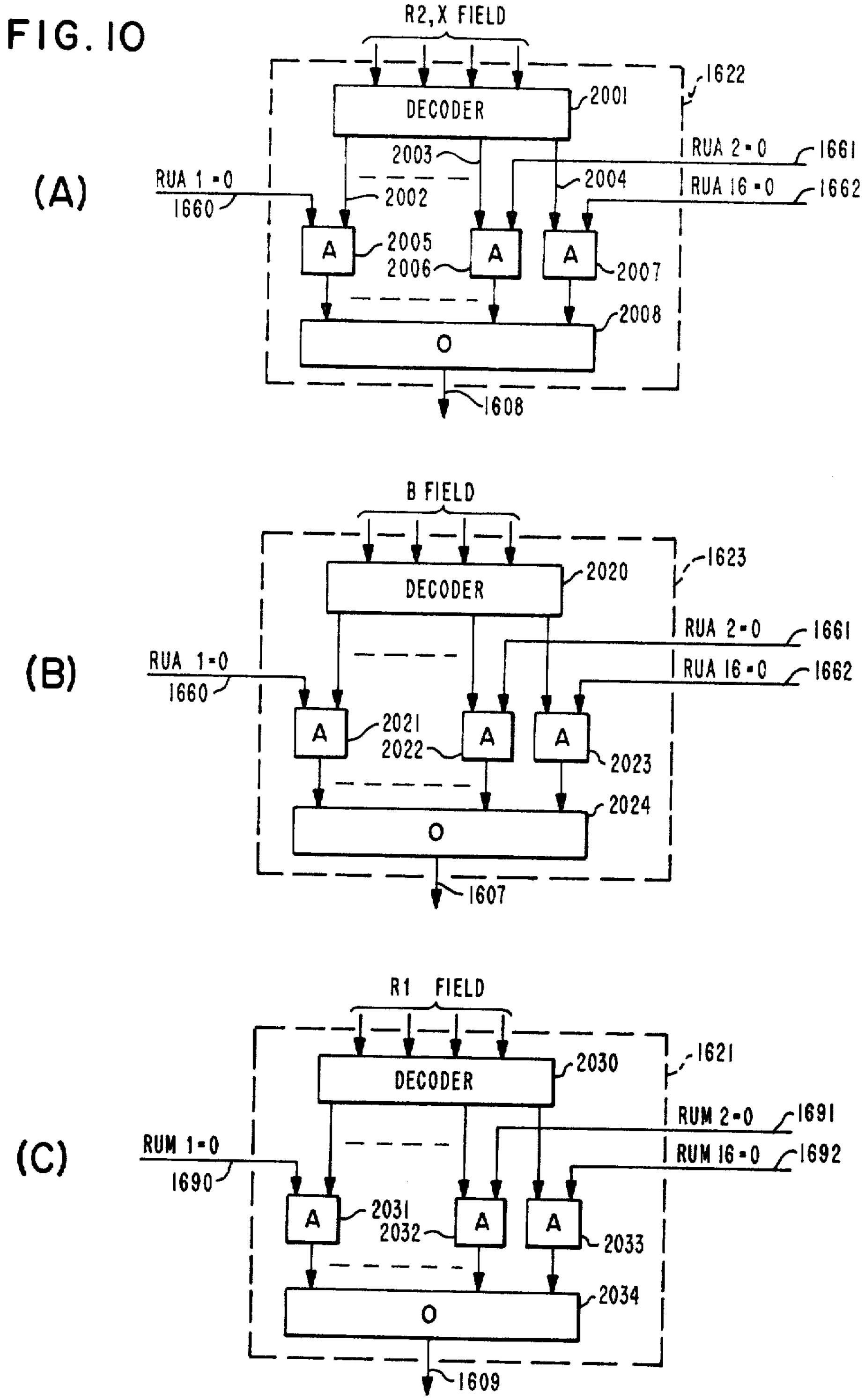
FIGURE 10 illustrates in detail the RUA and RUM interlocks illustrated in block form in FIGURE 8*a*.

Reference is made next to FIGS. 10*a*, 10*b* and 10*c* which illustrate in detail suitable circuits for use in the RUA interlocks 1622 and 1623 and the RUM interlock 1621 shown in block form in FIG. 8*a*. Referring first to FIG. 10*a*, the four bits from the R2 field or X field of an instruction are applied to a decoder 2001, and it selects one of sixteen outputs, only three of which are shown in the interest of simplicity. These output lines are 2002, 2003 and 2004, and they are connected to respective And circuits 2005, 2006 and 2007. The And circuit 2005 receives a signal on a line 1660 which indicates the status of RUA 1. The And circuit 2006 receives a signal on the line 1661 which signifies the status of RUA 2, and the And circuit 2007 receives a signal on the line 1662 which indicates the status of RUA 16. The outputs from the And circuits 2005, 2006 and 2007 are connected to an Or circuit 2008, and the output of this Or circuit is supplied on the line 1608 to the interlock control 1606 in FIG. 8*a*. The interlock 1622 thus serves to sample the status of the RUA counter selected by the R2 or X fields and signal the interlock control 1606 to permit or inhibit the gating of the content of the selected GPR to the adder 168 in FIG. 8*b*.

The RUA interlock 1623 in FIG. 10*b* is identical in construction and operation to the RUA interlock 1622 in FIG. 10*a* except its decoder 2020 responds to the B field of an instruction to operate the And circuits 2021 through 2023 and the Or circuit 2024 to supply a status signal of the selected RUA counter on the output line 1607 to the interlock control 1606 in FIG. 8*a*.

The RUM interlock 1621, shown in block form in FIG. 8*a*, is illustrated in detail in FIG. 10*c*, and it is identical in construction and operation to the RUA interlock 1622 except its decoder 2030 responds to the four bits of the R1 field of an instruction to operate the And circuits 2031 and 2033 and the Or circuit 2034 to provide a status signal on the output line 1609 to the interlock control 1606 in FIG. 8*a*. The RUM interlock 1621 serves to sample the state of the RUM counters in FIG. 8*a* and signal the interlock control 1606 to inhibit or permit the I-Box use of the selected GPR.

Figure 11:
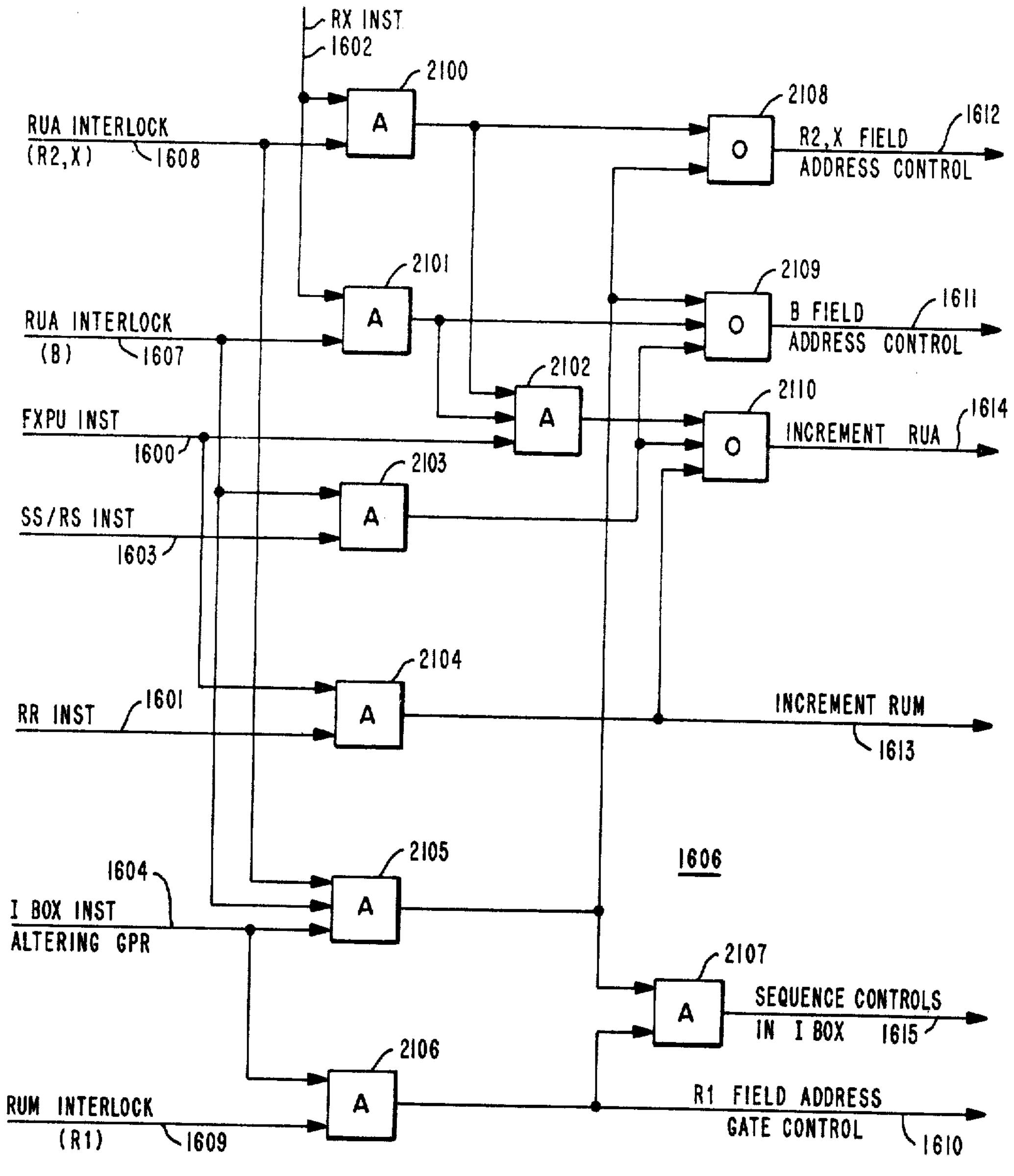
FIGURE 11 illustrates in detail the interlock control shown in block form in FIGURE 8*a*.

Reference is made next to FIG. 11 which illustrates in detail the interlock control 1606 which is shown in block form in FIG. 8*a*. And circuits 2100 through 2107 and Or circuits 2108 through 2110 are connected as illustrated to perform the interlock control functions of inhibiting or permitting the use of GPR's by an I-Box instruction. The And circuit 2100 provides an output signal through the Or circuit 2108 on the control line 1612 to permit the transfer of the content of a selected GPR: (1) whenever an RX instruction is decoded by the instruction decoder 168 in FIG. 8*a* and the line 1602 is properly energized, and (2) whenever the RUA interlock 1622 in FIG. 8*a* supplies a proper signal on the line 1608, signifying the GPR is available for use, to the And circuit 2100 in FIG. 11. The And circuit 2101 in FIG. 11 responds to a signal on the line 1602, signifying that an RX instruction has been decoded, and a signal on the line 1607 from the RUA interlock 1623, signifying that the selected GPR is available, to provide an output signal throught the Or circuit 219 to the output line 1611 which gates the content of the GPR selected by the B field of the instruction to the adder 168 in FIG. 8*b*. The And circuit 2102 supplies an output signal through the Or circuit 2110 along the line 1614 for incrementing the selected RUA counter in FIG. 8*a* whenever certain conditions are met. The conditions are these: (1) an RX instruction is decoded, and the line 1602 is energized; (2) an R2 field or an X field has received approval to use a selected GPR as signified by an output from the RUA interlock 1622 in FIG. 8*a* on the line 1608 to the And circuit 2100 in FIG. 11; (3) approval to use a GPR selected by the *b* field of the instruction is obtained by the RUA interlock 1623 in FIG. 8*a* thereby providing an output signal on the line 1607 to the And circuit 2101 in FIG. 11; and (4) the given RX instruction is for the FXPU as signified by a signal from the instruction decoder 168 in FIG. 8*a* along the line 1600 to the And circuit 2102 in FIG. 11. When all these conditions are met, the And circuit 2102 supplies an output signal through the Or circuit 2110 and along the line 1614 to increment the selected RUA counter. It is pointed out that an RX instruction of this type selects two GPR's and their contents are transferred simultaneously to different inputs of the adder 168 in FIG. 8*b*. The contents of the two selected GPR's are added together along with the twelve bits supplied by the D field to generate a storage address.

The And circuit 2103 in FIG. 11 supplies an output signal (1) through the Or circuit 2109 to the control line 1611 to transfer the content of a selected GPR to the adder 168 in FIG. 8*b* and (2) through the Or circuit 2110 to increment the selected RUA counter upon the following conditions: (A) an SS/RS instruction is decoded in the instruction decoder 168 in FIG. 8*a* which energizes the line 1603 with a signal which conditions the And circuit 2103 in FIG. 11; and (B) a GPR selected by the B field of the instruction is available for use and indicated by a signal on the line 1607 from the RUA interlock 1623 in FIG. 8*a*.

The And circuit 2104 in FIG. 11 supplies an output signal on the line 1613 whenever (1) an RR instruction is decoded in the instruction decoder 168 in FIG. 8*a* and the line 1601 is energized with a signal which conditions one input to the And circuit 2104 in FIG. 11; and (2) the instruction is for the FXPU and the line 1600 is energized with a signal which conditions the other input to the And circuit 2103. The output signal from the And circuit 2104 on the output line 1613 increments the RUM counter selected by the R2 field of the instruction, and this signal also is applied through the Or circuit 2110 in FIG. 11 and along the output line 1614 to increment the RUA counter selected by the R1 field of the instruction.

When the And circuit 2105 in FIG. 11 is operated, it supplies an output signal (1) through the Or circuit 2108 and along the line 1612 to control the gating of the selected GPR by the R2, X field to the adder 168 in FIG. 8*b*, (2) through an Or circuit 2109 and along the line 1611 to control the gating of the GPR selected by the B field, and (3) through an And circuit 2107, when the And circuit 2106 is operated, to an output line 1615 which supplies operating signals to the sequence controls of the I-Box. The And circuit 2105 is operated when (1) an I-Box instruction altering a GPR is decoded in the instruction decoder 168 in FIG. 8*a* and the output line 1604 conveys a signal which conditions the one input of the And circuit 2105 in FIG. 11; (2) the RUA interlock 1623 in FIG. 8*a* supplies a signal on the line 1607 which conditions a second input of the And circuit 2105 in FIG. 11; and (3) the RUA interlock 1622 in FIG. 8*a* supplies a signal on the output line 1608 which conditions the third input of the And circuit 2105 in FIG. 11.

The And circuit 2106 in FIG. 11 responds to the signals on the line 1604 from the instruction decoder 166 in 8*a* and a signal on the line 1609 from the RUM interlock 1606 in FIG. 8*a* to provide an output on the line 1610 to gate the content of the GPR selected by the R1 field to the adder 168 in FIG. 8*b*. Also, the output of the And circuit 2106 is supplied to the And circuit 2107, and if the And circuit 2107 is conditioned by a signal level from the And circuit 2105, it supplies an output on the line 1615 to operate the sequence controls in the I-Box.

FORMAT OF INSTRUCTIONS

Figure 12:
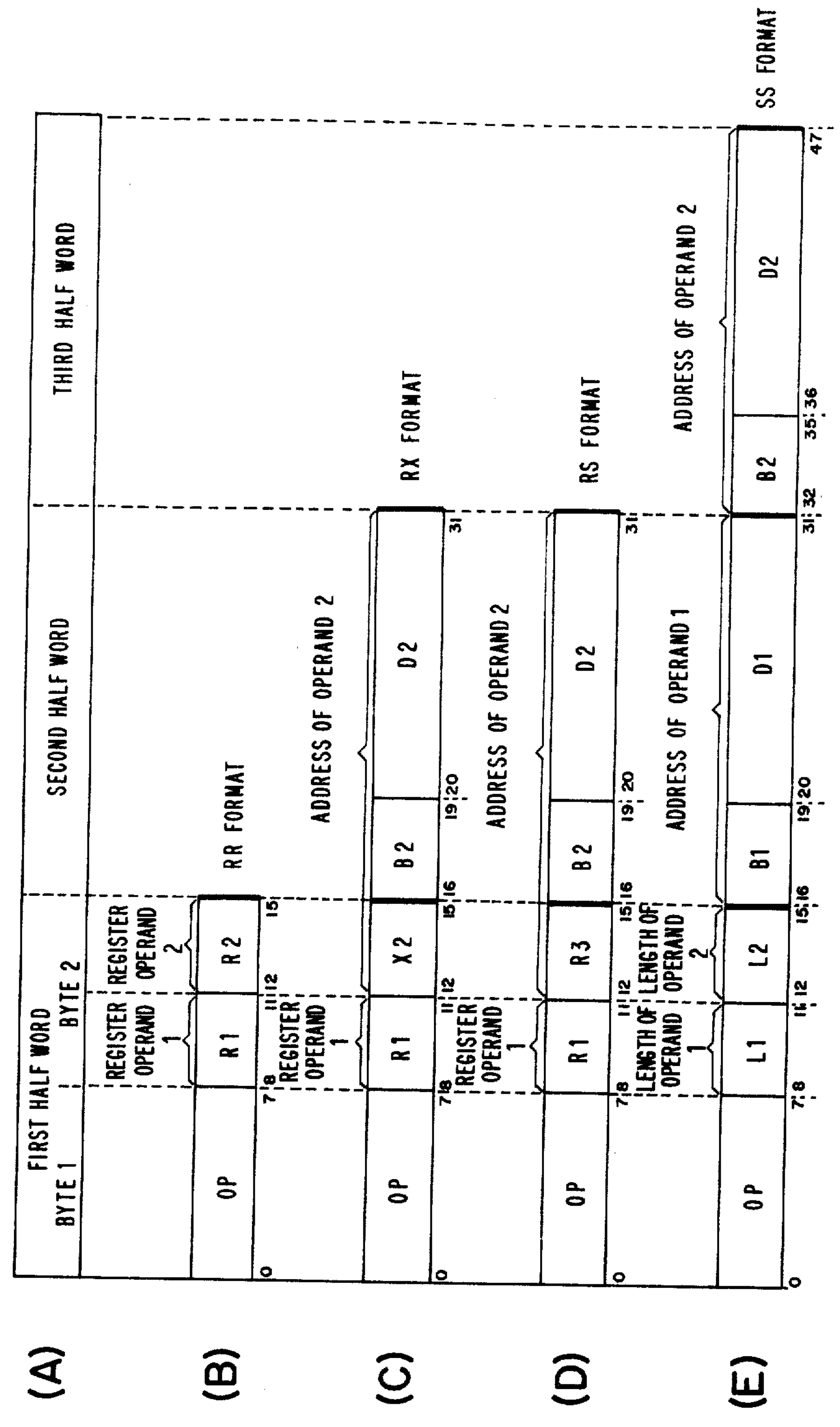
FIGURE 12 illustrates instruction formats and the component parts thereof.

Reference is made next to FIG. 12 which shows the format of some instructions which, after being decoded in the instruction decoder 168 in FIG. 8*a*, might use the RUA or RUM counters. FIG. 12*a* illustrates that instruction words may be 1, 2 or 3 half-words in length. FIG. 12*b* shows an instruction which is one half-word long with an RR format. FIG. 12*c* and FIG. 12*d* illustrate instructions of the RX format and RS format, respectively, and each is two half-words in length. FIG. 12*e* shows an instruction which is three half-words in length, and it has the SS format. The R, X and B fields are each four bits in length, and each selects a general purpose register which holds either an operand or a base address, depending upon the instruction. The L field specifies the length of an operand. A D field includes twelve bits of data which represents a displacement, and it is added directly to a base address. For example, in FIG. 12*c* an instruction having an RX format is illustrated, and the quantity D2 is added directly to the content of the general purpose register specified by the X2 field and the content of the general purpose register specified by the B2 field in order to obtain the address of the second operand of the instruction. The first operand of an instruction having the RX format is held in a general purpose register specified by the R1 field. An instruction having the SS format specifies two operands which must be obtained from storage. The address in storage of the first operand is obtained by adding the content of the D1 field to the content of a general purpose register specified by the B1 field. The address of the second operand is similarily obtained by adding the content of the D2 field to the content of a general purpose register specified by the B2 field.

The number of references to storage is indicated by the length of an instruction format. An instruction consisting of only one half-word causes no reference to storage since both operands are disposed in the general purpose registers, and they may be located by the R1 and R2 fields. A two half-word instruction provides one storage address for referencing main storage. A three half-word instruction provides two storage addresses for referencing the main storage. All instructions are located in storage on integral boundaries for half-words.

The four basic instruction formats illustrated in FIG. 12 as RR, RX, RS and SS denote in general terms the operation to be performed. RR denotes a register-to-register operation; RX denotes a register-to-indexed-storage operation; RS denotes a register-to-storage operation and SS denotes a storage-to-storage operation.

For purposes of describing the execution of instructions, operands are designated as first and second operands, and, in the case of branch on index, third operands. These names refer to the manner in which the operands participate. The operand to which a field in an instruction format applies is generally denoted by the number following the code name of the field, for example, R1, B1 or L1. In each format the first instruction half-word consist of two parts. The first byte contains the operation code (Op code). The length and format of an instruction are specified by the first two bits of the operation code as indicated in Table 1 below.

TABLE 1

| | Instruction Length | Format |
|---|---|---|
| Bit Positions (0–1): | | |
| 00 | One half-word | RR |
| 01 | Two half-words | RX |
| 10 | do | RS |
| 11 | Three half-words | SS |

The second byte is used either as two four-bit fields or as a single eight-bit field. This byte can contain the following information:

four-bit operand register specification (R1, R2 or R3)
four-bit index register specification (X2)
four-bit operand link specification (L1 or L2)
eight-bit operand link specification (L)

In some instances a four-bit field or the whole second byte of the first half-word is ignored. The second and third half-words always have the same format, namely, a four-bit base register designator (B1 or B2), followed by a 12-bit displacement (D1 or D2).

For address generation purposes using the RUA and RUM counters, operands may be grouped into two classes: explicity addressed operands in main storage and operands located in the general or floating point registers. The address employed to refer to main storage is generated from the following three binary numbers:

*Base Address* (B) is a 24-bit number contained in a general purpose register specified by the program in the B field of an instruction. The B field is included in every address specification. The base address may be used as a means of static relocation of programs and data. It can specify the location of an array in calculations involving arrays, and it can identify a record in those programs involving record-type processing. The base address provides for addressing the entire main store, and the base address may be used also for indexing purposes.

*Index* (X) is a 24-bit number contained in a general purpose register specified by the program in the X field of the instruction. It is included only in the address specification by the RX instruction format. The index can be used to provide the address of an element within an array, and thus the RX format instruction permits double indexing.

*Displacement* (D) is a 12-bit number contained in the instruction format. It is included in every address computation. The displacement provides for relative addressing up to 4095 bytes beyond the element or base address. In array-type calculations the displacement may be used to specify one of many items associated with an element. The displacement can be used to identify items within a record in the processing of records.

In forming an address the base address and the index are treated as unsigned 24-bit positive binary integers. The displacement is similarly treated as a 12-bit position binary integer. The three are added as 24-bit binary numbers, ignoring overflow. Since every address includes a base, the sum is always 24-bits long. The address bits are numbered 8–31 corresponding to the numbering of the base address and index bits in the general purpose register.

A program may have zeros in the base address, index or displacement fields. A zero is used to indicated the absence of the corresponding address component. A base or index of zero implies that a zero quantity is to be used in forming the address, regardless of the content of general purpose register 0. A displacement of zero has no special significance. Initialization, modification, and testing of base addresses and indexes can be carried out by fixed-point instructions, or by branch and link, branch on count, or branch on index instructions.

PROGRAM EXECUTION INVOLVING INSTRUCTIONS WHICH MAY USE RUA OR RUM COUNTERS

Figure 13A:
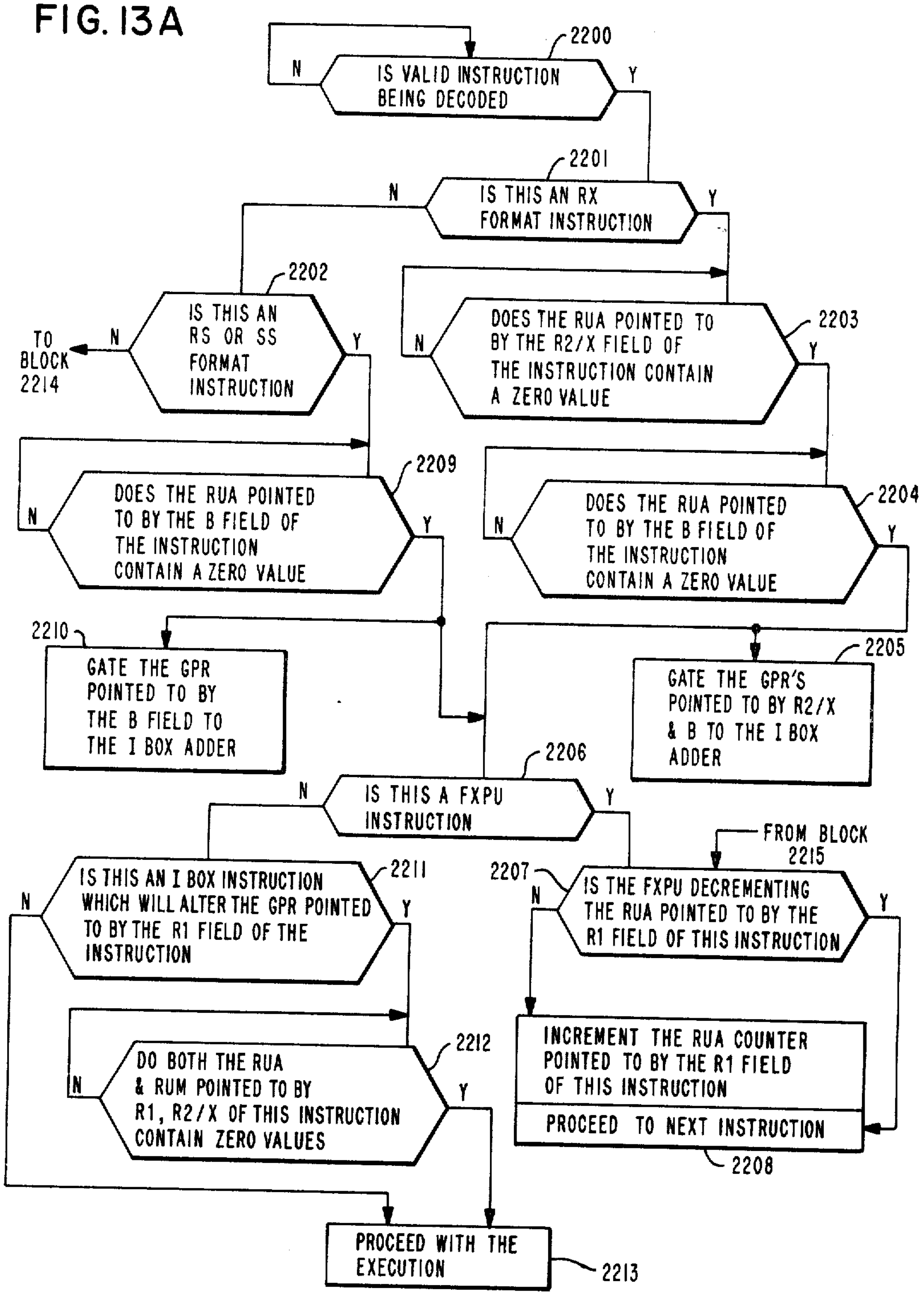
FIGURES 13*a* and 13*b* is a flow chart which is useful in understanding the steps involved in executing instructions.
Figure 13B:
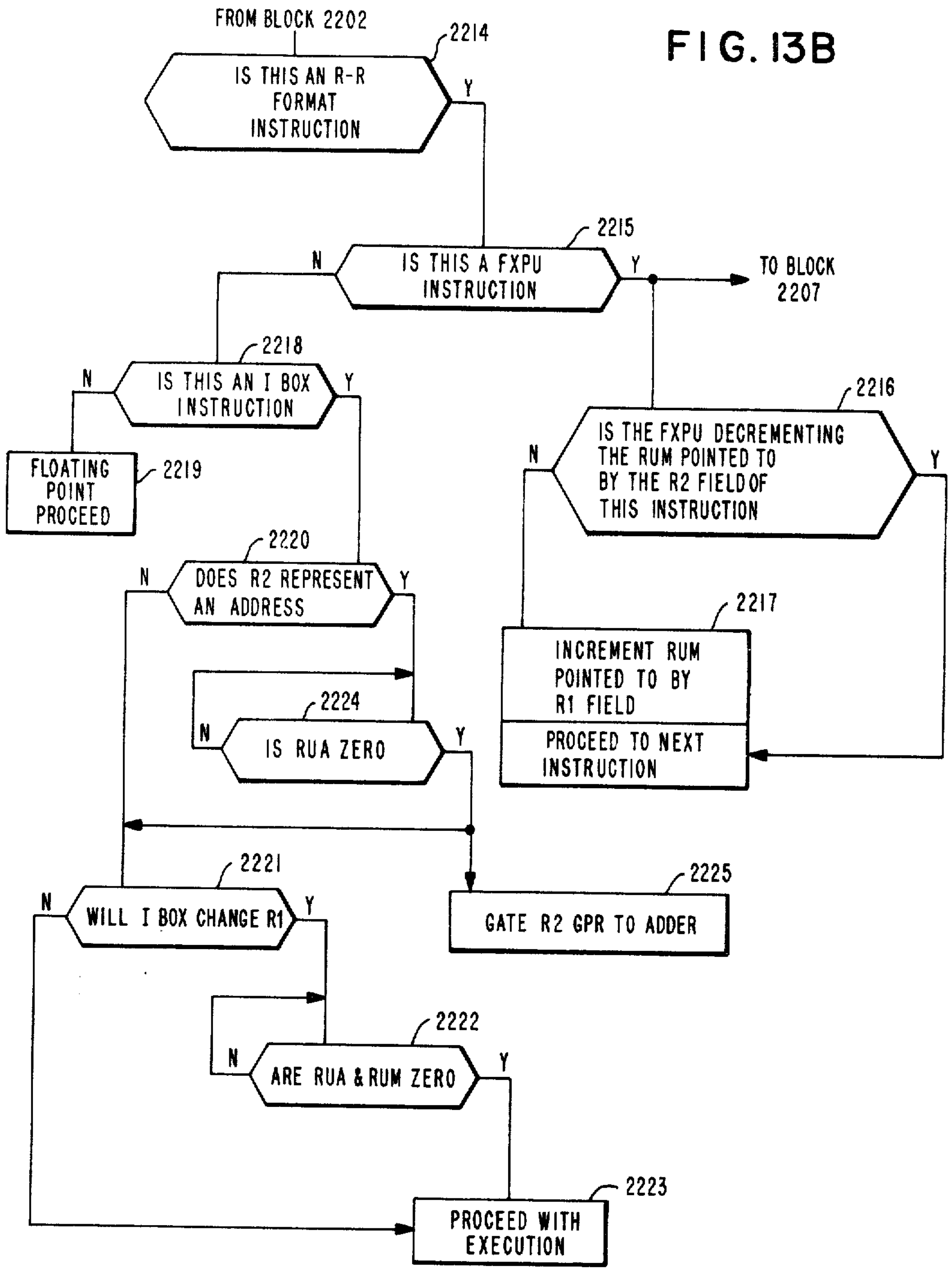

Reference is made next to FIGS. 13*a* and 13*b* which illustrate with a flow chart the manner in which instructions in a program are handled if the instructions might involve use of RUA or RUM counters. The functional blocks are labeled with reference numerals for the purpose of identifying the function under consideration. The first step involved, as illustrated by a block 2200, is to determine whether or not a valid instruction is being decoded. If yes, the next determination is whether or not the instruction has an RX format as indicated by a block 2201. If not, the determination proceeds to a block 2202, and the decisions which might be made at that point are discussed subsequently. If the answer from the block 2201 is yes, it is next determined whether a zero value as indicated by a block 2203. If yes, it is next determined a block 2204 whether the RUA pointed to by the B field of the instruction contains a zero value. If the answer is yes, the content of the GPR's selected by the R2/X and B fields are gated to the adder 168 in FIG. 8*b*. See block 2205. The next determination is whether or not this instruction if for the FXPU. See block 2206. If the answer is yes, it is next determined in a block 2207 if the FXPU is decrementing the RUA counter pointed to by the R1 field of this instruction. If the answer to this question is yes, the I-Box proceeds to the next instruction as indicated by a block 2208. If the decision in block 2207 is negative, the next step is to increment the RUA counter pointed to by the R1 field of this instruction.

If the decision in block 2202 is yes, it is next determined if the RUA counter pointed to by the B field of the instruction contains a zero value. This is determined in block 2209. If the answer is yes, the GPR pointed to by the B field is gated to the I-Box adder 168 in FIG. 8*b* as indicated by the block 2210 in FIG. 13*b*, and a determination is made in block 2206 as to whether or not this is an instruction for the FXPU. If the answer is yes, proceed with the determinations in blocks 2207 and 2208, as outlined above. If the answer in the block 2206 is negative, it is next determined if this is an I-Box instruction which will alter the GPR pointed to by the R1 field of the instruction. See block 2211. If the answer is yes, the statis of the selected RUA and RUM counters are interrogated to see if they contain all zeros. See block 2212. If the answer is yes, execution of the instruction continues as indicated by block 2213. If the decision from the block 2211 is negative, the instruction likewise proceeds as indicated by block 2213. If the answer from the blocks 2203, 2204, 2209 or 2212** is negative, the execution of the instruction is halted at the particular point until a yes answer is received. Then execution continues from such point through the various blocks as previously outlined.

If the answer from the block 2202 in FIG. 13*a* is negative, the next determination is made in block 2214 in FIG. 13*b*. It is determined here whether the instruction has an RR format. If so, the next decision made in block 2215 is whether or not the instruction is for the FXPU. If the answer is yes from the block 2215, two courses are pursued simultaneously. The first course involves returning to the block 2207 in FIG. 13*a* and proceeding therefrom as previously explained. The second course simultaneously pursued is in blocks 2216 and 2217 in FIG. 13*b*. If the decision from the block 2216 is yes, then the I-Box proceeds to the next instruction as indicated in block 2217. If the decision from the block 2216 is negative, then the RUM counter selected by the R1 field is incremented as indicated by the block 2217.

If the decision reached in the block 2215 is negative, the next determination is whether this is an I-Box instruction as indicated in the block 2218. If the answer is negative, the floating point unit proceeds as indicated by block 2219. If the answer from the block 2218 is yes, the next decision is whether the GPR selected by the R2 field contains an address. See box 2220. If the answer is no, the next question is whether or not the I-Box will change R1 as indicated by a Box 2221. If the answer is yes, the next question is whether or not the selected RUA and RUM counters are zero as indicated by block 2222. If the answer is no, further execution of the instruction is held up until a yes answer is received. When the answer becomes yes from the block 2222, execution of the instruction proceeds as indicated by the block 2223. If the answer from the block 2221 is no, execution of the instruction proceeds as indicated by the block 2223.

If the answer from block 2220 is yes, the next question is whether the selected RUA counter is zero. If not, further execution of the instruction is held up until a yes answer is received. When a yes answer is received, the GPR selected by R2 is gated to the adder as indicated by the block 2225, and the execution of the instruction proceeds as soon as the selected RUA and RUM counters contain all zeros as shown by blocks 2221 and 2222.

ILLUSTRATIVE PROGRAM

In order to understand more fully the function of the RUA and RUM counters and the manner in which they operate to improve system performance, it is perhaps useful to discuss a simple program. For this purpose reference is made to FIGS. 14 and 15 which illustrate a same sample program which includes six program items. FIG. 14 illustrates the action which takes place in the I-Box when each instruction is decoded, and FIG. 15 illustrates the action which takes place in the E-Box when each instruction is performed. Referring more specifically to item one in FIG. 14, the instruction is a LOAD instruction which indicates that GPR 1 is to be loaded with the content of storage address 20. Program item 1 is an RX instruction. It is necessary to reserve GPR 1 as the sink for the data in storage address 20 upon its subsequent return, and for this purpose the RUA 1 counter, presumed to contain all zeros, incremented and is set to the value of 1.

Program item 2 in FIG. 14 is an ADD instruction having an RX format, and it signifies that the content of GPR 1 and the content of storage address 21 are to be added and the sum stored in GPR 1. Since the RUA 1 counter must be reserved for this instruction, the RUA 1 counter again is incremented, and it is advanced to 2.

Program item 3 is a SUBTRACT instruction having an RR format. The content of GPR 2 is subtracted from the content of GPR 1 and the result is placed in GPR 1. Since GPR 1 must be reserved for this instruction, RUA 1 is incremented again, and it is advanced to 3. Also, since GPR 2 holds one of the operands to be employed, its content must be preserved from modification, and for this purpose the RUM 2 counter, presumed to contain all zeros, is incremented and advanced to 1.

Program item 4 in FIG. 14 is a SHIFT instruction having an RS format. The content of GPR 1 is shifted to the right two places. Since GPR 1 will be utilized in this instruction, RUA 1 is incremented again and advanced to 4.

Program item 5 is a MULTIPLY instruction having an RR format, and it indicates that the content of GPR 1 should be squared. More specifically, the content of GPR 1 is multiplied by the content of GPR 1 and the product is placed in GPR 1. Since the content of GPR 1 is to be used by this instruction, RUA 1 is incremented again and advanced to 5. In order to prevent modification of the content of GPR 1, the RUM 1 counter, presumed to contain all zeros, is incremented and advanced to 1.

Program item 5 in FIG. 14 is a STORE instruction having an RX format. It signifies that the content of GPR 1 is to be stored in storage address 22. Since the content of GPR1 is to be used in this instruction, RUA 1 is incremented and advanced to 6.

It is pointed out in connection with FIG. 14 that each of the program items is decoded in successive machine cycles in the I-Box 134 in FIG. 1, and since each of these instructions is to be executed in the FXPU 143 in FIG. 1, they are transferred to the Op stack 201 (see FIG. 8*c*, for example) for subsequent execution in the E-Box in the same order in which they were decoded. Most specifically, the program items in FIG. 14 are decoded in FIG. 8*a*; the appropriate RUA and RUM counters are incremented, if necessary; storage address generation is performed; and a storage request is generated, specifying a designated GPR as the sink for the data subsequently returned. After the appropriate action has been taken in the I-Box for each instruction, the instruction is transferred to the E-Box for subsequent execution in the same order in which the instructions were decoded. Since these instructions are for the FXPU 143, they are issued to the FXPU and stored in Op stack 201. See FIG. 8*d* for example.

Reference is made next to FIG. 15 wherein the same program items 1 through 6 are illustrated. As they are executed in the order listed in the FXPU of the E-Box, decrementing action takes place in the appropriate RUA and RUM counters, and this is illustrated in FIG. 15. Program item 1 is executed first, and upon the completion of its execution, the RUA 1 counter is decretented by the value of 1, thereby changing its content from 6 to 5. Upon completion of program item 2, the RUA 1 counter is again decremented, thereby changing its value from 5 to 4. As program items 3 through 6 are executed, the RUA 1 counter is successively decremented to zero. In program item 3 the RUM 2 counter is decremented from 1 to 0, thereby releasing GPR 2 and permitting subsequent modification of its content. Likewise, in program item 5 the RUM 1 counter is decremented from 1 to 0 when this instruction is executed thereby releasing GPR 1 so that its content may be modified thereafter. It is reiterated that whenever an RUA or RNM counter contains all zeros, the associated GPR is available for immediate use by the I-Box in executing subsequent instructions.

Figure 16:
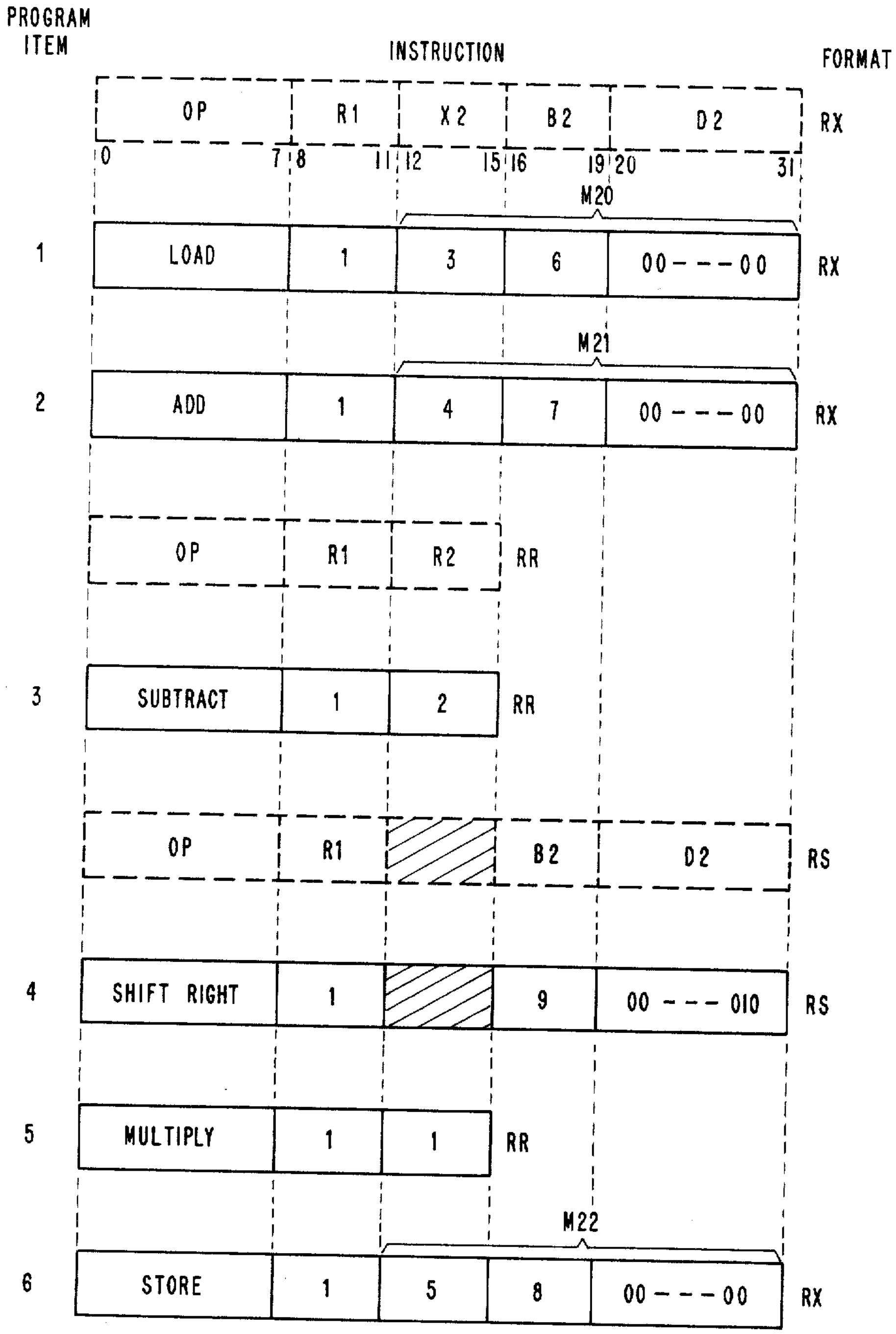
FIGURE 16 shows the sample program of FIGURES 14 and 15 arranged according to instruction formats.

Program items 1 through 6 in FIG. 14 and FIG. 15 are depicted in FIG. 16 in a format suitable for execution by the data processing machine. The instruction formats in FIG. 12 are repeated in FIG. 16 as appropriate with the particular quantities of the illustrative program items 1 through 6 in FIGS. 14 and 15 properly inserted. For example, program item 1 in FIG. 16 illustrates that an RX format is employed; R1 has the value of one; X2 has the value of three; B2 has the value of six; and D2 has the value of zero. It is pointed out that the value of D2 is arbitrarily selected to have the value of zero in program items 1, 2 and 6. More specifically, storage address 20 is specified by the sum of the content of GPR's 3 and 6 in program item 1; the storage address 21 in program item 2 is specified by the sum of the content of GPR's 4 and 7; and in program item 6 the storage address M 22 is specified by the sum of the content of GPR's 5 and 8. In program item 4 in FIG. 16 a shift to the right takes place of the content of GPR 1, and the number of places shifted is specified by the low order six bits, the right most six bits, of the D2 field. The binary representation is used in FIG. 16 to illustrate the quantity of two in the D2 field. In fact, all quantities in the data processing machine are represented in the binary system of notation, but the decimal system of notation has been employed in FIG. 16 to represent the various quantities in the interest of simplicity. It is pointed out that the program items 1, 2 and 6 require access to memory; whereas program items 3, 4 and 5 merely involve the use of the content of selected GPR's.

Figure 17:
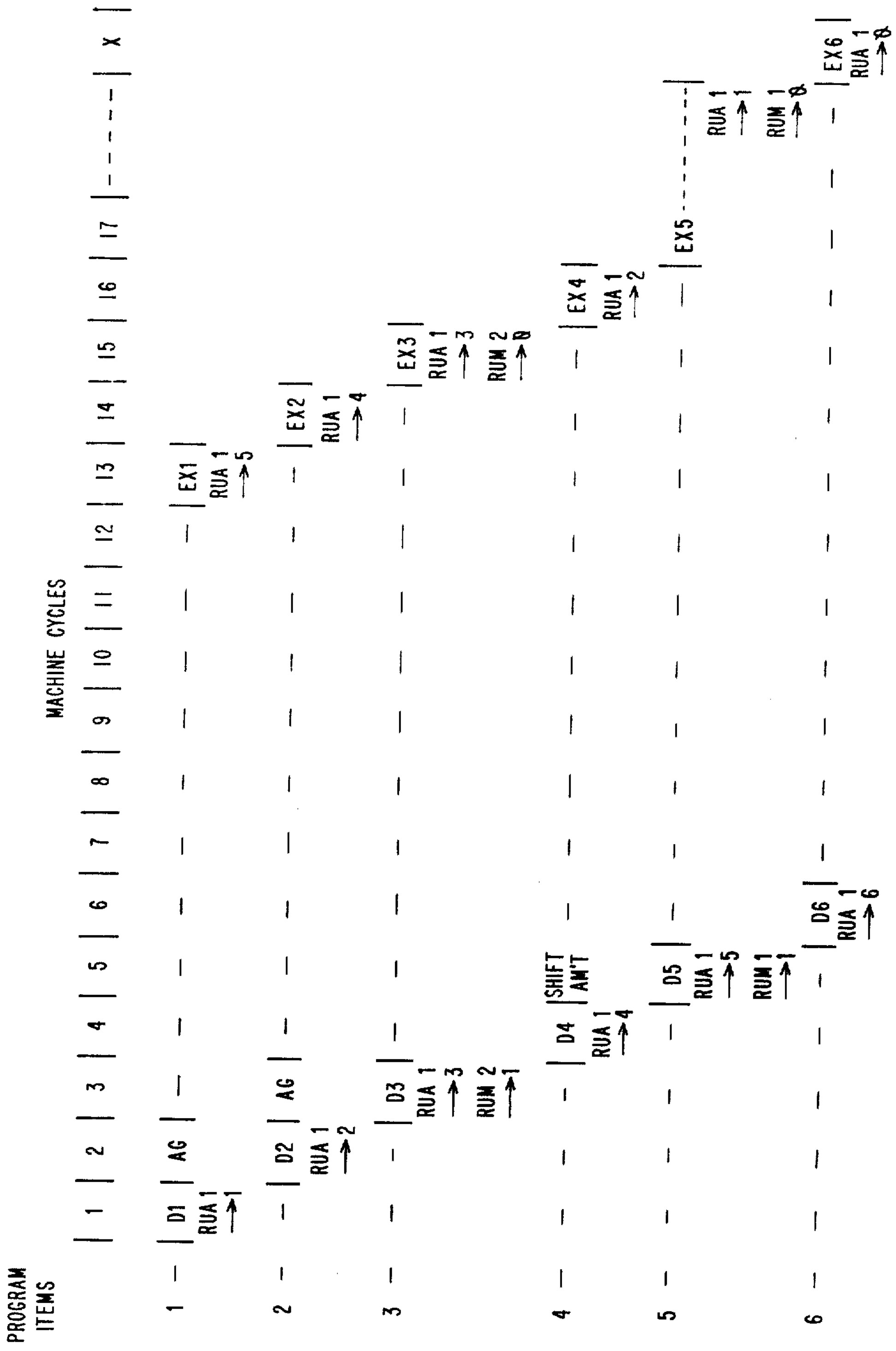
FIGURE 17 is a timing diagram which uses machine cycles to indicate the relative time of occurrence of the events which take place in the I-Box and the E-Box in the performance of the sample program illustrated in FIGURES 14 through 16.

Reference is made next to FIG. 17 which illustrates a time scale in terms of machine cycles designated 1 through 18. The timing relationship is illustrated between the decoding operations which take place in the I-Box during the early machine cycles 1 through 6 and the execution in the E-Box which takes place during the later machine cycles 13 through 18. The time required for storage access purposes in 11 machine cycles. The symbols D1 through D6 in FIG. 17 indicate the decoding of program items 1 through 6 in the I-Box. The symbol AG signifies operation of the address gates which specify the storage address whenever a storage request is generated. The symbols EX1 through EX6 specify the execution in the E-Box of the program items 1 through 6. FIG. 17 clearly illustrates the manipulation of the RUA and RUM counters during the performance of program items 1 through 6 in FIGS. 14 through 16.

Reference is made next to FIGS. 8*a* through 8*c* for the purpose of explaining in greater detail the execution of program items 1 through 6 as set forth in FIGS. 14 through 17. When program item 1 is placed in the operation register 159 in FIG. 8a, the operation portion in bits 0 through 7 of the instruction are decoded by the instruction decoder 166, and its output lines 1600 and 1602 are energized to indicate that this instruction involves the FXPU and has an FX format. The signal on the line 1600 is applied to the And circuit 2102 in FIG. 11. The signal on the line 1602 is applied to the And circuits 2100 and 2101 in FIG. 11. The lines 1607 and 1608 in FIG. 11 are energized to condition the respective And circuits 2100 and 2101, and the reasons for this are next explained. The line 1607 is energized by the RUA interlock 1623 in FIG. 8a in response to bits 16 through 19 of the B2 field which are supplied along the line 1631 to the RUA interlock 1623. The B field contains the value of 6 as shown in FIG. 16. Therefore, the state of RUA 6 is examined by the RUA interlock 1623 to determine whether or not it contains all zeros. If RUA 6 does not contain all zeros, the I-Box waits until the E-box decrements RUA 6 to zero, at which time the I-Box continues with program item 1. It is presumed for this discussion that RUA 6 holds all zeros at the time the I-Box decodes program item 1. Therefore, the B field operates the decoder 2020 in FIG. 10b to select an And circuit, not shown, associated with RUA 6, and this And circuit receives a signal from the RUA 6 counter indicating that its state is all zeros. Consequently, the And circuit, not shown, associated with RUA 6 in FIG. 10b, supplies a signal to the Or circuit 2024 which in turn supplies a signal on the line 1607 to the interlock control 1606 in FIG. 8a. The signal on the line 1606 thus serves to condition one input to the And circuit 2101 in FIG. 11.

The line 1608 in FIG. 11 is energized by the RUA interlock 1622 in FIG. 8a which responds to the X2 field of the instruction. The X2 field includes bits 12 through 15 of the instruction as illustrated in FIG. 16. These bits are supplied on line 1630 in FIG. 8a to the RUA interlock 1622. The X2 field in program item 1 contains the value 3 as shown in FIG. 16, and therefore the content of RUA 3 is sampled. It is assumed that the content of RUA 3 is all zeros. Consequently the Or circuit 2008 in FIG. 10a receives a signal from the output of an And circuit, not shown, associated with RUA 3, and this Or circuit supplies an output signal on the line 1608 to the interlock control 1606 in FIG. 8a. The signal on the line 1608 thus serves to condition one input to the And circuit 2100 in FIG. 11.

The line 1608 in FIG. 11 is energized by the RUA interlock 1622 in FIG. 8a which responds to the X2 field of the instruction. The X2 field includes bits 12 through 15 of the instruction as illustrated in FIG. 16. These bits are supplied on the line 1630 in FIG. 8a to the RUA interlock 1622. The X2 field in program item 1 contain the value 3 as shown in FIG. 16, and therefore the content of RUA 3 is sampled. It is assumed that the content of RUA 3 is all zeros. Consequently the Or circuit 2008 in FIG. 10a receives a signal from the output of an And circuit, not shown, associated with RUA 3, and this Or circuit supplies an output signal on the line 1608 to the interlock control 1606 in FIG. 8a. The signal on the line 1608 thus serves to condition one input to the And circuit 2100 in FIG. 11.

From the foregoing explanation it is seen that the And circuits 2100 and 2101 supply output signals which, along with the signal on the line 1600, condition the And circuit 2102 to provide an output signal to the Or circuit 2110 which in turn supplies an output signal on the line 1614 to the And circuits 1643 through 1645 in FIG. 8a. The R1 field in bits 8 through 11 of the instruction is supplied on the line 1620 to the select RUA 338 in FIG. 8a. The value of R1 is one for program item 1. Consequently, it selects RUA 1 by providing an output signal on the line 1640 which conditions the And circuit 1643 to pass the increment RUA signal on the input line 1614 to the output line 1646 to RUA 1. A signal on the line 1646 increments the value in RUA 1 by the quantity of 1. It is presumed for purposes of this discussion that RUA 1 contained all zeros prior to program item 1. Therefore, the incrementing operation causes RUA 1 to advance from all zeros to the value of 1. The incrementing operation takes place in the circuit arrangement in FIG. 9 as previously explained. It is noted that RUA 1 is incremented by the instruction regardless of the value it previously contained. In this connection it is pointed out that the conditions imposed by the RUA interlocks 1622 and 1623 are met by using the X2 and B2 fields respectively. The RUA interlocks 1622 and 1623 impose the conditions that the selected GPR's must have their associated RUA counters contain all zeros. This insures that a valid address is generated by adding the contents of the D2 field to the content of the GPR's selected by the X2 and B2 fields. Stated alternatively, if a GPR selected by the X2 field or the B2 field is to be modified by a previous instruction not yet executed, such GPR is not now available for use by program item 1 to generate a valid address. If such condition exist, either or both of the RUA interlocks 1622 and 1623 does not supply an output signal on associated lines 1607 and 1608. Consequently an increment signal on the line 1614 in FIG. 8a is not generated, and the instruction being decoded in the operation register 159 is held up until the RUA counters associated with the GPR's selected by the X2 field and the B2 field are both decremented to their zero states. Then, and only then, can a valid memory address be generated for program item 1. In this connection it is reiterated that the content of the D2 field and the content of the GPR selected by the B2 field and the X2 field are added together in order to generate a valid memory address for program item 1. This is accomplished for program item 1 by the outputs of the And circuits 2100 and 2101 in FIG. 11. The output of the And circuit 2100 passes through the Or circuit 2108 and along the line 1612 to the And circuits 1752 through 1753 for the purpose of gating to the adder 168 the content of the GPR selected by the X2 field of program item 1. This is specified as GPR 3 for program item 1. The bits of the X2 field are supplied on the line 1630 in FIG. 8a to the decoder 1702 in FIG. 8b which selects GPR 3, and its content is gated to the adder 168. In similar fashion, the output of the And circuit 2101 in FIG. 11 is supplied to the Or circuit 2109 and along the line 1611 to the And circuits 1730 through 1731 for the purpose of gating the content of the GPR selected by the B2 field to the adder 168 in FIG. 8b. The bits of the B2 field are supplied along the line 1631 in FIG. 8a to the decoder 1701 in FIG. 8b, and the decoder selects and transfers the content of GPR 6 to the adder 168 in FIG. 8b for program item 1. The output of the adder 168 in FIG. 8b is forwarded to the W register 177 in FIG. 7b and then to the MSCE 136 in FIG. 1. Address gates (AG) are disposed on the output of the W register for gating its content on bus 1034 to the MSCE. The output of the adder 168 is forwarded to the MSCE 136 in FIG. 1 whenever storage access is requested by the I-Box 134 in FIG. 1. The storage request for program item 1 includes in addition to the storage address from which data is to be read, a sink address which specifies where the requested data should be forwarded. The sink address for program item 1 is the GPR specified by R1. Therefore the requested data, when it becomes available, is forwarded to GPR 1 for program item 1. Once the I-Box has decoded program item 1, generated valid address, and forwarded the valid address and a storage request to MSCE, it has completed its function with respect to program item 1, and bits 0 through 11 of this instruction are transferred to the next available register in the Op stack 201 in FIG. 8c. It is pointed out, as illustrated in FIG. 17, that a storage request requires 11 machine cycles. It may be observed from FIG. 17 that program item 1 is decoded (D1) in machine cycle 1; the address is generated by adding the content of GPR 3 (X2 field), GPR 6 (B2 field), and the D2 field; and the storage address is gated (AG) in machine cycle 2, as shown in FIG. 17, to the MSCE for accessing the main store. Program item 2 is decoded in machine cycle 2; a second storage request is made; but the address generated by adding the content of GPR 4 (X2 field), the content of GPR 7 (B2 field) and the D field is gated (AG) in machine cycle 3 to the MSCE to secure the second operand. The I-Box assigns a sink address which designates one of the buffers 204 through 207 in FIG. 4*a* for program item 2. The operand from storage is returned to the appropriate one of the buffers 204 through 207 in FIG. 4*a*, and it is subsequently transferred to the adder when this instruction is performed. The first operand of program item 2 is to be taken from GPR 1 as indicated by the R1 field. Accordingly, RUA 1 is again incremented for program item 2, and its content changes from 1 to 2. The incrementing operation is similar to that outlined with reference to program item 1. Briefly explained, the R1 field of program item 2 has the value of 1, and hence the select RUA 338 in FIG. 8*a* energized the line 1640 to condition the And circuit 1643. The RUA interlock 1622 samples the state of RUA 4 which is selected by the X2 field, and the interlock 1623 samples the state of RUA 7 which is selected by the B2 field. It is presumed that the states of RUA 4 and 7 are zero. In this case the RUA interlocks 1622 and 1623 provide output signals on respective lines 1608 and 1607, to the interlock control 1606. Since program item 2 is an instruction having an RX format, it is readily seen that the And circuits 2100 and 2101 in FIG. 11 are both conditioned to provide output signals through respective Or circuits 2108 and 2109 to gate the content of the selected GPR's to the adder 168 in FIG. 8*b*. Also, the outputs of the And circuits 2100 and 2101 are applied to the And circuit 2102, and since the line 1600 is energized because a FXPU instruction is being decoded, the And circuit 2102 provides an output signal through the Or circuit 2110 and along the line 1614 to condition the And circuit 1643 in FIG. 8*a* to pass a signal on the line 1646 which increments RUA 1, thereby increasing its value from 1 to 2. After the incrementing operation, the address generation, storage request, and sink address assignment are made, the I-Box transfers bits 0 through 11 to the Op stack 201 in FIG. 8*d* for subsequent execution by the E-Box.

Program item 3 is decoded in machine cycle 3 as illustrated in FIG. 17. Since no memory access is involved, execution of this instruction could proceed forthwith. However, this instruction involves subtracting the content of GPR 2 from GPR 1 and placing the result in GPR 1. To subtract the content of GPR 2 from the content of GPR 1 and place the result in GPR 1 would be meaningless if peformed during machine cycle 3 since program items 1 and 2 will each involve a modification of the content of GPR 1 subsequently. Therefore, the R1 field of program item 3 causes incrementing of RUA 1 from the value of 2 to 3, and the R2 field causes the incrementing of RUM 2 from the value of zero, assuming it previously was zero, to the value of 1. By changing the value of RUM 2 from zero to one, the content of GPR 2 is preserved from modification until program item 3 is completed. The incrementing of RUM 2 takes place because the lines 1600 and 1601 in FIG. 8*a* are energized by the instruction decoder 168, to condition the And circuit 2104 in FIG. 11, and this And circuit supplies an output signal on the line 1613 to the And circuits 1673 through 1675 in FIGS. 8*a*. Since the select RUM 339 receives the value of 2 from the R2 field, it energizes the output line 1671 to condition the And circuit 1674 to pass a signal on the output line 1681 which increments RUM 2. The output signal from the And circuit 2104 in FIG. 11 also passes through the Or circuit 2110 and along the output line 1614 to the And circuits 1643 through 1645 in FIG. 8*a*. The select RUA 338 receives the value of 1 from the R1 field and energizes the output line 1640 to pass the incrementing signal on the line 1614 along the output line 1646 to increment RUA 1. After the incrementing of RUA 1 and RUM 2 has been effected, bits 0 through 15 of the instruction in program item 3 are transferred to the next available register of the Op stack 201 in FIG. 8*d*, and this instruction is executed after program items 1 and 2 are executed.

Program item 4 is decoded in machine cycle 4 as illustrated in FIG. 17. Program item 4 is a shift right instruction which, as illustrated in FIG. 16, indicates that the content of GPR 1 is to be shifted to the right as many places as specified by the low order six bits of the sum of the D field and the content of GPR 9. When an instruction has the RS format and it is a shift instruction, the R3 field, including bits 12 through 15, are not used, and this is signified by the cross hatched area for these bits in item 4 of FIG. 16.

The I-Box decodes the instruction of program item 4 in machine cycle 4. In response thereto RUA 1 is incremented by the value of 1, thereby changing its content from the value of 3 to the value of 4, and the content of GPR 9 is added to the content of D2 field. The number of places to be shifted to the right is determined by the value in the low order six bits of this sum. If it is presumed for convenience that the content of GPR 9 contains all zeros, then this sum is the same value held in the D2 field. The value represented in the D2 field of program item 4 is expressed in the binary system of notation in FIG. 16, and it is equal to the decimal value of 2, the lowest order positions being to the right.

Next the incrementing of RUA 1 for program item 4 is explained. Since this is an instruction with an RS format and it involves the FXPU, the instruction decoder 168 energizes the lines 1600 and 1603. The energization of the line 1600 is not effective to aid in the incrementing operation. The signal on the line 1603 is effective to condition one input of the And circuit 2103 in FIG. 11. The B2 field of the instruction in item 4 contains the value of 9 and it is effective to cause the RUA interlock 1623 to sample the state of RUA 9. It is assumed that RUA 9 contains all zeros. This signifies that GPR 9 is available for use, and the RUA interlock 1623 passes a signal on the line 1607 to the interlock control 1606 which conditions the other input of the And circuit 2103 in FIG. 11 and causes this And circuit to supply an output signal which operates Or circuits 2109 and 2110. The output signal from the Or circuit 2110 supplies a signal on the output line 1614 to the And circuit 1643 in FIG. 8*a*. The select RUA 338 in FIG. 8*a* responds to the value of 1 in the R1 field and energizes the output line 1640 to condition the And circuit 1643 to pass the incrementing signal on the input line 1614 along the output line 1646 to increment RUA 1. The signal from the Or circuit 2109 in FIG. 11 is supplied along the output line 1611 to gate the content of GPR 9, selected by the B2 field, to the adder 168 in FIG. 8*b*. The content of GPR 9 is assumed to contain all zeros in the interest of simplicity, and the content of the D2 field passed through the adder 168 unmodified. The lower six bits of this sum, expressed in the binary system of notation, contains the value of 2, and this value together with bits 0 through 11 of the instruction in program item 4, are stored in the next available register of the Op stack 201 in FIG. 8*c* for subsequent execution.

Program item 5 is decoded in machine cycle 5 as illustrated in FIG. 17. This involves a multiply instruction whereby the content of GPR 1 is multiplied by itself. It would be meaningless at this point to execute the multiply instruction since the content of GPR 1 will be changed by the preceding unexecuted instructions in program items 1 through 4. Therefore, the I-Box increments RUA 1 and RUM 1, and this instruction is then transferred to the Op stack 201 in FIG. 8*c*.

Next the incrementing of RUM 1 is described. Since this instruction involves the FXPU and has an RR format, the And circuit 2104 in FIG. 11 is conditioned to pass an output signal on the line 1613 to the And circuit 1673 in FIG. 8*a*. The R2 field supplied to the select RUM 339 causes the line 1670 to be energized, and this conditions the And circuit 1673 to pass the incrementing signal on the input line 1613 to the RUM 1 along the output line 1680. It is presumed that RUM 1 contained all zeros previously and thus this counter is advanced from 0 to 1.

Next the incrementing of RUA 1 is described. The output signal from the And circuit 2104 in FIG. 11 passes through the Or circuit 2110 and along the output lines 1614 to the And circuit 1643 in FIG. 8*a*. The select RUA 338 responds to the value of 1 in the R1 field to energize the line 1640 and condition the And circuit 1643 to pass the incrementing signal from the input line 1614 along the output line 1643 to increment RUA 1.

Program item 6 is decoded in machine cycle 6 as shown in FIG. 17. This involves a store instruction wherein the content of the GPR selected by the R1 field is placed in storage at an address determined by the sum of the content of the GPR specified by the X2 field, the content of the GPR specified by the B2 field, and the content of the D2 field. More specifically, program item 6 in FIG. 16 specifies that the content of GPR 1 is to be placed in storage address 22, and storage address 22 is one which is generated by adding the content of GPR 5, the content of GPR 8 and the content of the D2 field. The content of the D2 field is presumed to be zero in the interest of simplicity. Therefore, the address M22 is obtained by the sum of the quantities held in GPR's 5 and 8.

Since GPR 1 will be changed by each of the preceding program items 1 through 5, it would be meaningless to execute this instruction during machine cycle 6. Therefore, the I-Box increments RUA 1, generates the address M22, initiates a store request along with a source address (GPR 1) from which the data may subsequently be obtained, and transfers bits 0 through 11 of this instruction to the next available register in the Op stack 201 in FIG. 8*c*.

Next the incrementing operation is described. Since this instruction involves the FXPU and has an RX format, the instruction decoder 168 in FIG. 8*a* energizes the line 1600 and 1602. The line 1600 conditions one input of the And circuit 2102 in FIG. 11. The line 1602 energizes one input of each of the And circuits 2100 and 2101 in FIG. 11. It is presumed that GPR's 5 and 8 are available for use, and hence their associated RUA counters contain all zeros. Therefore, the RUA interlock 1622 and 1623 respond to the respective X2 and B2 fields and the zero states of the respective RUA 5 and RUA 8 to provide signals on respective output lines 1608 and 1607 to condition respective And circuits 2100 and 2101. The outputs of these And circuits are supplied to the And circuit 2102. The And circuit 2102 is thereby conditioned to pass a signal through the Or circuit 2110 and along the line 1614 to the And circuit 1643 in FIG. 8*a*. The value of one in the R1 field causes the select RUA 338 to energize the output line 1640 to condition the And circuit 1643 to pass the input signal on the line 1614 along the output line 1646 to increment RUA 1 from the valve of 5 to the value of 6. The output signals from the And circuits 2100 and 2101 in FIG. 11 are supplied through respective Or circuits 2108 and 2109 along respective output lines 1612 and 1611 to gate the contents of respective GPR's 5 and 8 to the adder 168 in FIG. 8*b*. The resulting sum generates address M22. This address is forwarded to MSCE along with tentative storage request for a store operation, and GPR 1 is specified as a source address for the operand to be supplied subsequently. Bits 0 through 11 of the instruction in program item 6 are then stored in the next available register of the Op stack 201 in FIG. 8*d*.

After program item 6 has been decoded in machine cycle 6 as illustrated in FIG. 17, the I-Box action illustrated in FIG. 14 of decoding and incrementing appropriate RUA and RUM counters is complete for these program items, and a delay is occasioned until data is returned from the NSCE 136 which was requested by program items 1 and 2. If a memory request is not held up for some reason, as when the MSCE 136 is busy, it takes eleven machine cycles to perform a memory read or write operation. If a delay is occasioned, as when the MSCE is busy, the memory request is delayed, and the execute cycle is likewise delayed in time, thereby being being further extended to the right in FIG. 17. It is assumed for purposes of this discussion that no additional delay is occasioned by the MSCE 136 and that requested data is supplied eleven machine cycles later.

Accordingly, it follows that program item 1 is executed in machine cycle 13 in FIG. 17 upon the return of the data or operand disposed in storage address M20. Program item 1, disposed in the Op stack 201 in FIG. 8*d*, is decoded and executed in the E-Box by the Op decoder 224, and the operand received from the MSCE 136 is loaded into GPR 1. This completes the execution of program item 1 during machine cycle 13, as illustrated in FIG. 17, and RUA 1 is decremented from the valve of 6 to the value of 5. The decrementing operation takes place because the R1 field of program item 1 is supplied to the decoder 1808 in FIG. 8*c*, and it selects the output line which conditions the And circuit 1801. This And circuit is conditioned by signals on the lines 1800 and 1807. The line 1807 is energized whenever a fixed point instruction is executed which has altered a GPR, and the line 1800 is energized upon completion of the execution of each instruction. Hence, the And circuit 1801 is conditioned to pass a signal on its output line 1820 to decrement RUA 1. RUA 1 changes from the value of 6 to the value of 5.

Program item 2 is executed next. This instruction is decoded and executed in the Op decoder 224 in FIG. 8*d* during machine cycle 14 in FIG. 17 and the operand from storage address M21 and the content of GPR 1 are added and the result returned to GPR 1. Upon completion of the execution program item 2, the And circuit 1801 in FIG. 8*c* is operated to decrement RUA 1, in the manner previously explained, from the value of 5 to the value of 4.

During machine cycle 15 in FIG. 17 program item 3 is decoded and executed by the Op decoder 224 in FIG. 8*c*, and the content of GPR 2 is subtracted from the content of GPR 1 and the result is placed in GPR 1. Upon completion of this instruction, the decoder 1808 in FIG. 8*c* operates the And circuit 1801, as previously explained, and the content of RUA 1 is decremented from the value of 4 to the value of 3. Also, the R2 field of program item 3, which contains the value of 2, is decoded in the decoder 1831, and the And circuit 1805 is operated to decrement RUM 2 from the value of 1 to the value of 0. The And circuit 1805 is operated because (1) the decoder 1831 energizes the line designated SEL RUM 2, (2) the line 1830 is energized because this is a fixed point unit execution of an instruction having an RR format which used a GPR, and (3) the line 1800 is energized upon completion of the instruction in program item 3. Hence, all it puts to the And circuit 1805 are conditioned, the output line 1841 is energized with a signal level which decrements RUM 2.

Program item 4 is decoded and executed by the Op decoder 224 in FIG. 8*c* during machine cycle 16 as illustrated in FIG. 17. Program item 4, as illustrated in FIG. 16, performs a shift to the right of the content of GPR 1. Upon completion of this instruction, the And circuit 1801 in FIG. 8*c* is operated, in the manner previously explained, to decrement RUA 1 from the value of 3 to the value of 2.

Program item 5 is decoded by the Op decoder 224 in FIG. 8*c* during machine cycle 17 as shown in FIG. 17. This instruction involves multiplying the content of GPR 1 by itself, effect squaring the content of GPR 1. The result is placed in GPR 1. Upon completion of this instruction, RUA 1 is decremented from the value of 2 to the value of 1 by a signal from the And circuit 1801 in FIG. 8*c*, as previously explained. Also, RUM 1 is decremented from the value of 1 to the value of 0 by a signal on the line 1840 because (1) the R2 field supplied to the decoder 1831 selects the line labeled SEL RUM 1 to condition the And circuit 1804, (2) the line 1830 is energized since this instruction has an RR format which used a GPR, and (3) the line 1800 is energized upon completion of this instruction. It is pointed out that a multiply instruction has a variable length of time for its execution, and the time varies with the number of binary ones in the multiplier. It takes a plurality of machine cycles to execute a multiply instruction, and this is illustrated in FIG. 17 by the dashed line to the right of machine cycle 17. The last machine cycle shown in FIG. 17 is designated X. The decrementing of the RUA 1 and RUM 1 takes place after the multiply operation has been completed and the result placed in GPR 1.

During machine cycle X in FIG. 17, program item 6 is decoded in the Op decoder 224 in FIG. 9*c*. This instruction involves storing the content of GPR 1 in storage address M22. As explained previously, a tentative storage request was made during machine cycle 6, and at this point the operand in GPR 1 is transferred to MSCE for storage. The transfer of the content of GPR 1 is made during machine cycle X, and the storage request is changed from a tentative request to an active request. The And circuit 1801 in FIG. 8*c* again is operated, in the manner previously explained, upon completion of program item 6, and RUA 1 is decremented from the value of 1 to the valve of 0. All of the RUA and RUM counters used to perform program items 1 through 6 have been decremented to the zero states, and the associated GPR's are now available for use by subsequent instructions in further program items.

It is pointed out that the I-Box partially performs program items 1 and 6 by generating the storage address and initiating storage access requests before issuing them to the E-Box for subsequent execution. The same type of partial execution is performed by the I-Box on instructions issued to other execution units as well, although this is not illustrated in the sample program of FIGURES 14 through 17. It is readily seen that the pipeline action of having several execution units operating independently and simultaneously accelerates the rate of instruction executions.

While the invention has been particularly shown and described with reference to a preferred embodiment thereof, it will be understood by those skilled in the art that various changes in form and details may be made therein without departing from the spirit and scope of the invention.

What is claimed is:

1. A data processing system including:

an E-Box having a plurality of execution devices which respond to instructions in the form of signals and executes in turn all such instructions supplied thereto;

an I-Box having first means for decoding all instructions in the form of signals which are performed in the data processing system, second means coupled to the first means for partially executing certain instructions by generating storage addresses and initiating storage requests and then issuing such partially executed instructions to said instruction execution devices for subsequent execution; a control device coupled to said E-Box and said I-Box for preventing the I-Box from partially executing instructions which depend upon data which may be replaced or modified by instructions earlier issued but not yet executed.

2. The apparatus of claim 1 wherein the control device includes bi-directional counter means which is initially set to a predetermined state and which is thereafter incremented by the I-Box upon issuing instructions to the E-Box, said bi-directional counter means serving to inhibit partial execution by the I-Box of instructions until the bi-directional counter is returned to the predetermined state, and means in the E-Box to decrement said bi-directional counter means when such instructions are executed thereafter, thereby to return said counter means to said predetermined state and permit partial execution of instruction by the I-Box.

3. The apparatus of claim 1 wherein the I-Box includes further means to execute completely some instructions out of turn immediately upon being decoded.

4. A data processing system including:

a plurality of independent units which are operated simultaneously by instructions in the form of signals supplied thereto;

an I-Box connected to independent said units which decodes instructions and determines to which independent unit they belong, then issues instructions to various ones of said independent units accordingly, partially executes some instructions issued to the various independent units, and executes completely some instructions upon being decoded;

one of said independent units including a plurality of general purpose registers which store data for use by said independent unit, said I-Box, or both said independent unit and said I-Box;

a control device connected to said one unit and said I-Box;

said control device including first means to indicate which general purpose registers are available for use by the I-Box, second means coupled to said first means which is operated by the I-Box to change said first means and thereby preempt a given general purpose register from subsequent use by the I-Box and third means connected to said first means which is operated by said one independent unit to store said first means whenever a given general purpose register becomes available again for use by the I-Box.

5. A data processing system including:

a storage for holding instruction signals and data signals;

an I-Box and an E-Box coupled to each other and said storage, said E-Box including a plurality of instruction execution devices which execute in turn all instructions supplied thereto;

a plurality of general purpose registers used in common by said I-Box and said E-Box;

said I-Box including means to generate storage addresses for instruction signals and data signals in said storage and to initiate storage request to obtain or store signals at such addresses, said I-Box including means which decodes all instruction from storage and determines to which instruction execution device they belong, then issues instruction signals to various ones of said instruction execution devices accordingly, and partially executes some instructions before issuing them to various instruction execution devices;

a plurality of counters corresponding in number to the number of general purpose registers, with each individual counter being associated with a different individual general purpose register;

means initially setting all of said counters to a predetermined quantity;

means to prevent changing the content of any general purpose register for storage address generation purposes by the I-Box during instruction decode except when the associated counter holds the predetermined quantity;

means responsive to given instruction signals for incrementing a selected counter by the I-Box during instruction decode; and means responsive to said given instruction signals for decrementing said selected counter by the E-Box upon subsequent completion of instruction execution.

6. A data processing system including:

a storage for holding instruction signals and data signals; an I-Box and an E-Box coupled to each other and said storage, said E-Box including a plurality of instruction execution devices which execute in turn all instructions supplied thereto;

a plurality of general purpose registers used in common by said I-Box and said E-Box;

said I-Box including means to generate storage addresses for instruction signals and data signals in said storage and to initiate storage requests to obtain or store signals at such addresses, said I-Box including means which decodes all instruction signals from storage and determines to which instruction execution device they belong, then issues instruction signals to various ones of said instruction execution devices accordingly, partially executes some instructions issued to various instruction execution devices, and executes completely some instructions out of turn upon being decoded;

a plurality of counters, corresponding in number to the number of general purpose registers, with each individual counter being associated with a different individual general purpose register;

means initially setting all of said counters to a predetermined quantity;

means to prevent using the content of any general purpose register by the I-Box during instruction decode except when the associated counter holds the predetermined quantity;

means responsive to given instruction signals for incrementing a selected counter by the I-Box during instruction decode; and means responsive to said given instruction signals for decrementing said selected counter by the E-Box upon subsequent completion of instruction execution.

7. A data processing system including:

a storage for holding instruction signals and data signals;

an I-Box and an E-Box coupled to each other and said storage, said E-Box including a plurality of instruction execution devices which execute in turn all instructions supplied thereto;

a plurality of general purpose registers used in common by said I-Box and said E-Box;

said I-Box including means to generate storage addresses for instruction signals and data signals in said storage and to initiate storage requests to obtain or store signals at such addresses, said I-Box including means which decodes all instruction signals from storage and determines to which instruction execution device they belong, then issues instruction signals to various ones of said instruction execution devices accordingly, partially executes some instructions by generating storage addresses and initiating storage request, where required, for instructions issued to various instruction execution devices, and executes completely some instructions out of turn immediately upon being decoded;

a first group of counters and a second group of counters, each counter in said first group of counters and each counter in said second group of counters being associated with a given general purpose register;

first means in said I-Box which is responsive to designated instruction signals during instruction decode for incrementing a selected one of said first group of counters, said first means including second means for incrementing a selected one of said second group of counters in response to other designated instruction signals;

third means responsive to said designated instruction signals upon completion of the execution of the instruction in the E-Box for decrementing the selected one of said first group of counters, said third means including fourth means responsive to said other designated instruction signals for decrementing the selected one of said second group of counters;

means for preventing use by the I-Box of the content of a selected general purpose register for storage address generation purposes during instruction decode whenever the corresponding counter in said first group of counters is incremented and for preventing the I-Box from issuing an instruction which will modify the content of a selected general purpose register whenever the corresponding counter in said second group of counters is incremented.

8. A data processing system including:

a storage for holding instruction signals and data signals;

an I-Box and an E-Box coupled to each other and said storage, said E-Box including a plurality of instruction execution devices which execute in turn all instructions supplied thereto;

a plurality of general purpose registers used in common by said I-Box and said E-Box;

said I-Box including means to generate storage addresses for instruction signals and data signals in said storage and to initiate storage requests to obtain or store signals at such addresses, said I-Box including means which decodes all instruction signals from storage and determines to which instruction execution device they belong, then issues instruction signals to various ones of said instruction execution devices accordingly, and partially executes some instructions by generating storage addresses and initiating storage request, where needed, before issuing such instructions to various instruction execution devices;

a first group of bi-directional counters and a second group of bi-directional counters, each counter in said first group of counters and each counter in said second group of counters being associated with a given general purpose register, and means to set each bi-directional counter to a given state;

first means in said I-Box which is responsive to designated instruction signals during initial instruction decode for incrementing a selected one of said first group of counters, said first means including second means for incrementing a selected one of said second group of counters in response to other designated instruction signals;

third means responsive to said designated instruction signals upon completion of the execution of the instruction in the E-Box for decrementing the selected one of said first group of counters, said third means including fourth means responsive to said other designated instruction signals for decrementing the selected one of said second group of counters;

means for preventing use by the I-Box of the content of a selected general purpose register for storage address generation purposes during instruction decode whenever the corresponding counter in said first group of counters is not in said given state, and for preventing the I-Box from issuing an instruction which will modify the content of a selected general purpose register whenever the corresponding counter in said second group of counters is not in said given state.

9. In a machine of the class described having a main storage;

an instruction unit including storage address generating circuits and also having a fixed point unit to perform data processing operation on operands;

a plurality of common registers to retain data for both said instruction unit and said fixed point unit;

a pair of bi-directionally operable counters for each of said common registers;

first means coupled to said counters to increment one of said counters each time said instruction unit decodes an instruction specifying the associated common register as a source of data and to decrement the other of said counters each time said associated register is used as a source of data;

and second means coupled to said counters to increment the other counter of said pair when a decoded instruction specifies the associated register to receive data and to decrement the other counter of said pair each time said associated register receives data for storage therein.

10. A data processing system including:

a plurality of execution units which are operated independently by instructions in form of signals supplied thereto, said execution units operating simultaneously to execute different instructions which are overlapped in time;

an addressable storage for storing data signals and instruction signals;

an instruction unit coupled to said addressable storage and said execution units which decodes instructions and determines to which unit they belong, partially executes some instructions by generating storage addresses and initiating storage requests to obtain or store signals at such addresses, and then issues instructions to appropriate ones of said execution units;

one of said execution units being a fixed point unit for performing fixed point arithmetic operations;

a plurality of general purpose registers used in common by said fixed point unit and said instruction unit;

a pair of bi-directional counters for each of said general purpose registers, and means for setting said counters to a given state;

said instruction unit including first means for incrementing one of said pair of counters each time said instruction unit decodes an instruction specifying the associated general purpose register as a source of data, and second means for incrementing the other counter of said pair when a decoded instruction specifies the associated register to receive data;

the fixed point unit including third means for decrementing said one counter of each pair each time the associated general purpose register is used as a source of data, and fourth means to decrement said other counter of each pair each time the associated general purpose register receives data for storage therein.

11. The apparatus of claim 9 wherein said first means and said second means includes respective first and second interlock devices for sampling the states of selected bi-directional counters and an interlock control coupled to said first and second interlocks which inhibits partial execution of instructions in said instruction unit unless the sampled bi-directional counters are in a given state.

12. The apparatus of claim 10 wherein means is provided in said instruction unit to select said general purpose registers and said counters in response to designated ones of said instruction signal.

13. A controller for a data processing system including:

an addressable storage for storing data and instruction signals;

an instruction unit;

a plurality of execution units coupled to said instruction unit;

said instruction unit including means which decodes all instructions, which partially executes some instructions by generating addresses in storage of data and instruction signals and initiating storage requests for such signals, and which issues instructions to the various execution units;

a plurality of general purpose registers used in common by said instruction unit to generate storage addresses and one of said execution units to perform arithmetic and logical operations;

a plurality of counters, corresponding in number to the number of general purpose registers, with each individual counter associated with an individual general purpose register;

means coupled to said counters which initially sets all of said counters to predetermined quantity;

first means in said instruction unit to prevent the use of the content of any general purpose register for storage address generation purposes except when the associated counter holds the predetermined quantity;

second means in said instruction unit coupled to said counters which responds to given instruction signals and increments a selected counter during instruction decode; and the third means in said one of said execution units which responds to said given instruction signals and decrements said selected counter upon subsequent completion of the instruction.

14. The apparatus of claim 12 further including a second group of counters, each counter in said second group of counters being associated with a given one of said general purpose registers;

means coupled to said second group of counters which initially sets all of said second group of counters to a predetermined quantity;

fourth means coupled to said second group of counters for incrementing a selected one of said second group of counters in response to other designated instruction signals;

fifth means coupled to said second group of counters which responds to said other designated instruction signals for decrementing the selected one of said second group of counters upon subsequent completion of the instruction; and sixth means in said instruction unit to prevent the modification of the content of any general purpose register by the instruction unit except when the associated second counter holds the predetermined quantity.

15. A controller for a data processing system including:

an addressable storage for storing data and instruction signals;

an instruction unit;

a plurality of execution units coupled to said instruction unit;

said instruction unit including means which decodes all instructions, which partially executes some instructions by generating addresses in storage of data and instruction signals and initiating storage requests for such signals, and which issues instructions to the various execution units;

a plurality of general purpose registers used in common by said instruction unit to generate storage addresses and one of said execution units to perform arithmetic and logical operations;

a plurality of counters, corresponding in number to the number of general purpose registers, with each individual counter associated with an individual general purpose register, means coupled to said counters which initially sets all of said counters to predetermined quantity;

first means in said instruction unit to prevent the modification of the content of any general purpose register except when the associated counter holds the predetermined quantity;

second means in said instruction unit coupled to said counters which responds to given instruction signals and increments a selected counter during instruction decode; and the third means in said one of said execution units which responds to said given instruction signals and decrements said selected counter upon subsequent completion of the instruction.

16. The apparatus of claim 12 further including a second group of counters, each counter in said second group of counters being associated with a given one of said general purpose registers, means coupled to said second group of counters which initially sets all of said second group of counters to a predetermined quantity;

fourth means coupled to said second group of counters for incrementing a selected one of said second group of counters in response to other designated instruction signals;

fifth means coupled to said second group of counters which responds to said other designated instruction signals for decrementing the selected one of said second group of counters upon subsequent completion of the instruction; and sixth means in said instruction unit to prevent the use of the content of any general purpose register for address generation purposes by the instruction unit except when the associated second counter holds the predetermined quantity.

17. A controller for a data processing system including:

an addressable storage for storing data and instruction signals;

an instruction unit;

a plurality of execution units coupled to said instruction unit and to said addressable storage which are operated simultaneously by different instructions to provide a pipeline action of executing instructions overlapped in time;

a plurality of general purpose registers coupled to said instruction unit and one of said execution units, said general purpose registers being used in common by said instruction unit and said one execution unit;

a first bi-directional counter and a second bi-directional counter for each of said general purpose registers; means for initially setting each bi-directional counter to a given state;

said instruction unit including an operation register which receives all instructions from said storage, an instruction decoder coupled to said operation register which decodes all instructions, a first selection decoder coupled between said operation register and said bi-directional counters, said first selection decoder responding to a first field of instruction signals in said operation register for selecting a given one of said first bi-directional counters, a second selection decoder coupled between said operation register and said second bi-directional counters, said second selection decoder responding to a second field of instruction signals in said operation register for selecting a given one of said second bi-directional counters, an interlock control, interlock means disposed between said interlock control and said first and second bi-directional counters, said interlock means being connected to said operation register and responding to said first and second fields of instruction signals for selectively sampling the state of said first and second bi-directional counters, said interlock means supplying signals to said interlock control which indicates the state of the selected bi-directional counters, means connecting signals from the instruction decoder to the interlock control which indicate the type of instruction being decoded; third decoder means coupled between said operation register and said general purpose registers, said third decoder means responding to said first field of instruction signals or said second field of instruction signal or both said first and said second fields of instruction signals thereby to control the selection of general purpose registers for use by the instruction unit;

said one execution unit including an adder having first, second and third inputs; means connecting a third field of signals from said operation register to the first input of said adder;

first gating means disposed between said general purpose registers and said second input of said adder;

second gating means disposed between said general purpose registers and said third input of said adder;

third decoder means disposed between said first gating means and said operation register, said third decoder means responding to said first field of instruction signals in said operation register for selecting a given general purpose register, a fourth decoder disposed between said second gating means and said operation register, said fourth decoder responding to said second field of instruction signals in said operation register for selecting one of said general purpose registers;

means connecting said interlock control to said first gating means and said second gating means, said interlock control supplying control signals which operate said first gating means to supply the content of the general purpose register selected by said third decoder to said second input of said adder whenever the selected first bi-directional counters is in said given state, and said interlock control supplying control signals which operate said second gating means to supply the content of the general purpose register selected by said fourth decoder to said third input of said adder whenever the selected second bi-directional counter is in said given state; means connecting said interlock control to said first and second bi-directional counters, said interlock control supplying signals which increment the selected ones of said counters during instruction decode;

said instruction unit including further means for initiating a storage request for obtaining or storing data signals at an address specified by the result obtained from said adder.

18. The apparatus of claim 16 wherein said one execution unit includes storage means to store in turn and execute in turn instruction signals issued to it by the instruction unit;

an operation decoder coupled to said storage means for executing instructions in turn held in said storage means;

first control means connected between said operation decoder and said first bi-directional counters, said first control means responding to said first field of instruction signals and supplying a decrementing signal to the selected first bi-directional counter upon completion of the instruction;

second control means connected between said operation decoder and said second bi-directional counters, said second control means responding to said second field of instruction signals and supplying a decrementing signal to the selected second bi-directional counter upon completion of the instruction.

19. The apparatus of claim 17 wherein said first and second control means each include a decoder and gating means operated by signals from said operation decoder.

20. The apparatus of claim 17 wherein the second gating means includes a first group of gates and a second group of gates, said interlock control operates the first group of gates when an instruction has a first format, and said interlock control operates the second set of gates when an instruction has a second format.

(References on following page)

References Cited

UNITED STATES PATENTS

| | | |
|---|---|---|
| 3,343,140 | 9/1967 | Richmond et al. |
| 3,340,513 | 9/1967 | Kinzie et al. |
| 3,305,842 | 2/1967 | Yuichiro Oya. |
| 3,302,178 | 1/1967 | Holloran et al. |
| 3,266,022 | 8/1966 | Minnick et al. |
| 3,251,042 | 5/1966 | King. |
| 3,245,047 | 4/1966 | Blaauw et al. |
| 3,239,820 | 3/1966 | Logan et al. |
| 3,239,816 | 3/1966 | Breslin et al. |
| 3,222,649 | 12/1965 | King et al. |
| 3,134,091 | 5/1964 | Shugart. |

GARETH D. SHAW, Primary Examiner